(12) United States Patent
Li

(10) Patent No.: US 12,503,481 B2
(45) Date of Patent: Dec. 23, 2025

(54) THREE-DIMENSIONAL ORGANIC SANDWICH CHIRALITY AND ITS SYNTHETIC ASSEMBLY

(71) Applicant: Texas Tech University System, Lubbock, TX (US)

(72) Inventor: Guigen Li, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 797 days.

(21) Appl. No.: 17/299,961

(22) PCT Filed: Dec. 11, 2019

(86) PCT No.: PCT/US2019/065657
§ 371 (c)(1),
(2) Date: Jun. 4, 2021

(87) PCT Pub. No.: WO2020/123613
PCT Pub. Date: Jun. 18, 2020

(65) Prior Publication Data
US 2022/0041634 A1 Feb. 10, 2022

Related U.S. Application Data

(60) Provisional application No. 62/910,001, filed on Oct. 3, 2019, provisional application No. 62/779,679, filed on Dec. 14, 2018.

(51) Int. Cl.
*C07F 9/6584* (2006.01)
*B33Y 10/00* (2015.01)
*B33Y 70/00* (2020.01)

(52) U.S. Cl.
CPC .......... *C07F 9/65844* (2013.01); *B33Y 10/00* (2014.12); *B33Y 70/00* (2014.12)

(58) Field of Classification Search
CPC .............. C07F 9/65844; C07F 9/65848; B01J 31/0215; B01J 31/0235; B01J 31/0264
See application file for complete search history.

(56) References Cited

U.S. PATENT DOCUMENTS

2013/0077040 A1   3/2013   Escuti et al.

FOREIGN PATENT DOCUMENTS

WO   WO-2010047551 A2 *  4/2010  ............. C07C 13/62
WO   2014093723 A2        9/2014

OTHER PUBLICATIONS

Y., Kang, et.al., 124, Journal of the American Chemical Society 8275-8279 (2002) (Year: 2002).*
L-N. Jia, et al. 210 Journal of Solid State Chemistry 251-255 (2014) (Year: 2014).*
Y. Filinchuk, et al. Eur. J. Inorg. Chem. 3127-3133 (2008) (Year: 2008).*
Oxford dictionary 2017 (Year: 2017).*
Wu, et al. "Multilayer 3D chirality and its synthetic assembly." Research (2019). (Year: 2019).*
Jin, et al. "A new chiral phenomenon of orientational chirality, its synthetic control and computational study." Frontiers in Chemistry 10 (2023): 1110240. (Year: 2023).*
Oxford Dictionary of English (3ed), 2015 (Year: 2015).*
IUPAC, Compendium of Chemical Terminology, Gold Book, pp. 1017 of 1622 (2014) (Year: 2014).*
Akiyama, T. "Stronger brønsted acids." Chem Rev 2007; 107: 5744-58.
Alberico, D et al. "Aryl-aryl bond formation by transition-metal-catalyzed direct arylation." Chem Rev 2007; 107: 174-238.
Alder, RW et al. "Poly (1, 1-bis (dialkylamino) propan-1, 3-diyl) s; conformationally-controlled oligomers bearing electroactive groups." Org Biomol Chem 2009; 7: 2704-15.
An, G et al. "N-Phosphonyl/phosphinylimines and group-assisted purification (GAP) chemistry/technology." Org Biomol Chem 2015; 13: 1600-17.
Bhunia, S et al. "Selected Copper-Based Reactions for C—N, C—O, C—S, and C—C Bond Formation." Angew Chem Int Ed 2017; 56: 16136-79.
Cai, Y et al. "Asymmetric Catalytic Halofunctionalization of α, β-Unsaturated Carbonyl Compounds." J Org Chem 2018; 84: 1-13.
Cai, Z-J et al. "Thioketone-directed rhodium (I) catalyzed enantioselective CH bond arylation of ferrocenes." Nat Commun 2019; 10(1): 1-8.
Cao, Z-Y et al. "Highly stereoselective olefin cyclopropanation of diazooxindoles catalyzed by a C 2-symmetric spiroketal bisphosphine/Au (I) complex." J Am Chem Soc 2013; 135: 8197-200.
Carreira, EM et al. "Classics in stereoselective synthesis." Weinheim: Wiley-VCH, 2009.
Chen, D-F et al. "Asymmetric organocatalysis combined with metal catalysis: concept, proof of concept, and beyond." Acc Chem Res 2014; 47: 2365-77.
Chen, J et al. "Asymmetric catalysis with N-heterocyclic carbenes as non-covalent chiral templates." Nat Chem 2014; 5: 3437.
Chen, Y et al. "Modified BINOL ligands in asymmetric catalysis." Chem Rev 2003; 103: 3155-212.
Corey, EJ et al. "Molecules and medicine." New Jersey: John Wiley & Sons, 2007.
Cui, X et al. "Enantioselective cyclopropenation of alkynes with acceptor/acceptor-substituted diazo reagents via Co (II)-based metalloradical catalysis." J Am Chem Soc 2011; 133: 3304-7.
Dai, L-X et al. "Asymmetric catalysis with chiral ferrocene ligands." Acc Chem Res 2003; 36: 659-67.
Denmark, SE et al. "Chiral phosphoramide-catalyzed aldol additions of ketone enolates." Preparative aspects. J Am Chem Soc 1999; 121: 4982-91.
Ding, K et al. "Spiro skeletons: A class of privileged structure for chiral ligand design." Chem Asian J 2009; 4: 32-41.

(Continued)

*Primary Examiner* — Alexander R Pagano
*Assistant Examiner* — Frank S. Hou
(74) *Attorney, Agent, or Firm* — Edwin S. Flores; Daniel J. Chalker; Chalker Flores, LLP

(57) ABSTRACT

The present invention includes a multi-layer 3D material, a method of making, and a catalyst comprising: a first, a second, and a third layer, wherein each of the layers are arranged in a nearly parallel fashion with chirality along a center plane.

6 Claims, 24 Drawing Sheets

(56) References Cited

OTHER PUBLICATIONS

Ding, X et al. "An n-channel two-dimensional covalent organic framework." J Am Chem Soc 2011; 133: 14510-3.
Dunitz, JD. "Pauling's left-handed α-helix." Angew Chem Int Ed 2001; 40: 4167-73.
Fu, GC. "Enantioselective nucleophilic catalysis with "planar-chiral" heterocycles." Acc Chem Res 2000; 33: 412-20.
Fu, Z et al. "β-Carbon activation of saturated carboxylic esters through N-heterocyclic carbene organocatalysis". Nat Chem 2013; 5: 835.
Gampe, DM et al. "From Highly Fluorescent Donors to Strongly Absorbing Acceptors: The Tunable Properties of Fluorubines." J Org Chem 2017; 82: 6153-62.
Geng, H et al. "Versatile and chemoselective transformation of aliphatic and aromatic secondary amides to nitriles." Tetrahedron 2015; 71: 3795-801.
Guo, J et al. "Cobalt-Catalyzed Asymmetric Synthesis of gem-Bis (silyl) alkanes by Double Hydrosilylation of Aliphatic Terminal Alkynes." Chem 2019; 5: 881-95.
Guo, W et al. "Formal Asymmetric Catalytic Thiolation with a Bifunctional Catalyst at a Water-Oil Interface: Synthesis of Benzyl Thiols." Angew Chem Int Ed 2015; 54: 4522-6.
Gustafson, JL et al. "Dynamic kinetic resolution of biaryl atropisomers via peptide-catalyzed asymmetric bromination." Science 2010; 328: 1251-5.
Han, J et al. "Design and Synthesis of WJ-Phos, and Application in Cu-Catalyzed Enantioselective Boroacylation of 1, 1-Disubstituted Allenes." ACS Catal 2019; 9: 6890-5.
Handa, S et al. "HandaPhos: a general ligand enabling sustainable ppm levels of palladium-catalyzed cross-couplings in water at room temperature." Angew Chem Int Ed 2016; 55: 4914-8.
Kato, H et al. "Isolation of Notaamid S and Enantiomeric 6-epi-Stephacidin A from the Fungus Aspergillus: Biogenetic Implication." Org Lett 2015; 17: 700-3.
Hu, X et al. "A Simple Approach to Bioconjugation at Diverse Level: Metal Free Clcik Reaction of Activated Alkynes with Native Groups of Biotargets without Prefunctionalization." Research 2018; 2018: 3152870,1-12.
Huang, G et al. "Novel chiral aggregation induced emission molecules: self-assembly, circularly polarized luminescence and copper (ii) ion detection." Mater Chem Front 2018; 2: 1884-92.
Huang, XL et al. "[4+ 2] Cycloaddition of Ketenes with N-Benzoyldiazenes Catalyzed by N-Heterocyclic Carbenes." Angew Chem Int Ed 2009; 48: 192-5.
International Search Report [ISA/US] PCT/US2019/065657 dated Mar. 9, 2020.
Kaur, P et al. "Asymmetric catalytic N-phosphonyl imine chemistry: The use of primary free amino acids and Et2AlCN for asymmetric catalytic Strecker reaction." J Org Chem 2010; 75: 5144-50.
Kotha, S et al. "Recent applications of the Suzuki-Miyaura cross-coupling reaction in organic synthesis." Tetrahedron 2002; 58: 9633-95.
Li, G et al. "An asymmetric Diels-Alder reaction catalyzed by chiral phosphate magnesium complex: highly enantioselective synthesis of chiral spirooxindoles." Angew. Chem Int Ed 2013; 125: 4726-30.
Guram, AS et al. "Palladium-catalyzed aromatic aminations with in situ generated aminostannanes." J Am Chem Soc 1994; 116: 7901-2.
Li, Y et al. "Aptamer-Anchored Rubrene-Loaded Organic Nanoprobes for Cancer Cell Targeting and Imaging." CCS Chemistry 2019; 1: 251-60.
Lin et al. "New 3-D Chiral Framework of Indium with 1,3,5-Benzenetricarboxylate." Inorganic Chemistry. Dec. 9, 2004 (Dec. 9, 2004) vol. 44, p. 73-76; p. 73.
Lin, JS et al. "Chiral Brønsted Acid Catalyzed Dynamic Kinetic Asymmetric Hydroamination of Racemic Allenes and Asymmetric Hydroamination of Dienes." Angew. Chem Int Ed 2019; 58: 7092-6. [Abstract].
List, B. "Asymmetric aminocatalysis." Synlett 2001; 11: 1675-86.

Liu, H et al. "Chiral Brønsted acid-catalyzed enantioselective three-component Povarov reaction." J Am Chem Soc 2009; 131: 4598-9.
Liu, Q, et al. "Generating Giant Membrane Vesicles from Live Cells with Preserved Cellular Properties." Research 2019; 2019: 6523970.
Liu, X et al. "Asymmetric Cycloaddition and Cyclization Reactions Catalyzed by Chiral N, N'-Dioxide-Metal Complexes." Acc Chem Res 2017; 50: 2621-31.
Liu, Y et al. "Iridium-Catalyzed Asymmetric Hydrogenation of α-Alkylidene Succinimides". Angew Chem Int Ed 2013; 52: 2203-6.
Lorion, MM et al. "Heteromultimetallic catalysis for sustainable organic syntheses." Chem Soc Rev 2017; 46: 7399-420.
Luo, J et al. "Enantioselective Synthesis of Biaryl Atropisomers by Pd-Catalyzed C—H Olefination using Chiral Spiro Phosphoric Acid Ligands." Angew Chem Int Ed 2019; 131: 6780-4.
Evans, DA et al. "Bis (oxazolines) as chiral ligands in metal-catalyzed asymmetric reactions. Catalytic, asymmetric cyclopropanation of olefins." J. Am. Chem Soc 1991; 113: 726-8.
MacMillan, DW. "The advent and development of organocatalysis." Nature 2008; 455: 304-8.
Metallinos, C et al. "N-cumyl benzamide, sulfonamide, and aryl O-carbamate directed metalation groups. Mild hydrolytic lability for facile manipulation of directed ortho metalation derived aromatics." Org Lett 1999; 1: 1183-6.
Mishra, S et al. "Enantioselective Alkyne Conjugate Addition Enabled by Readily Tuned Atropisomeric P, N-Ligands." J Am Chem Soc 2017; 139: 3352-5.
Miyaura, N et al. "Palladium-catalyzed cross-coupling reactions of organoboron compounds." Chem Rev 1995; 95: 2457-83.
Mothana, S et al. "Multistep Phase-Switch Synthesis by Using Liquid-Liquid Partitioning of Boronic Acids: Productive Tags with an Expanded Repertoire of Compatible Reactions." Angew Chem Int Ed 2010; 49: 2883-7.
Nicolaou, KC et al. "Classics in Total Synthesis II: More Target, Strategies, Methods." Weinheim: Wiley-VCH, 2003.
Noland, WE et al. "Synthesis and crystallography of 8-halonaphthalene-1-carbonitriles and naphthalene-1, 8-dicarbonitrile." J Chem Res 2011; 35: 694-7.
Pace, CN et al. A helix propensity scale based on experimental studies of peptides and proteins. Biophys J 1998; 75: 422-7.
Phipps, RJ et al. "The progression of chiral anions from concepts to applications in asymmetric catalysis." Nat Chem 2012; 4: 603.
Pu, L. "1, 1'-Binaphthyl dimers, oligomers, and polymers: molecular recognition, asymmetric catalysis, and new materials." Chem Rev 1998; 98: 2405-94.
Sandoval, CA et al. "Mechanism of asymmetric hydrogenation of ketones catalyzed by BINAP/1, 2-diamine-ruthenium (II) complexes." J Am Chem Soc 2003; 125: 13490-503.
Schwamb, CB et al. "Enantioselective Synthesis of α-Amidoboronates Catalyzed by Planar-Chiral NHC-Cu (I) Complexes." J Am Chem Soc 2018; 140(34) 10644-8.
Schwartz, LA et al. "Cyclometalated Iridium-PhanePhos Complexes Are Active Catalysts in Enantioselective Allene-Fluoral Reductive Coupling and Related Alcohol-Mediated Carbonyl Additions That Form Acyclic Quaternary Carbon Stereocenters." J Am Chem Soc 2019; 141: 2087-96.
Seifert, CW et al. "GAP Peptide Synthesis through the Design of a GAP Protecting Group: An Fmoc/tBu Synthesis of Thymopentin Free from Polymers, Chromatography and Recrystallization." Eur J Org Chem 2016; 2016: 1714-9.
Shen, D et al. "Enantioselective dearomatization of naphthol derivatives with allylic alcohols by cooperative iridium and Brønsted acid catalysis." Angew Chem Int Ed 2017; 56: 3242-6.
Shen, Y et al. "Helicenes: synthesis and applications." Chem Rev 2011; 112: 1463-535.
Shi, S-L et al. "Copper-catalysed enantioselective stereodivergent synthesis of amino alcohols." Nature 2016; 532: 353.
Tang, H et al. "Nanoscale Crystalline Sheets and Vesicles Assembled from Nonplanar Cyclic π-Conjugated Molecules." Research 2019; 2019: 1953926.
Tang, W et al. "New chiral phosphorus ligands for enantioselective hydrogenation." Chem Rev 2003; 103: 3029-70.

(56) References Cited

OTHER PUBLICATIONS

Trost, BM. "Designing a receptor for molecular recognition in a catalytic synthetic reaction: allylic alkylation." Acc Chem Res 1996; 29: 355-64.
Wagner, I et al. "New naturally occurring amino acids." Angew Chem Int Ed 1983; 22: 816-28.
Wang, X et al. "A Binary Supramolecular Assembly with Intense Fluorescence Emission, High pH Stability, and Cation Selectivity: Supramolecular Assembly-Induced Emission Materials." Research 2019; 2019: 1454562.
Wei, Y et al. "Recent advances in organocatalytic asymmetric morita-baylis-hillman/aza-morita-baylis-hillman reactions." Chem Rev 2013; 113: 6659-90.
Wu et al. "Multilayer 3D Chirality and Its Synthetic Assembly." Research. Jun. 27, 2019 1-40 (Jun. 27, 2019) vol. 2019, p. 1-11.
Xie, J-b et al. "Group-assisted purification (GAP) chemistry for the synthesis of Velcade via asymmetric borylation of N-phosphinylimines." Beilstein J Org Chem 2014; 10: 746-51.
Xie, J-H et al. "Chiral diphosphine and monodentate phosphorus ligands on a spiro scaffold for transition-metal-catalyzed asymmetric reactions." Acc Chem Res 2008; 41: 581-93.
Xu, G et al. P-Chiral Phosphorus Ligands Based on a 2, 3-Dihydrobenzo [d][1, 3] oxaphosphole Motif for Asymmetric Catalysis. Acc Chem Res 2019; 52: 1101-12.
Yang, G et al. "NHC-catalyzed atropoenantioselective synthesis of axially chiral biaryl amino alcohols via a cooperative strategy." Nat Commun 2019; 10: 3062.
Ye, C-X et al. "Dual catalysis for enantioselective convergent synthesis of enantiopure vicinal amino alcohols." Nat Commun 2018; 9: 410.
Ye, L-W et al. "Phosphine-triggered synthesis of functionalized cyclic compounds." Chem Soc Rev 2008; 37: 1140-52.
Yoon, H et al. "Carboiodination Catalyzed by Nickel." J Am Chem Soc 2018; 140: 10950-4.
Yu, J et al. "Brønsted-acid-catalyzed asymmetric multicomponent reactions for the facile synthesis of highly enantioenriched structurally diverse nitrogenous heterocycles." Acc Chem Res 2011; 44: 1156-71.

Zbieg, JR et al. "Enantioselective CH crotylation of primary alcohols via hydrohydroxyalkylation of butadiene." Science 2012; 336: 324-7.
Zhang, HH et al. "Design and Enantioselective Construction of Axially Chiral Naphthyl-Indole Skeletons." Angew Chem Int Ed 2017; 56: 116-21.
Zhang, J et al. "Asymmetric phosphoric acid-catalyzed four-component Ugi reaction." Science 2018; 361: 1087-96.
Zhao, C et al. "nantioselective [3+3] atroposelective annulation catalyzed by N-heterocyclic carbenes." Nature Comm, 2018; 9, 611. DOI: 10.1038/s41467-018-02952-3.
Zhou, Y et al. The synthesis and application of 2-acetyl-6-(1-naphthyl)-pyridine oxime as a new ligand for palladium precatalyst in Suzuki coupling reaction. J Heterocycl Chem 2009; 46: 116-8.
Zhu, K et al. "Ring-through-ring molecular shuttling in a saturated [3] rotaxane." Nat Chem 2018; 10: 625.
Zhu, Y et al. "Asymmetric α-photoalkylation of β-ketocarbonyls by primary amine catalysis: facile access to acyclic all-carbon quaternary stereocenters." J Am Chem Soc 2014; 136: 14642-5.
Zhang, Z et al. "Asymmetric hydrogenation of nonaromatic cyclic substrates." Chem Rev 2016; 116: 14769-827.
Zhang, P-C et al. "Gold (I)/Xiang-Phos-Catalyzed Asymmetric Intramolecular Cyclopropanation of Indenes and Trisubstituted Alkenes." Org Lett 2018; 20: 7049-52.
Wang, A-J et al. "Right-handed and left-handed double-helical DNA: structural studies." Cold Spring Harb Symp Quant Biol 1983; 47: 33-44.
Seifert C. "New Synthetic Methodology for Chiral Amines and Peptides via GAP Technology". Ph. D. Thesis. Texas Tech University Department of Chemistry and Biochemistry 2017.
Kaur, P et al. "The GAP chemistry for chiral N-phosphonyl imine-based Strecker reaction." Green Chem 2011; 13: 1288-92.
Kolb, HC et al. "Catalytic asymmetric dihydroxylation." Chem Rev 1994; 94: 2483-547.
Mei, J et al. "Aggregation-induced emission: together we shine, united we soar!" Chem Rev 2015; 115: 11718-940.

* cited by examiner

THREE-DIMENSIONAL ORGANIC SANDWICH CHIRALITY AND ITS SYNTHETIC ASSEMBLY

CROSS-REFERENCE TO RELATED APPLICATIONS

This application claims priority to and is the National Stage of International Application No. PCT/US2019/065657, filed on Dec. 11, 2019 and claims priority to U.S. Provisional Application Ser. No. 62/910,001, filed Oct. 3, 2019 and U.S. Provisional Application Ser. No. 62/779,679, filed Dec. 14, 2018, the entire contents of which are incorporated herein by reference.

TECHNICAL FIELD OF THE INVENTION

The present invention relates in general to the field of organic polymers forming an organic sandwich having a controlled chirality and methods of making the same.

STATEMENT OF FEDERALLY FUNDED RESEARCH

None.

BACKGROUND OF THE INVENTION

Without limiting the scope of the invention, its background is described in connection with organic polymers.

Chirality in biomolecules includes examples such as nucleic acids, proteins and carbohydrates, which are involved in the biological mechanism in human beings, animals and plants (1-6). Chirality has also become increasingly important in pharmaceutical science and industry on the design, discovery and development of drugs for enhancing their potency and selectivity (5,6). In this regard, asymmetric and catalytic synthesis of chiral compounds have been actively pursued for more than half a century to meet the needs of chemical and biomedical research (7-20). Among the numerous chiral biomolecules and their complexes, DNA has attracted special attention in the chemical community because it shows multi-layer paired chirality along with their double- or single-strand and i-Motif backbones (FIG. 1A) (21-23). Proteins also show multi-layer chirality in their folding structures (24).

Even though multi-layer chirality has existed in nature, a strategy to mimic this functionality chemically has not been established. So far, planar chirality has only been focused on two-layer arrangement, which has been applied to a series of asymmetric reactions (FIG. 1B-a-c) (25-30). For example, based on Wilkinson's ferrocene, the Fu group has established planar-chiral Lewis bases of 7-complexes with transition metals, and has successfully utilized them for asymmetric catalytic reactions, such as allylic alkylations (31), [4+1]cycloadditions (32), and carboiodination (33) (FIG. 1B-a). Several other groups have made great progress on planar chiral Lewis acids of Ti, Zr and Dy, which showed effectiveness on polymer chemistry and molecular magnetic hysteresis (34-37). Very recently, Aponick's group has developed a two-layer chirality of imidazoline-based biaryl P,N-ligands for asymmetric alkyne conjugate addition and alkynylation reactions with excellent asymmetric induction (FIG. 1B-c) (38). In the meanwhile, chiral two-layer helicenes have also attracted much attention in material sciences (39, 40).

In case of FIG. 1B-a, a transition metal is needed to anchor two planes; and in case of FIG. 1B-b, two covalent bridges are necessitated to assemble two-layer chirality from which (R)-[2,2]phanephos ligands has applied to asymmetric catalysis (41). In the latest case of FIG. 1B-c, the aromatic interaction between fully fluorinated electron-deficient phenyl ring and electron-efficient naphthyl ring plays a crucial role in stabilizing chiral planar stacking (38).

Thus, a need remains for new materials having new structures, characteristics, and uses for three dimensional chiral structures.

SUMMARY OF THE INVENTION

In one embodiment, the present invention includes a multi-layer 3D material comprising: a first, a second, and a third layer, wherein each of the layers are arranged in a nearly parallel fashion with chirality along a center plane. In one aspect, each of the first, second, and third layers are parallel. In another aspect, the multi-layer 3D material has a right-hand chirality, a left-hand chirality, or both a left- and a right-handed chirality. In another aspect, each of the first, second, and third layers are at least one of anti, syn, or both anti and syn isomers. In another aspect, each of the first, second, and third layers are NN-phosphornyl amides. In another aspect, each of the first, second, and third layers comprise chiral or achiral N-phosphonyl- or N-phosphinyl groups. In another aspect, each of the first, second, and third layers comprise a Multi-Layer Organic Framework (M-LOF) of single organic molecules with pseudo $C_2$-chiral characteristics. In another aspect, each of the first, second, and third layers comprises:

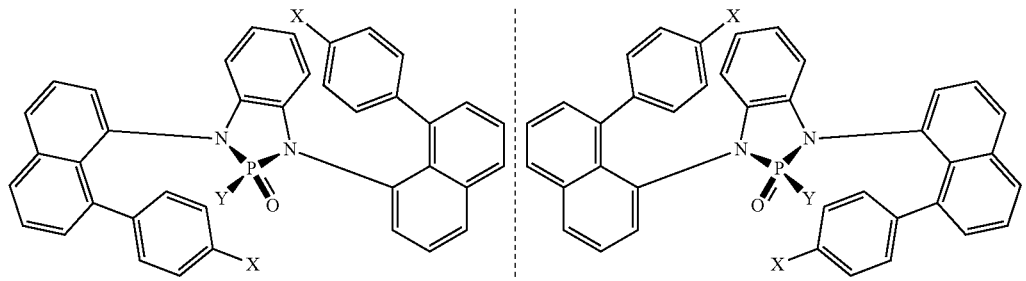

X=H, Me, OMe;

Y=—Cl, —$N_3$, —$NH_2$, —NH Ph, —NHBn, -Me, -Et, -Bu & -iPr,

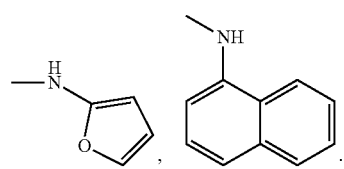

In another aspect, the each of the first, second, and third layers comprises:
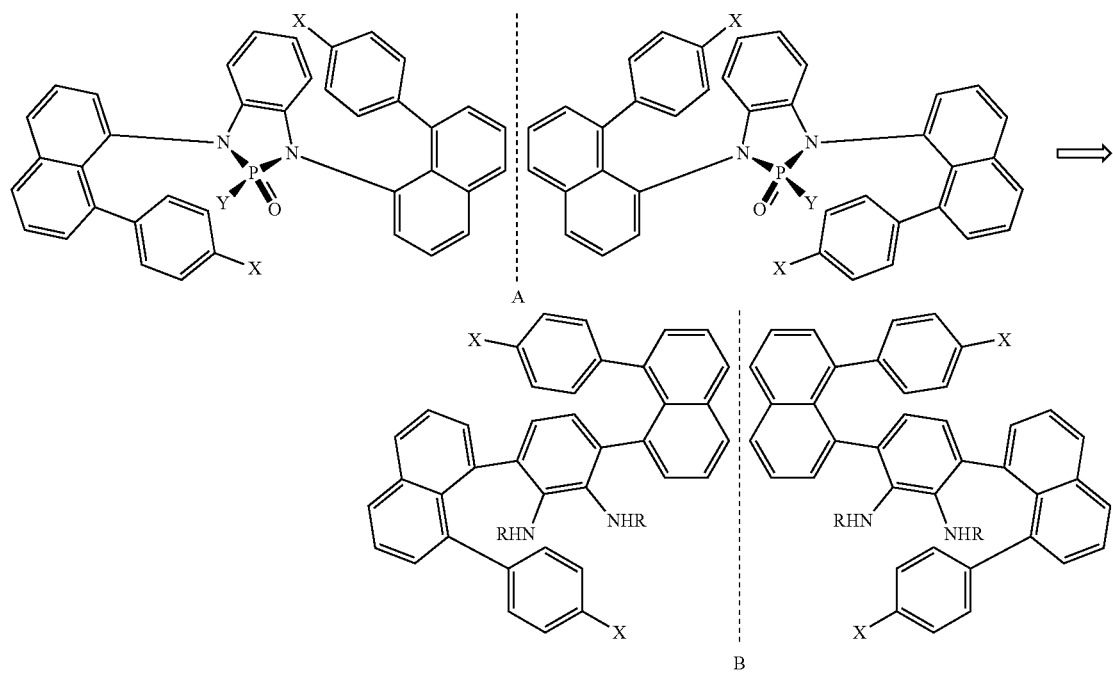
wherein
X=H, Me; Y=—Cl, —N₃, —NH₂, —NHPh, —NHSn, -Me, -Et, —BU, -iPr, —NH-Naph,
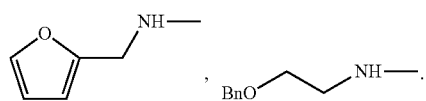
In another aspect, the one or more of the first, second, or third layers are made by:
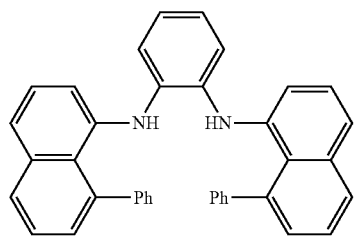
is produced by the following:
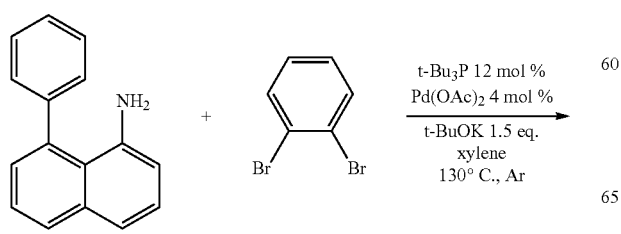
-continued
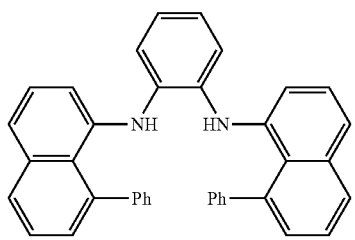 [SMILES: c1ccc(-c2cccc3cccc(Nc4ccccc4Nc4cccc5cccc(-c6ccccc6)c45)c23)cc1]
In another aspect, the one or more of the first, second, or third layers are made by:
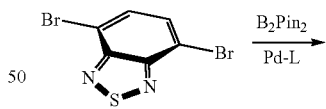
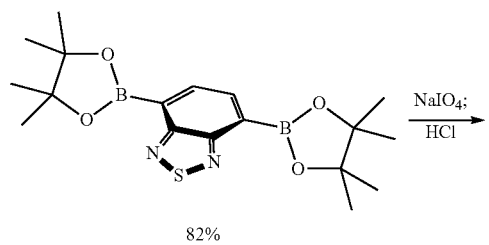

-continued
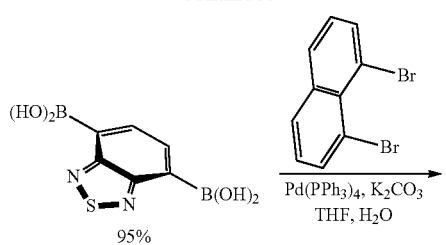
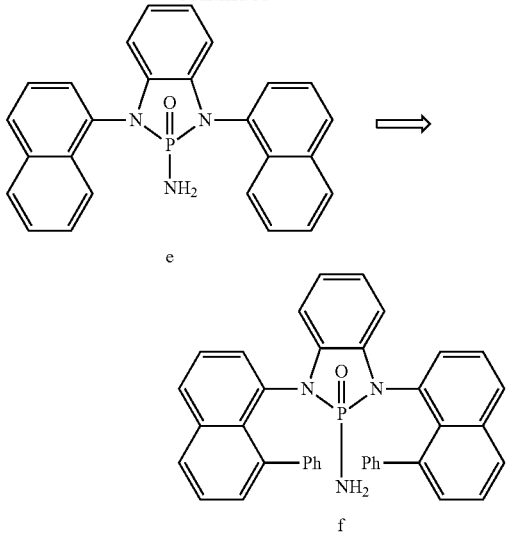
In another aspect, a monomeric precursors of the multi-layer 3D material is selected from at least one of:
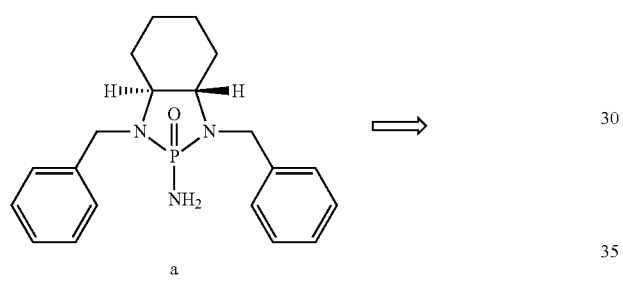
In another aspect, the multi-layer 3D material is selected from at least one of:
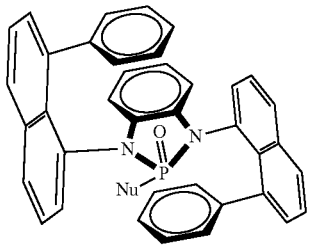
20
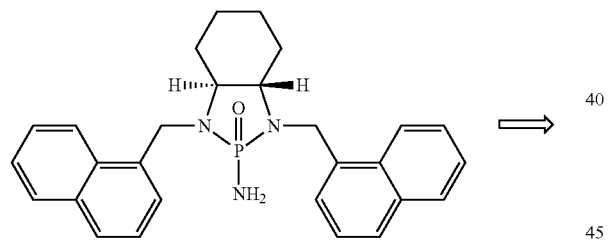
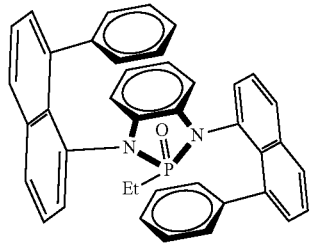
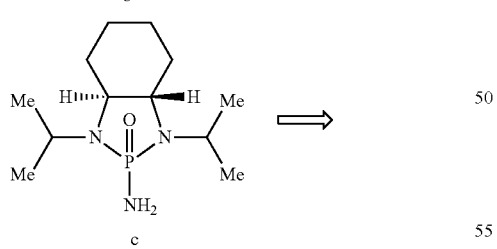
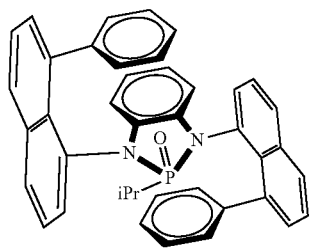
21
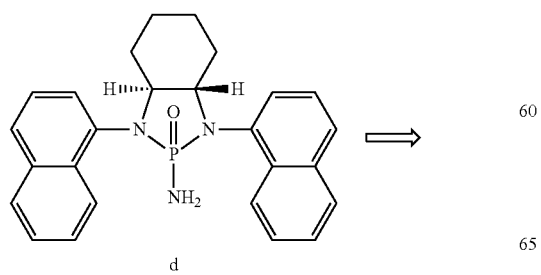
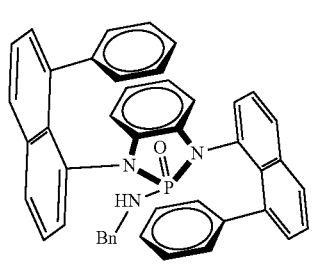
22

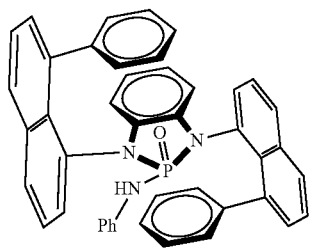
23
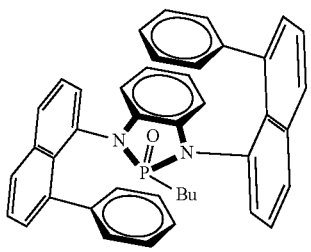
18
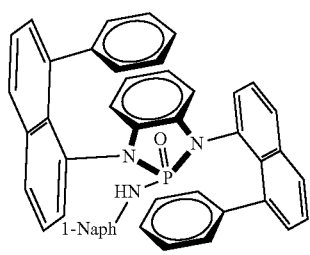
24
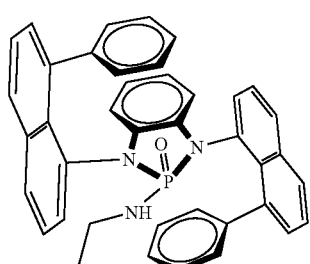
25
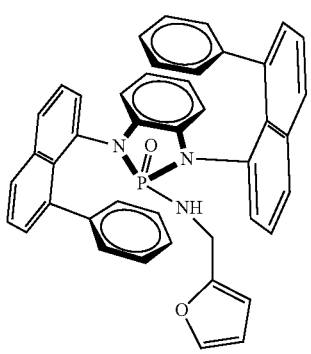
19
In another aspect, the multi-layer 3D material is selected from at least one of:
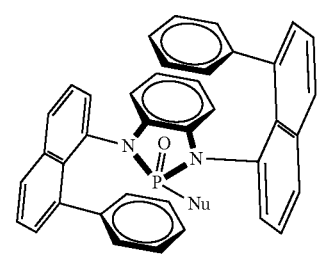
In another aspect, the product of formula:
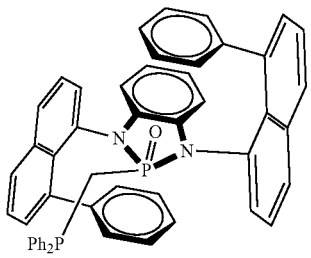
26
is made by a method comprising:
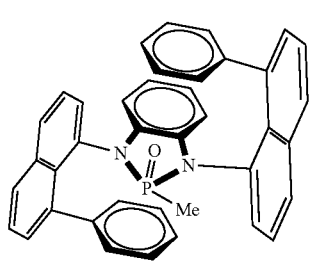
17
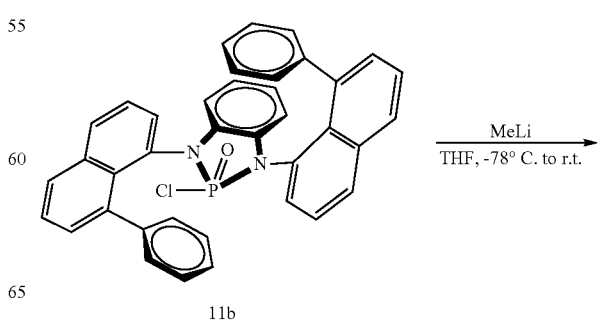
11b 9
-continued
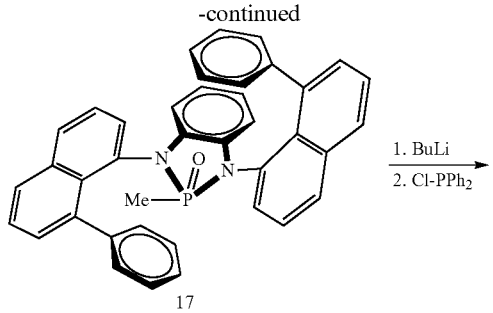
17
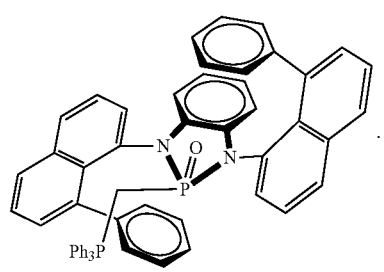
26
In another aspect, the product of at least one compound of formula 2a to 2f:
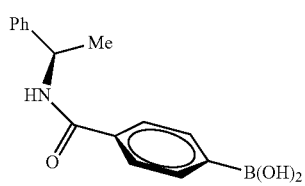
2a
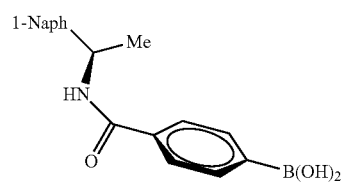
2b
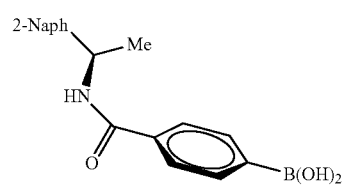
2c
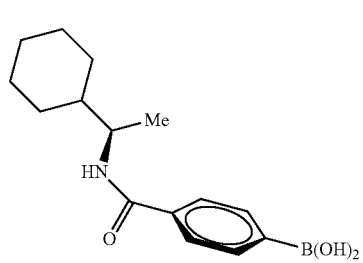
2d
10
-continued
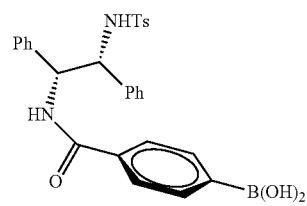
2e
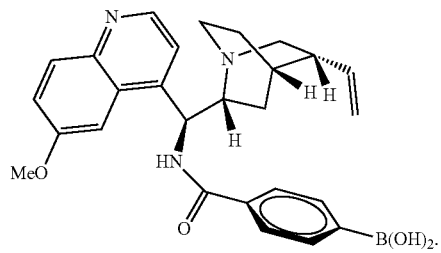
2f
In another aspect, the product of at least one compound of formula:
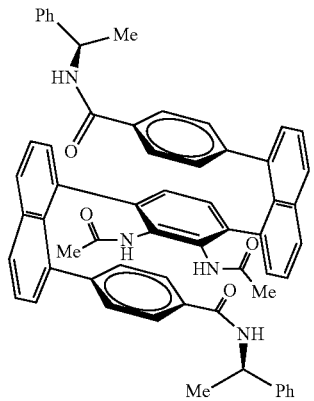
8a
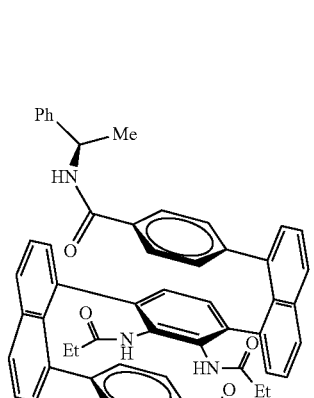
8b

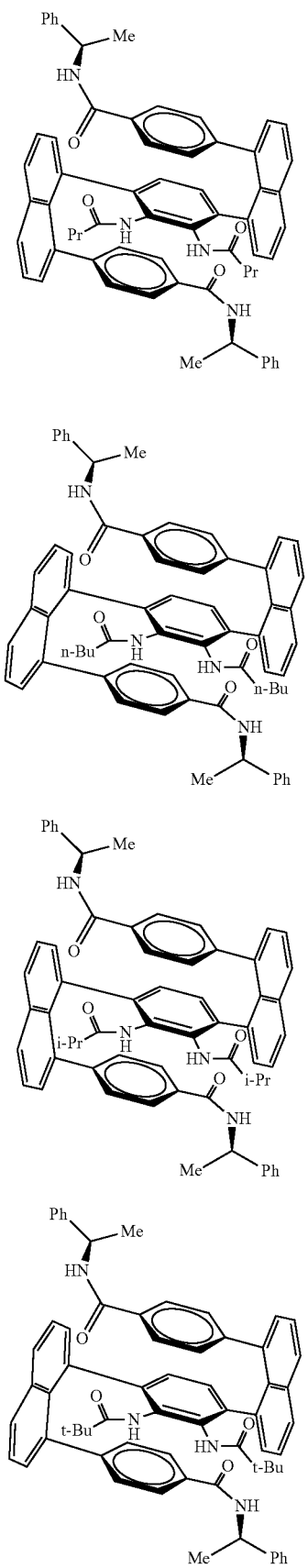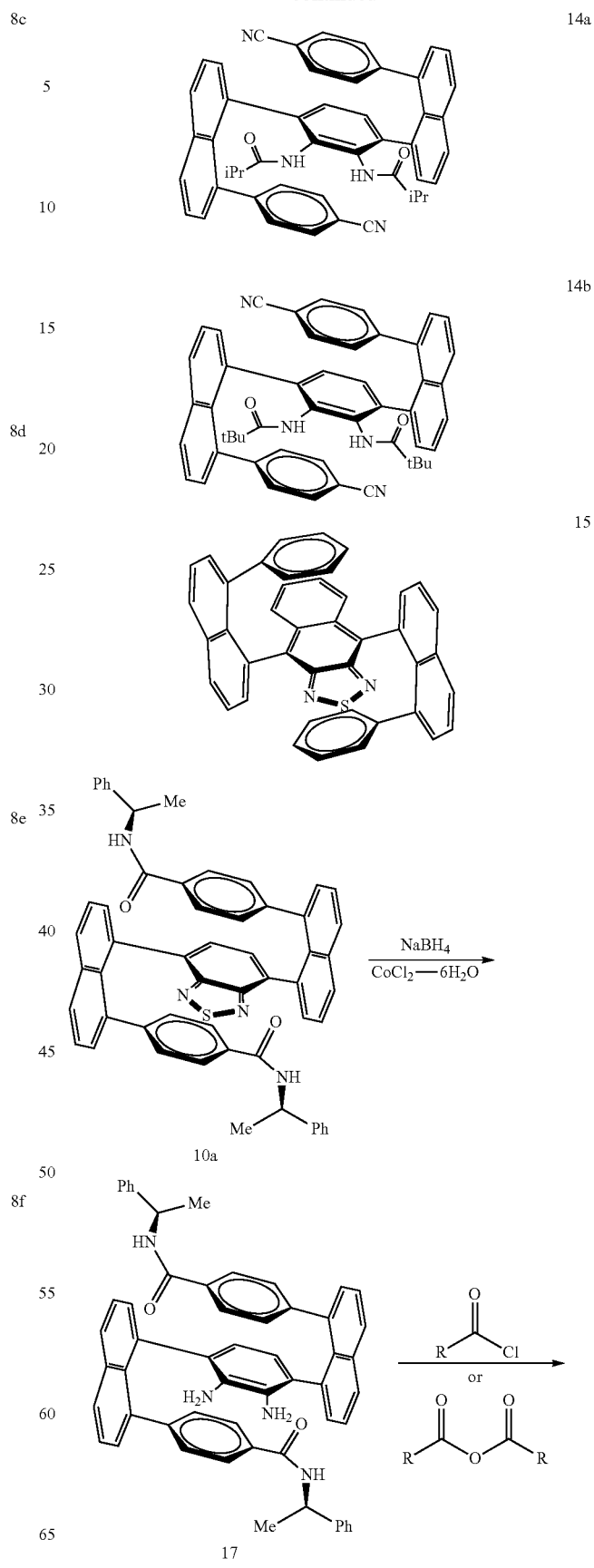

13
-continued
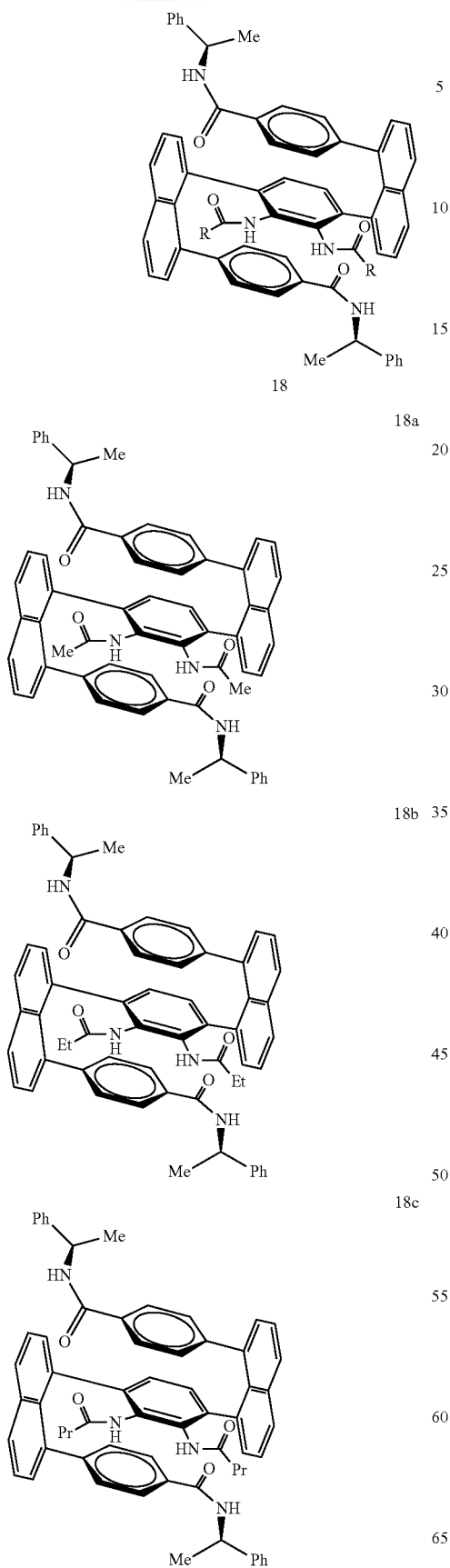
14
-continued
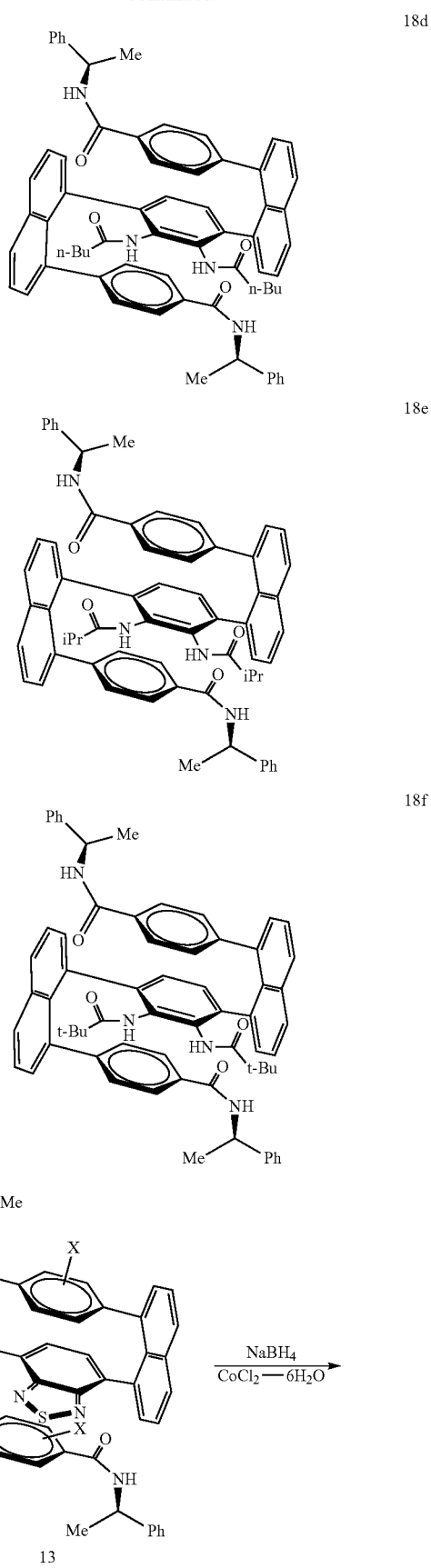

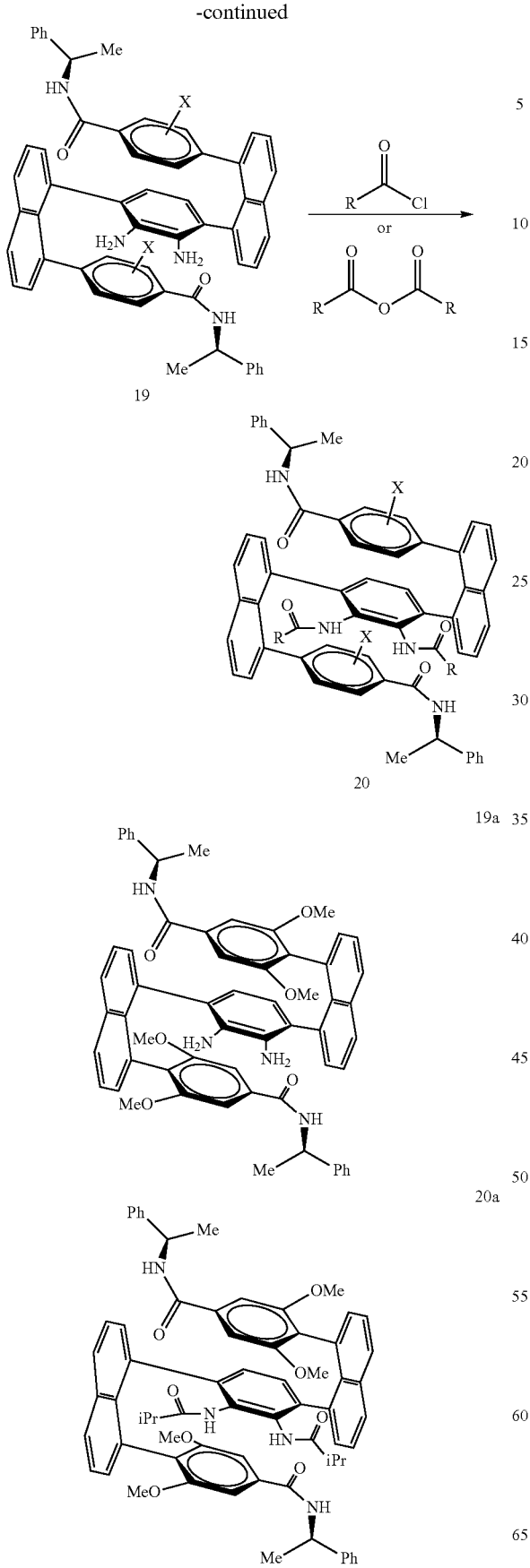
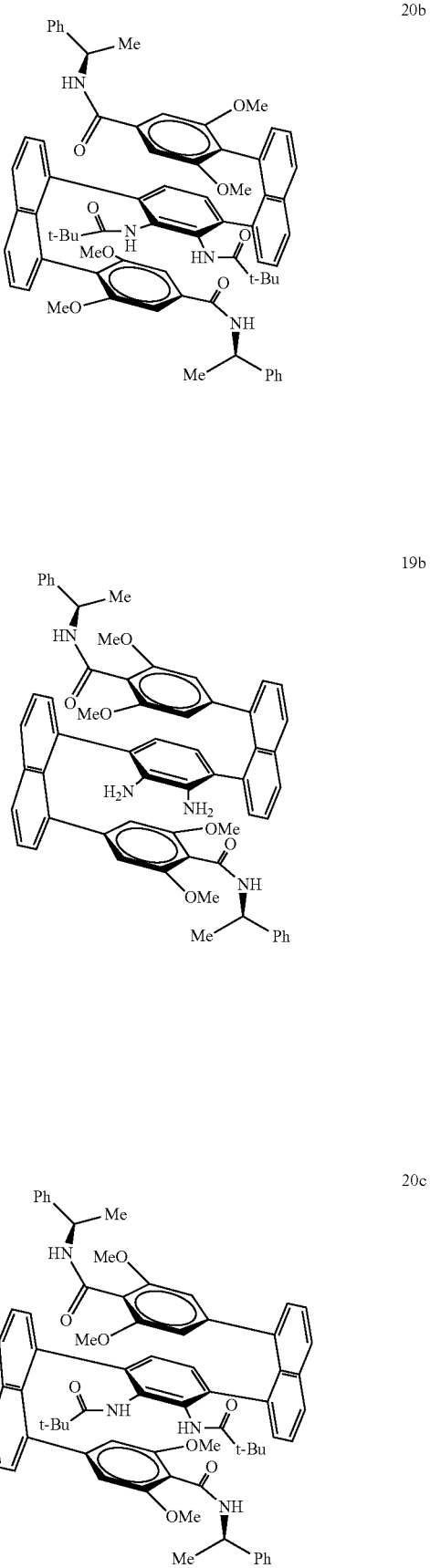

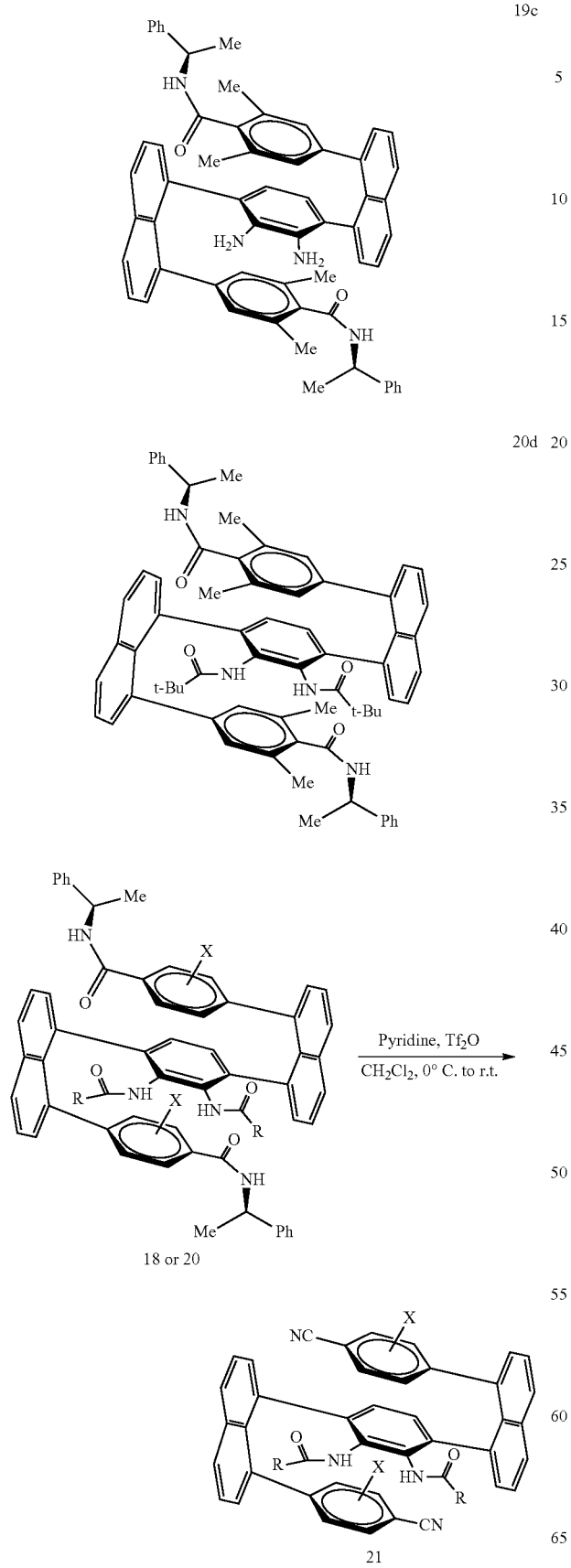
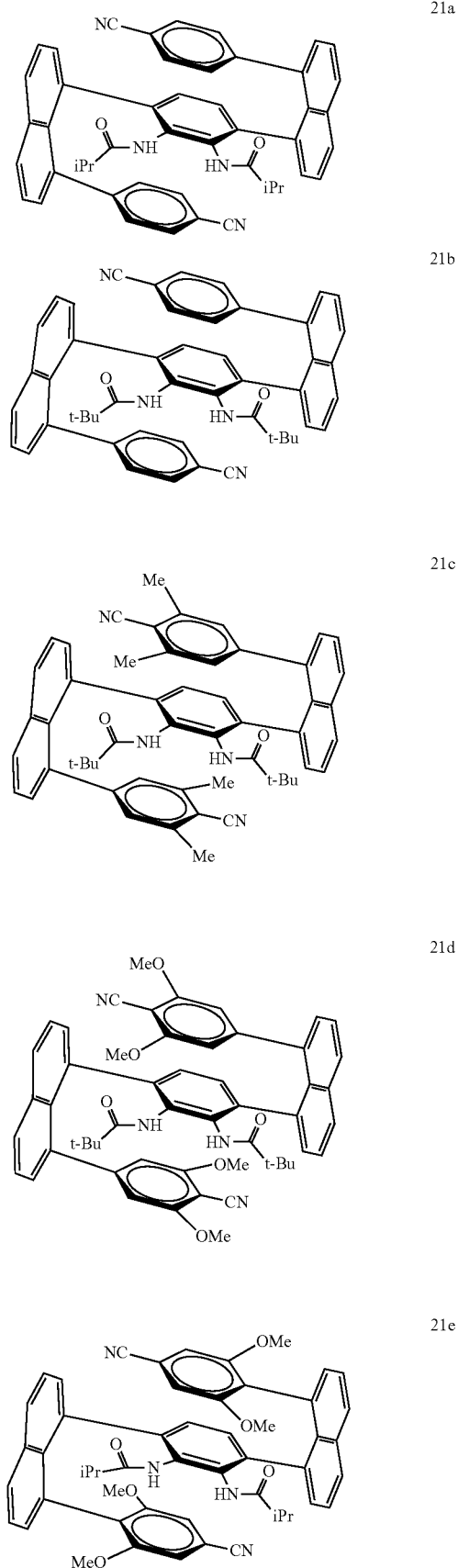

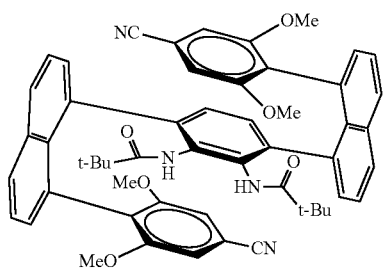
21f
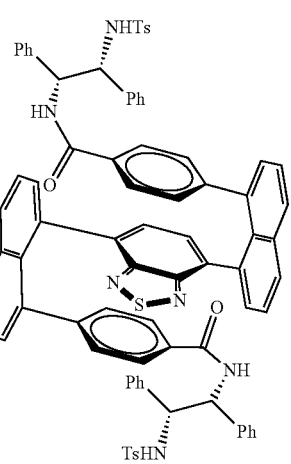
10e
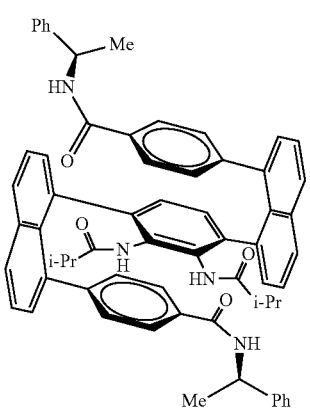
18e
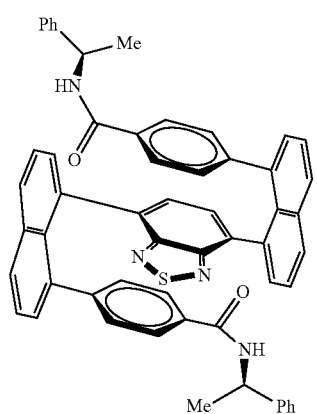
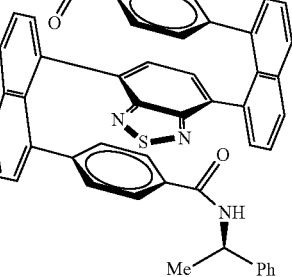
10a
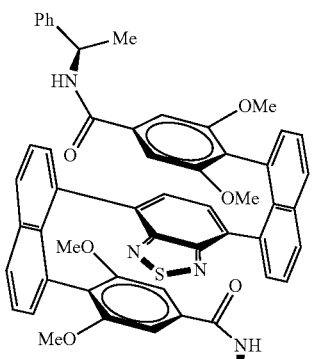
13a
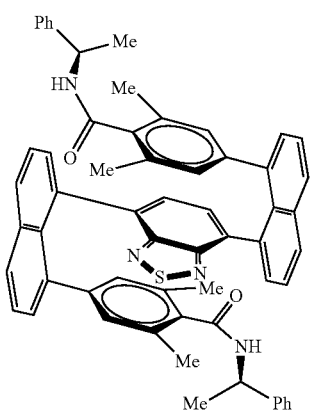
13c
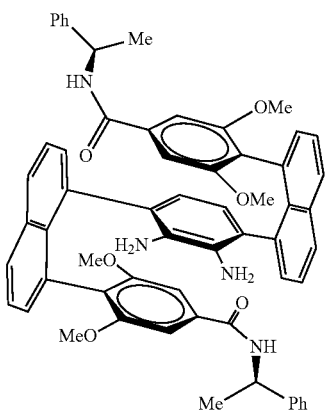
19a
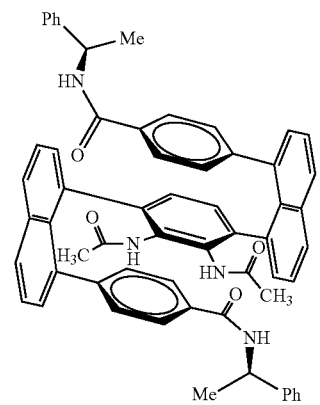
18a 21
-continued
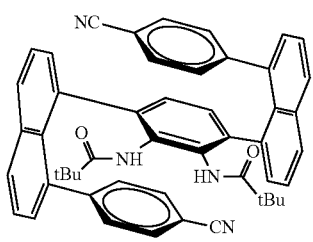
21b
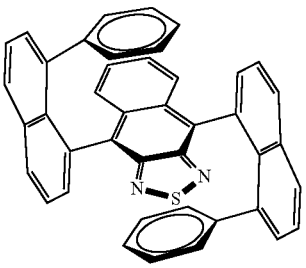
16
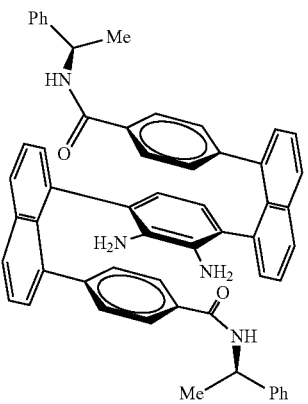
17
22
-continued
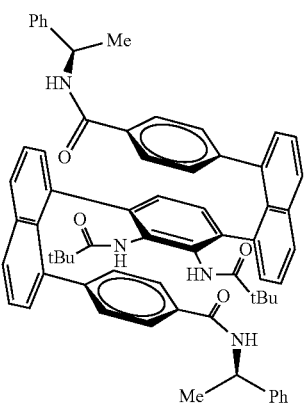
18f
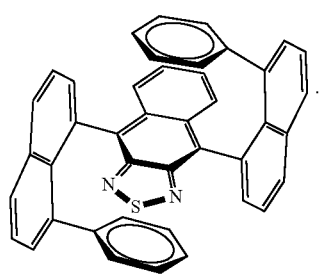
16
In another embodiment, the present invention includes a method of making a multi-layer 3D material comprising: a first, a second, and a third layer, wherein each of the layers are arranged in a nearly parallel fashion with chirality along a center plane comprising:
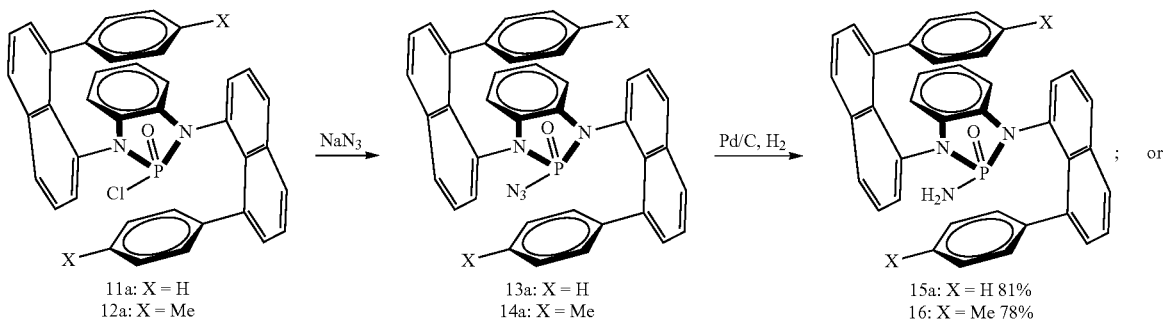
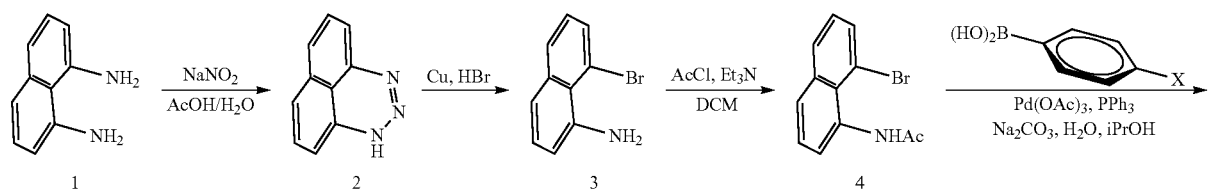

23
-continued
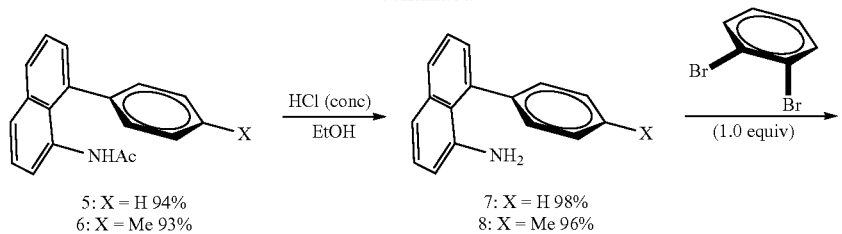
5: X = H 94%
6: X = Me 93%
7: X = H 98%
8: X = Me 96%
24
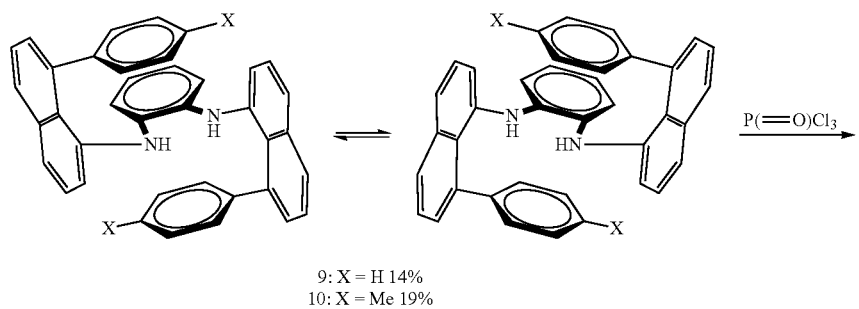
9: X = H 14%
10: X = Me 19%
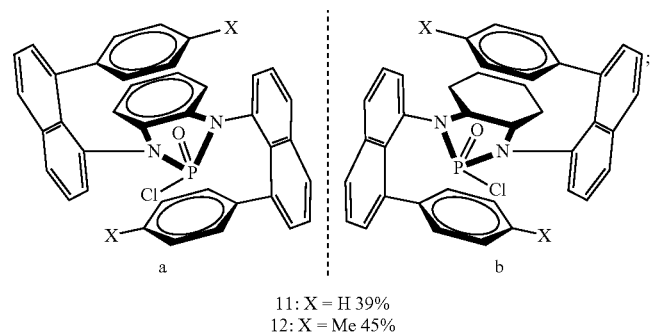
a                    b
11: X = H 39%
12: X = Me 45%
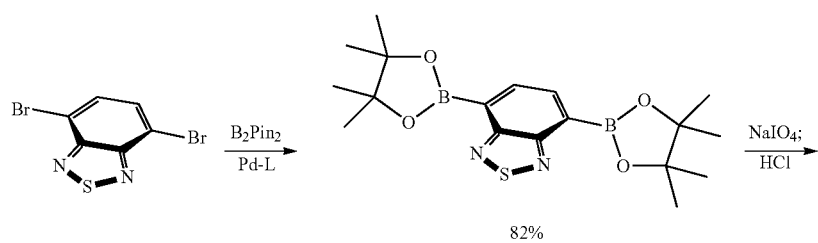
82%
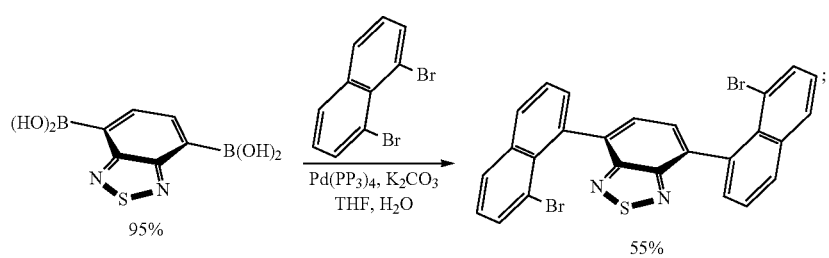
95%                                          55%

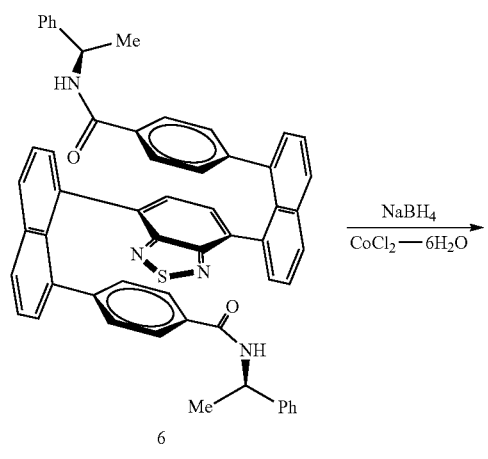
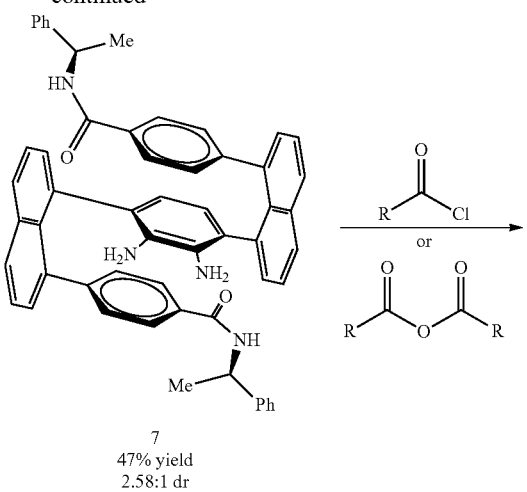
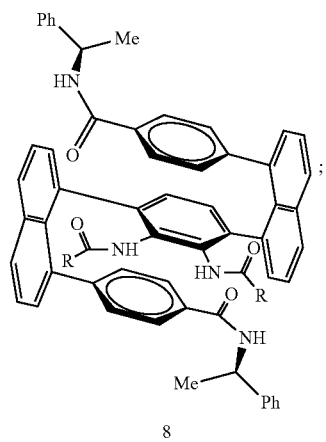
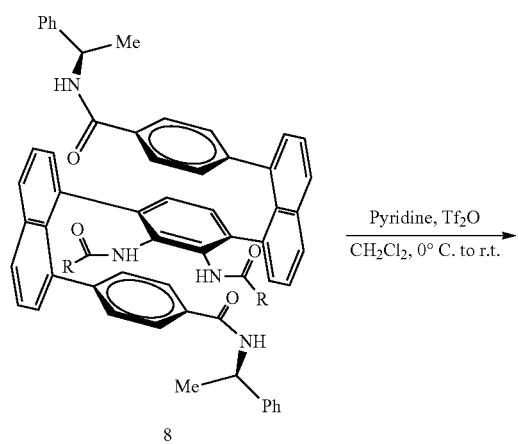
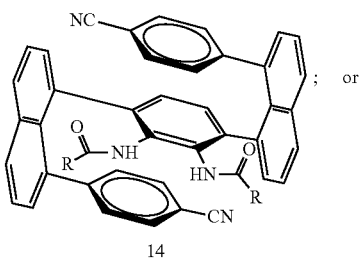
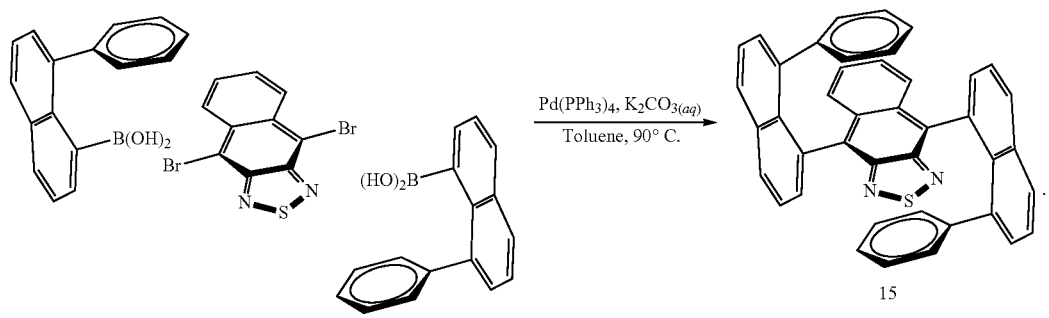

In one aspect, the multi-layer 3D material is a 2-amino-1,3-bis(8-phenylnaphthalen-1-yl)-1,3-dihydrobenzo[d][1,3,2]diazaphosphole 2-oxide (15a). In another aspect, the multi-layer 3D material is selected from at least one of:
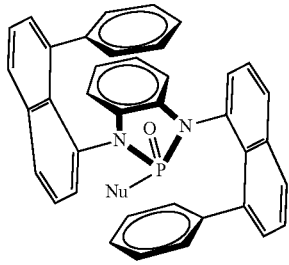
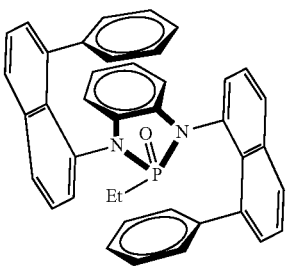
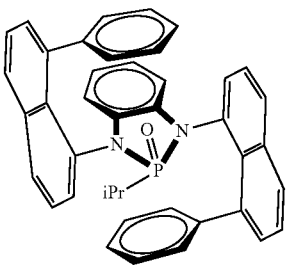
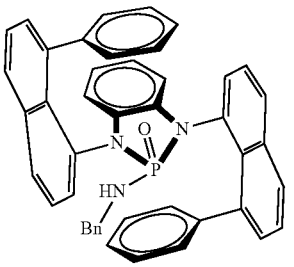
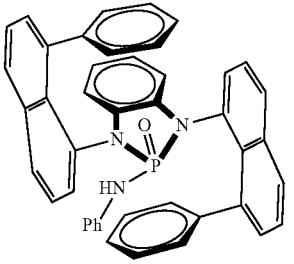
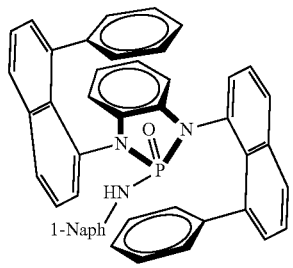
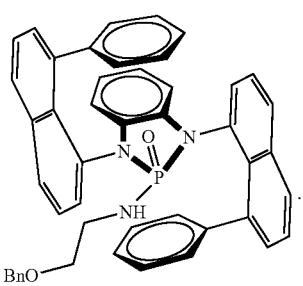
In another aspect, the multi-layer 3D material is selected from at least one of:
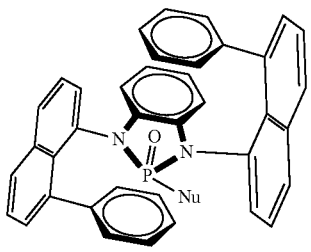
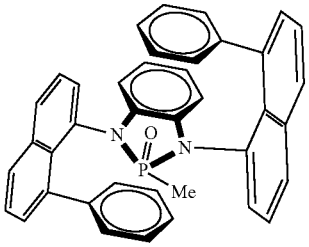
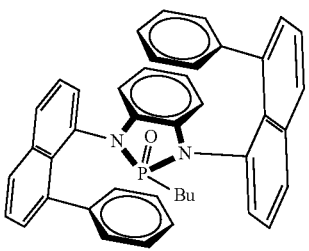

29
-continued
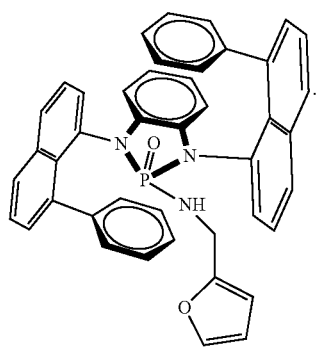
19
In another aspect, the product of formula comprises:
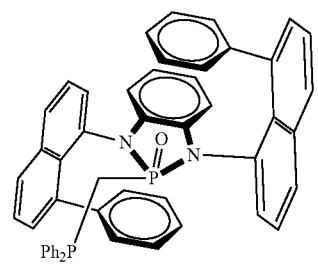
26
is made by a method comprising:
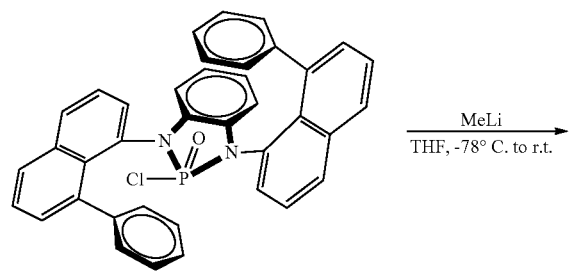
11b
→ MeLi, THF, -78° C. to r.t.
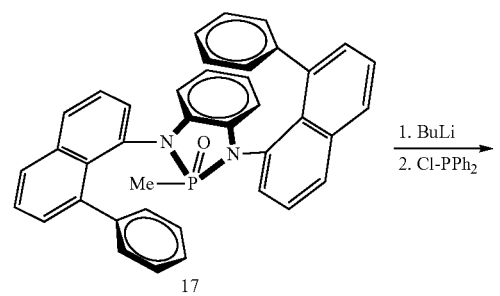
17
→ 1. BuLi
2. Cl-PPh₂
30
-continued
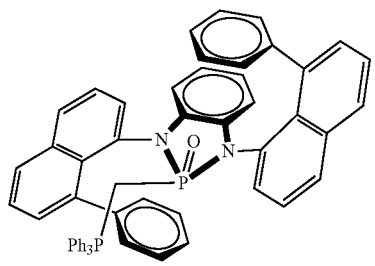
5
In another aspect, the product of formula comprises:
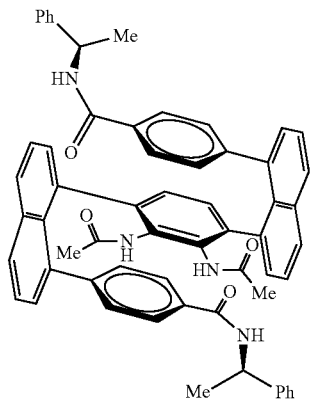
8a
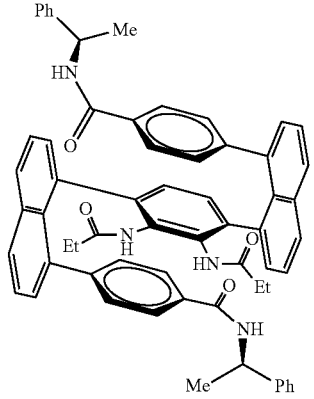
8b
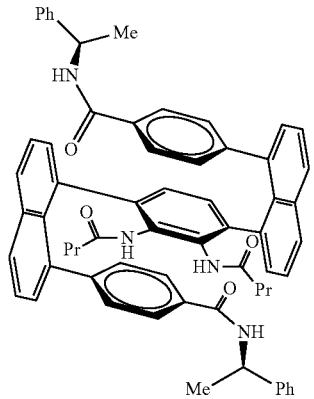
8c -continued
8d
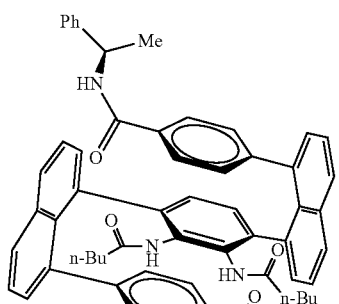
8e
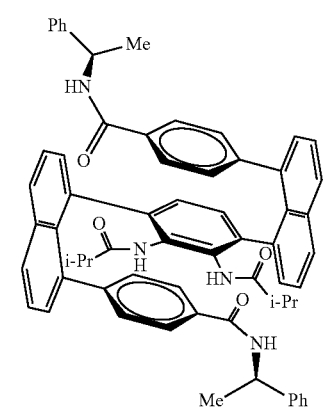
8f
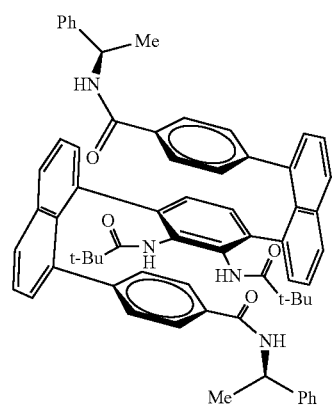
14a
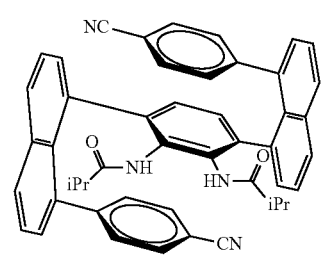
-continued
14b
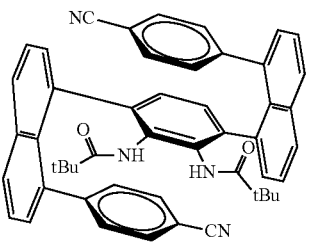
15
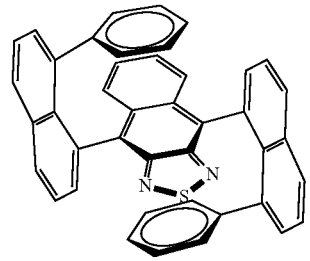
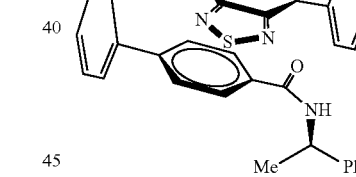
10a
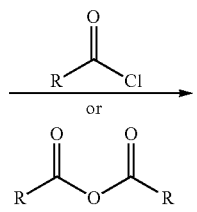
17

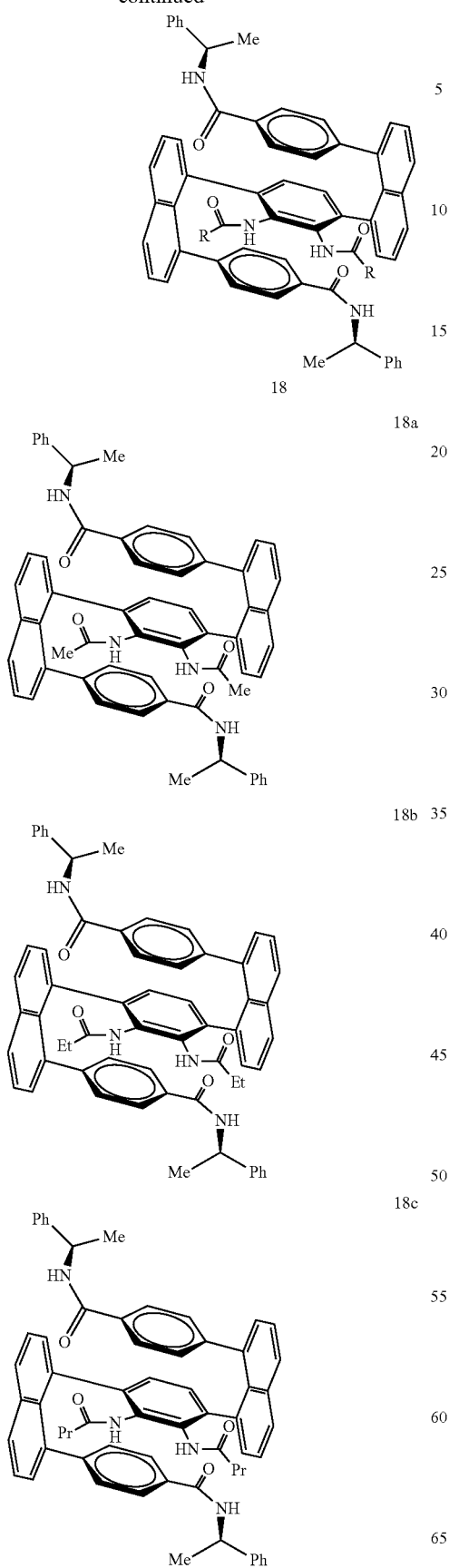
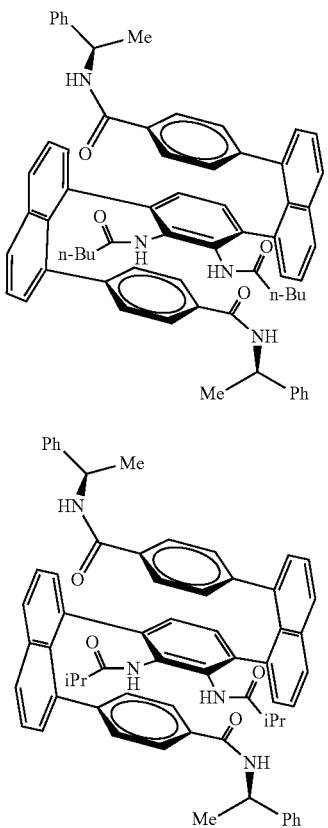
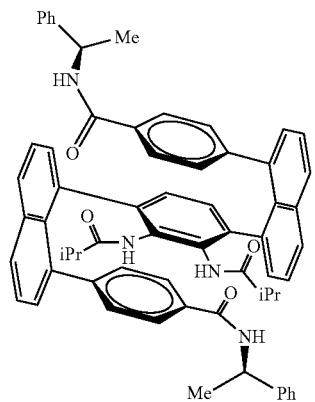
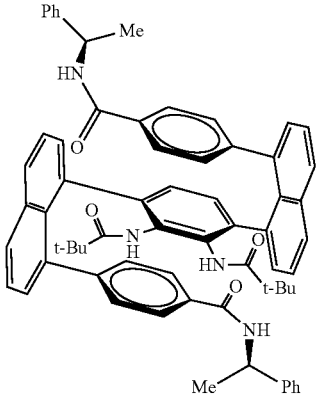
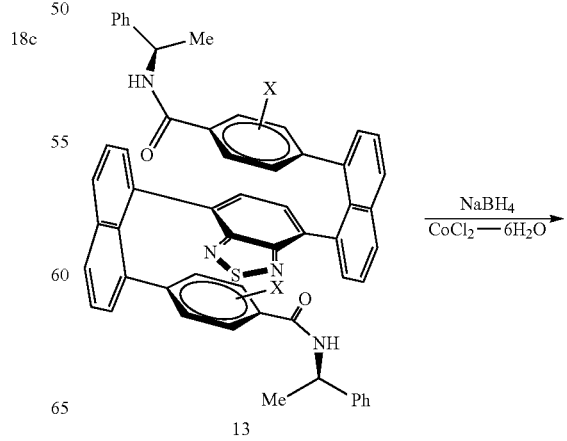

35
-continued
36
-continued
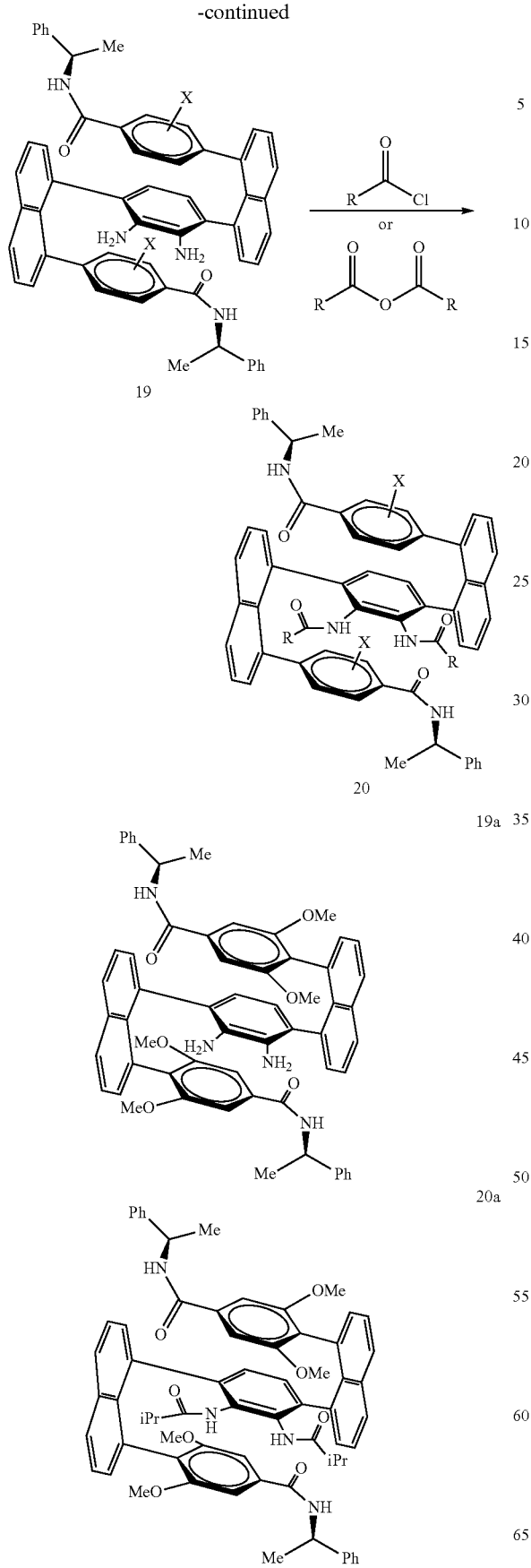
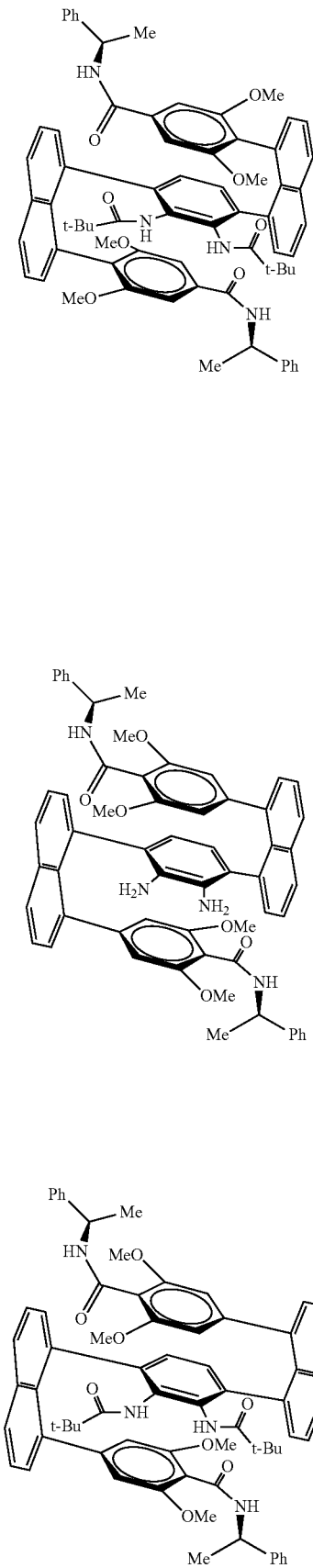

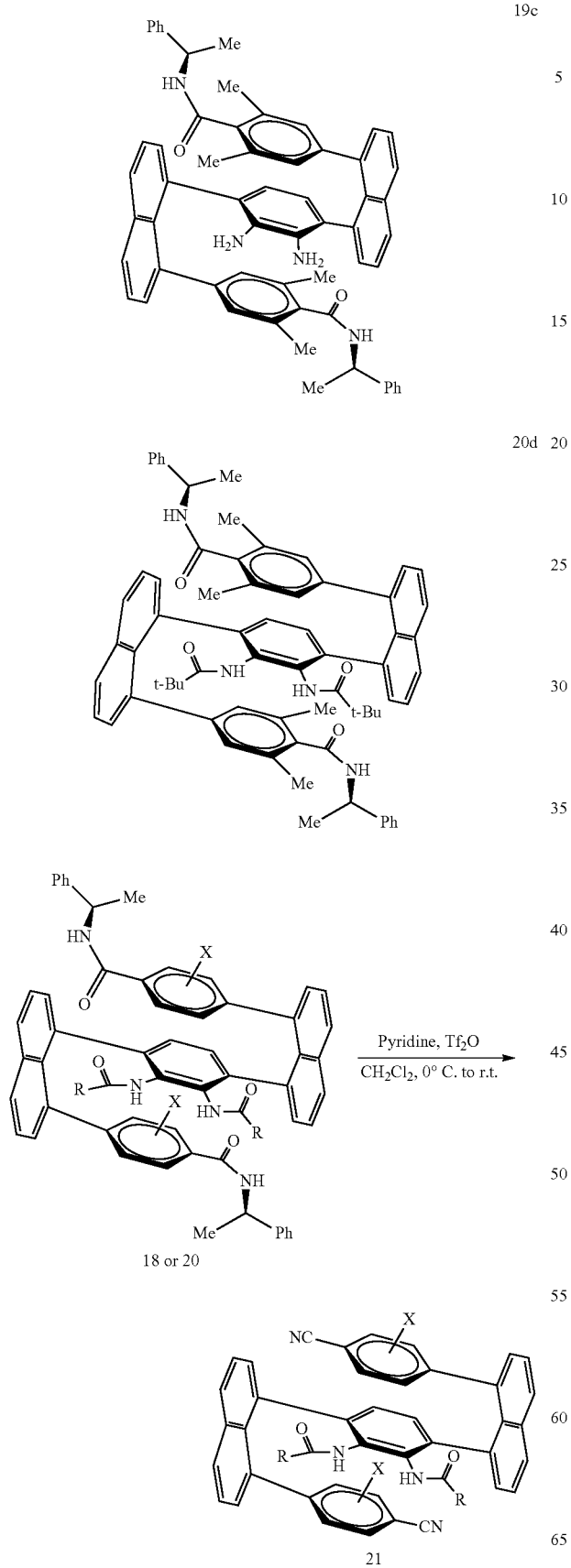
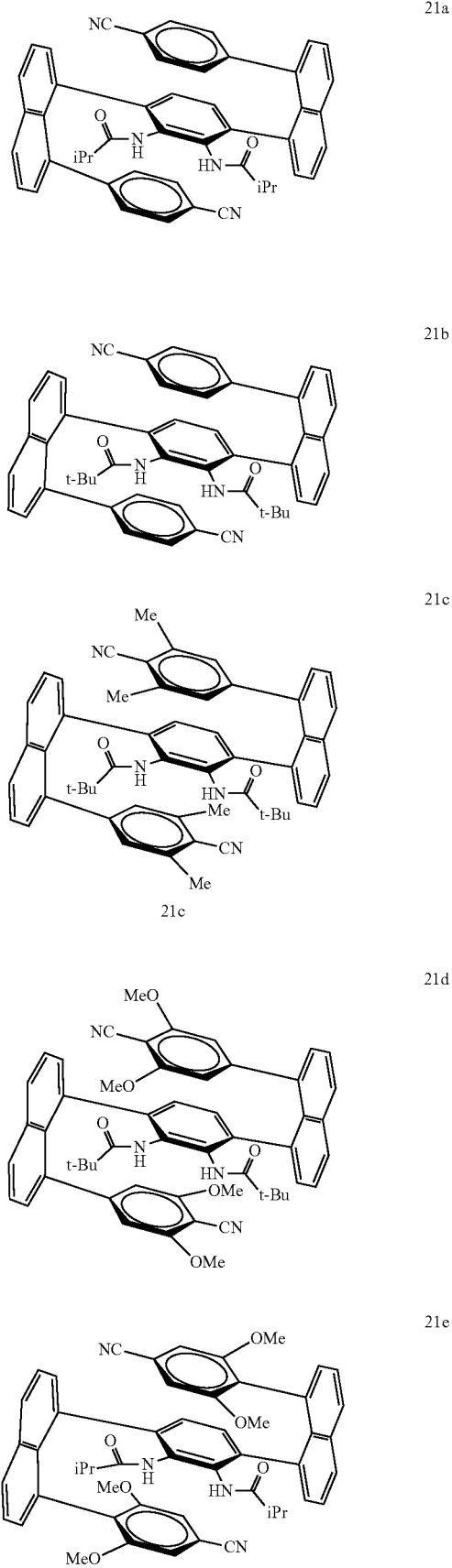

-continued
21f
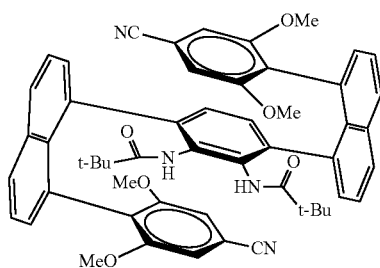
10e
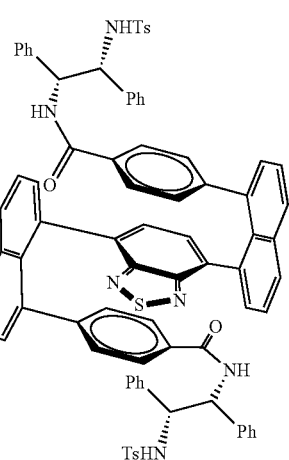
18e
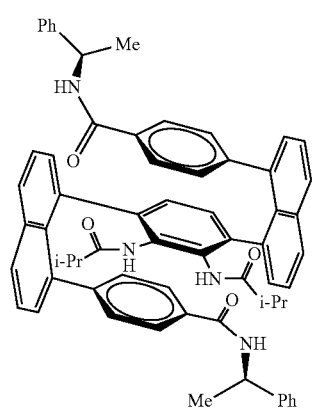
10a
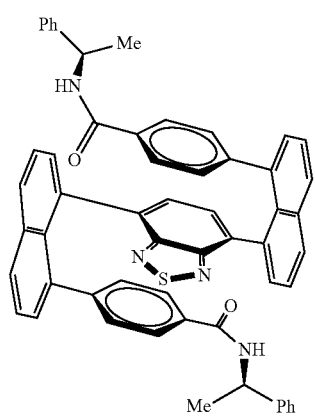
-continued
13a
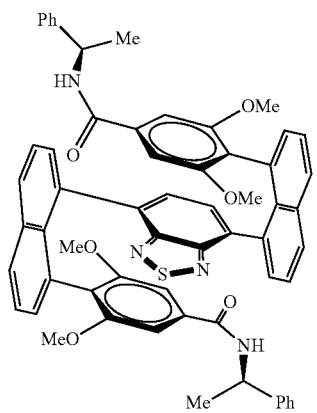
13c
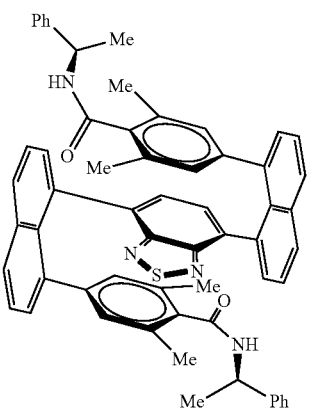
19a
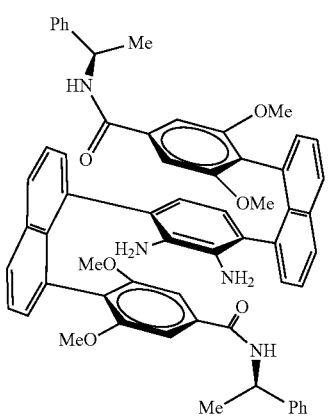
18a
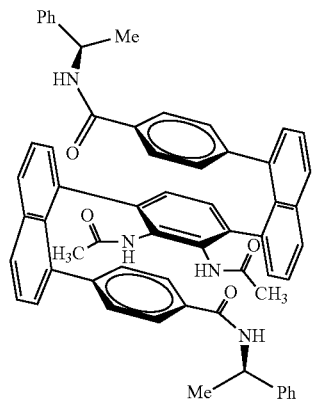

41
-continued

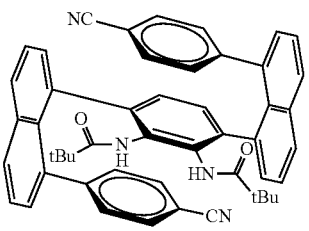

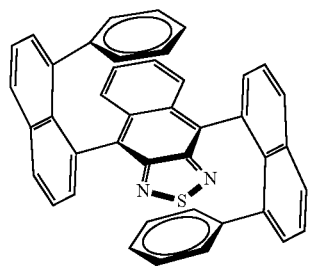

17

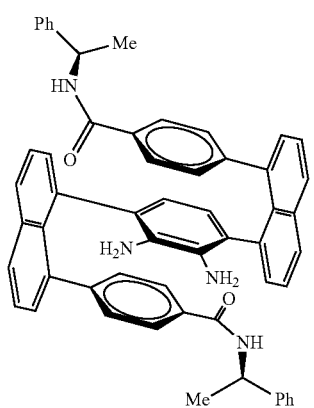

18f

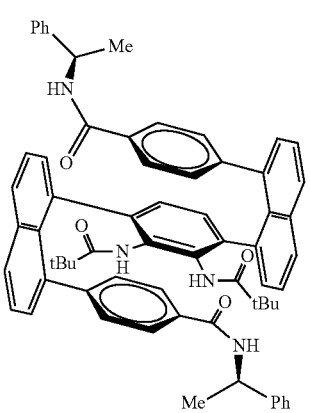

42
-continued

21b

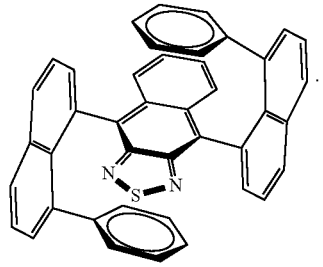

16

In another aspect, the first, the second, and the third layers have: a right-hand chirality, a left-hand chirality, or both the left- and the right-handed chirality. In another aspect, the first, the second, and the third layers each comprise a plane, and wherein: (a) one of the three planes is replaced by carbon-carbon triple bond (alkyne bridges and arms); (b) further comprising two additional layers having a right-hand chirality, a left-hand chirality, or both the left- and the right-handed chirality. In another aspect, the additional layers comprise at least one of: 4,4'-(2,7-dimethoxynaphthalene-1,8-diyl)bis(3-methoxybenzonitrile); N,N'-(1,8-bis (2-methoxyphenyl)naphthalene-2,7-diyl)bis(4-methylbenzenesulfonamide); 8,8"-dibromo-2,2",7,7"-tetramethoxy-1, 1':8',1"-ternaphthalene; (1'R)-8,8"-dibromo-2',7'-dimethoxy-1,1':8',1"-ternaphthalene; wherein, Br can be H, aliphatics, aromatics; MeO can be NHAc, NHTs, NH-protection groups, aromatics, alkylyl, alkenyls; N-(1-((8-([1,1'-biphenyl]-4-yl)naphthalen-1-yl)ethynyl)naphthalen-2-yl)-4-methylbenzenesulfonamide (Ts can be Ac, Ns, Fmoc. t-Boc, CBZ, etc., para Ph can be a halo, alkyl. Aryl. CN, N3, or NHAc. In another aspect, the multi-layer 3D material is a polymer and the first, the second, and the third layers can have a right-hand chirality, a left-hand chirality, or both the left- and the right-handed chirality. In another aspect, monomers are formed into one or more additional layers or polymers are above, below, or both above and below the first, the second, and the third layers.

In yet another embodiment, the present invention includes a Group-Assisted Purification (GAP) catalyst comprising: a multi-layer 3D material comprising: a first, a second, and a third layer, wherein each of the layers are arranged in a nearly parallel fashion with chirality along a center plane comprising the GAP-catalyst anchored by N,N-phosphonyl groups. In one aspect, the multi-layer 3D material comprises a first, a second, and a third layer, wherein each of the layers are arranged in a nearly parallel fashion with chirality along a center plane comprising:

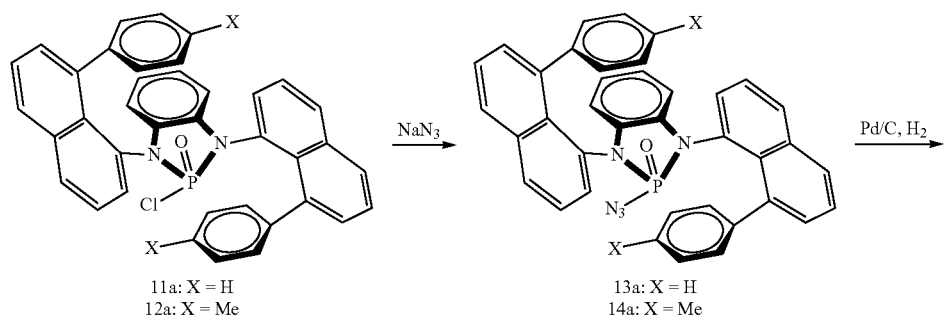
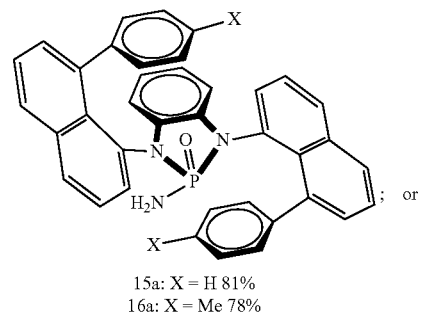
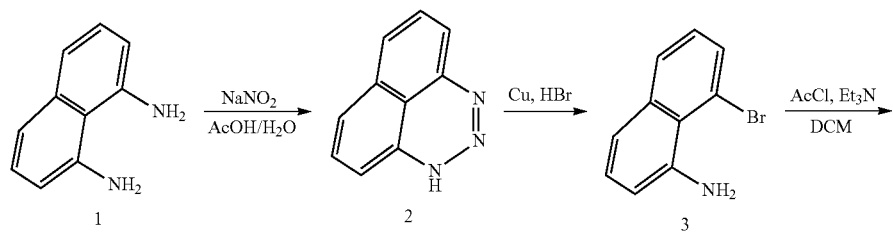
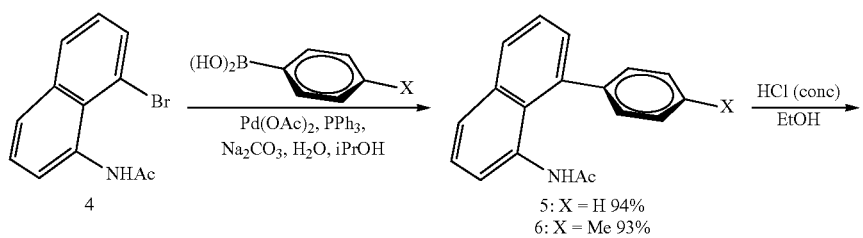
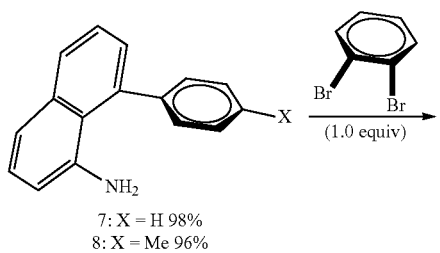
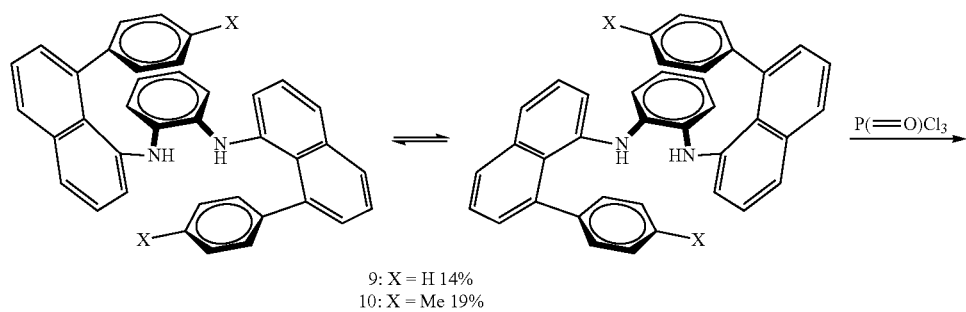

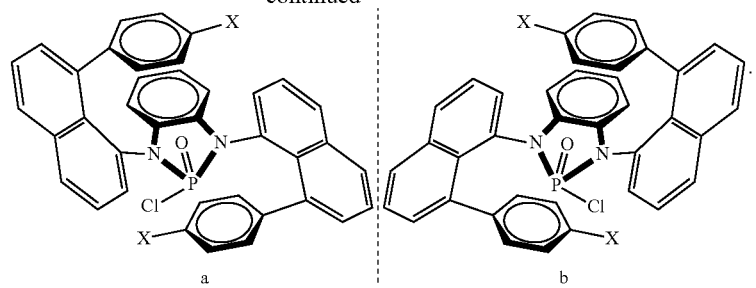
11: X = H 39%
12: X = Me 45%
In another aspect, the multi-layer 3D material is a 2-amino-1,3-bis(8-phenylnaphthalen-1-yl)-1,3-dihydrobenzo[d][1,3,2]diazaphosphole 2-oxide (15a). In another aspect, the multi-layer 3D material is selected from at least one of:
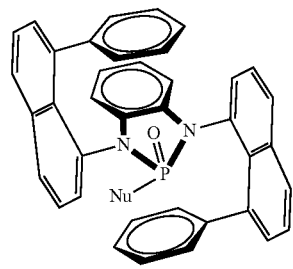
20
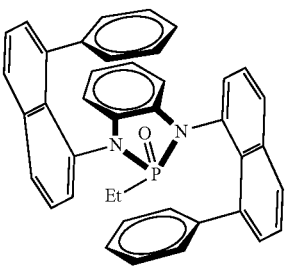
21
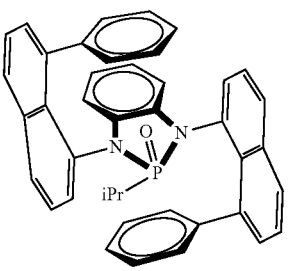
22
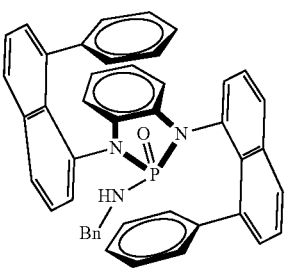
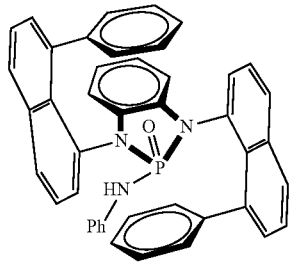
23
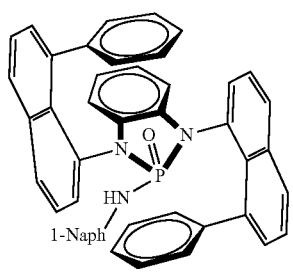
24
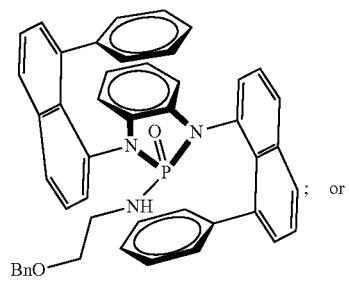
25
; or
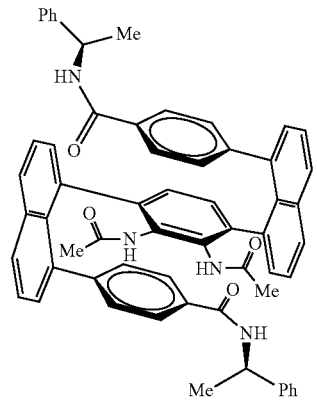
8a

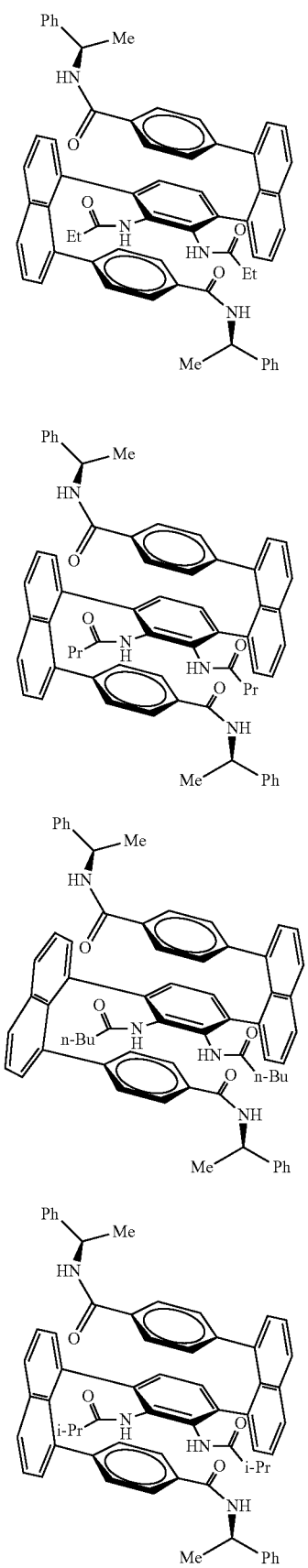
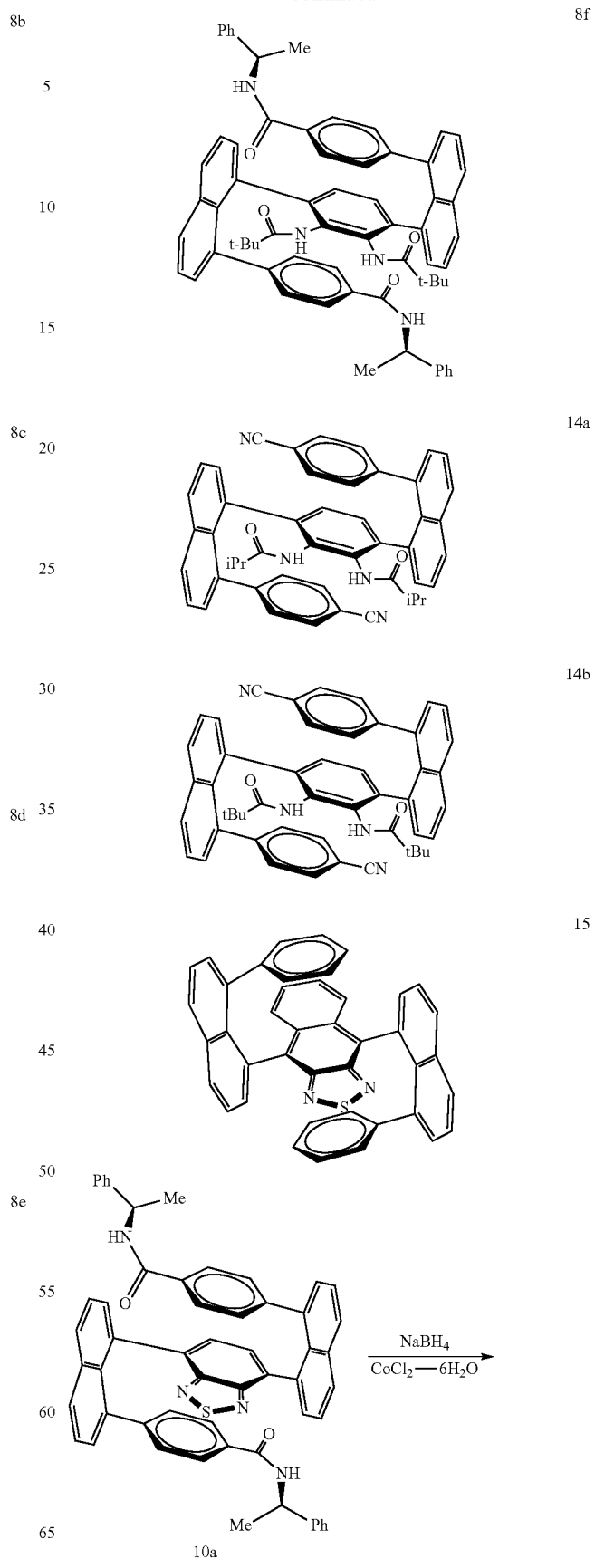

49
-continued
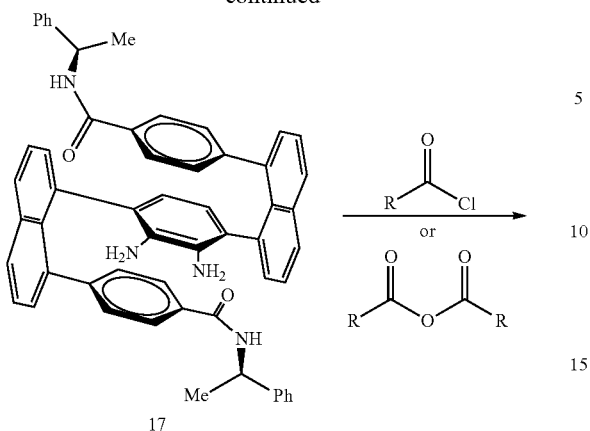
17
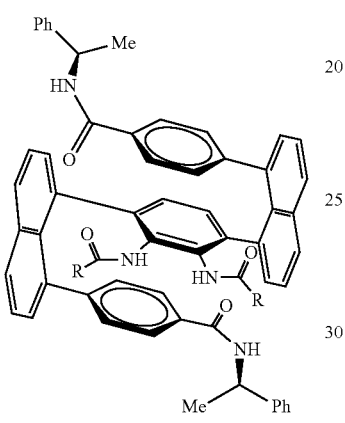
18
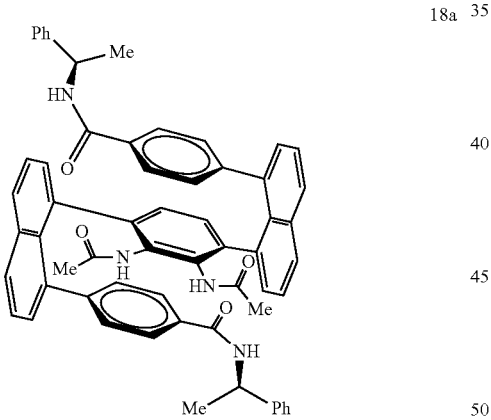
18a
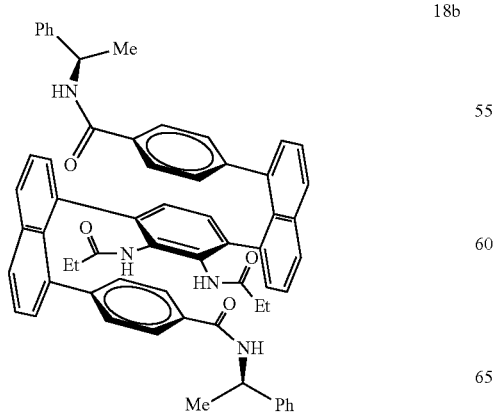
18b
50
-continued
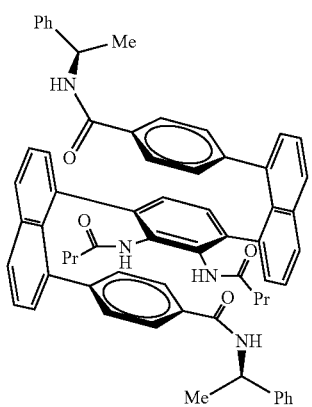
18c
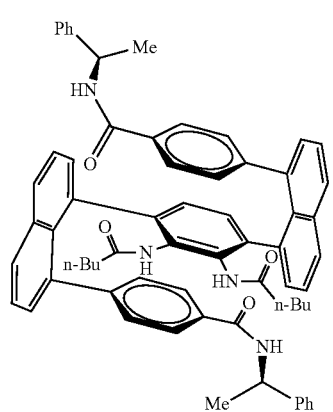
18d
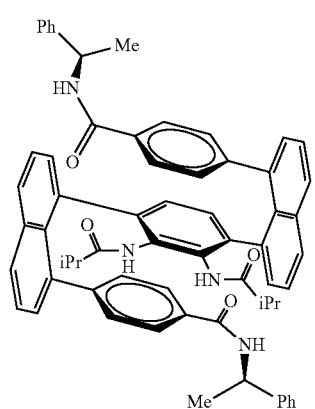
18e
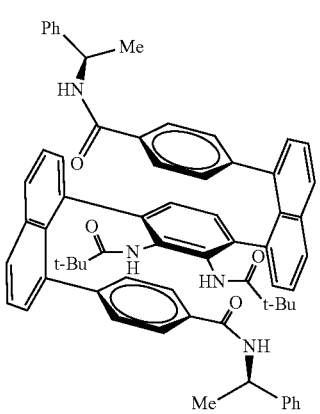
18f

51
-continued
52
-continued
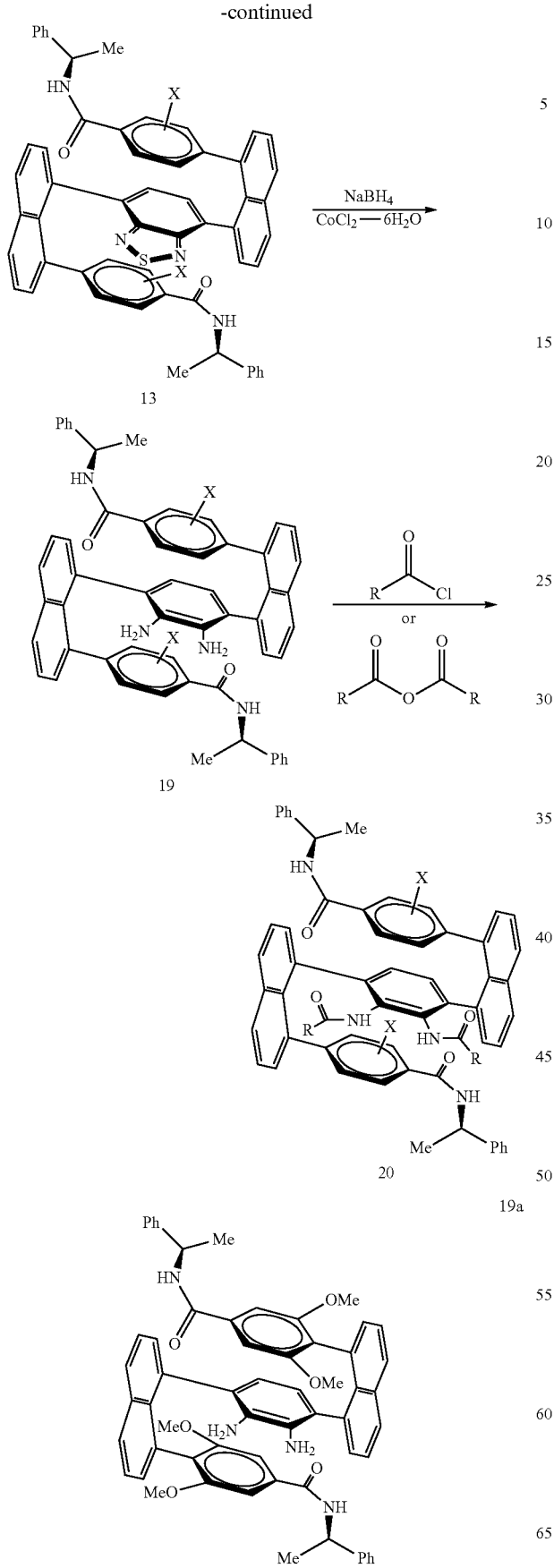
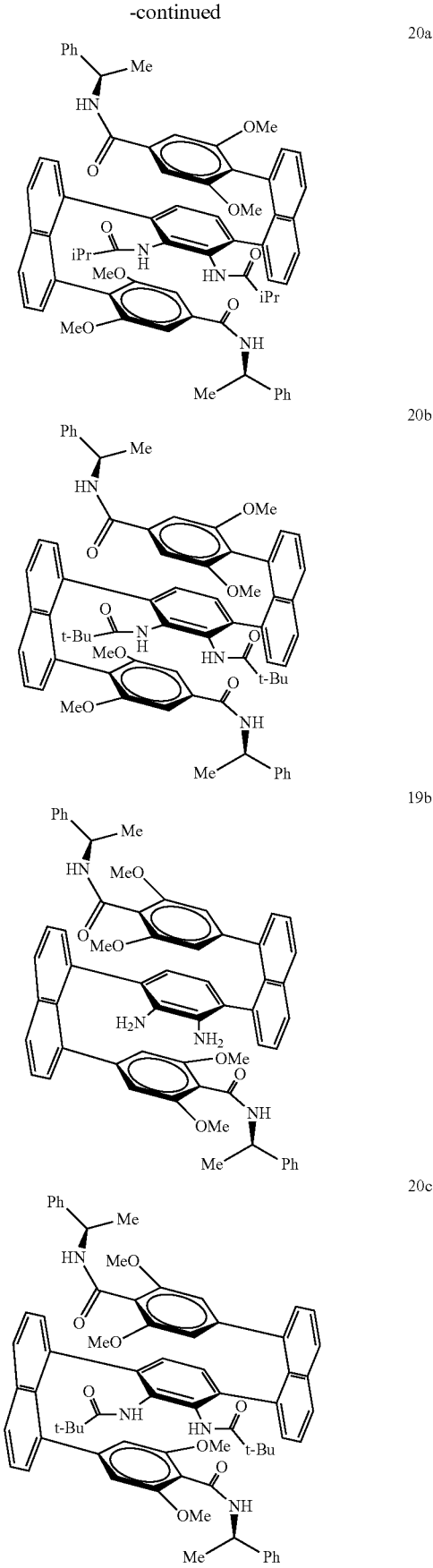

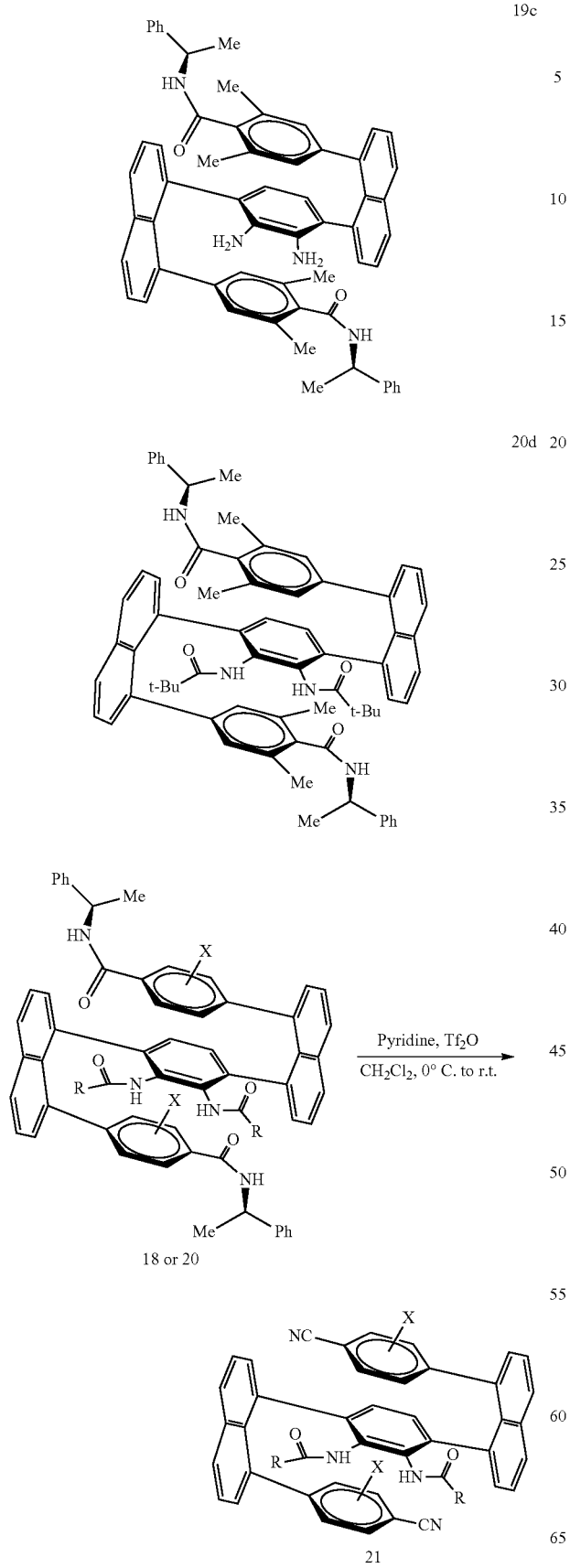
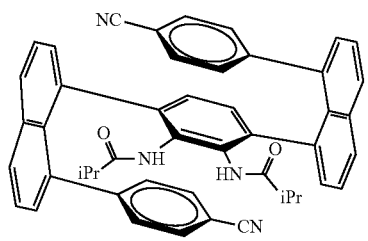
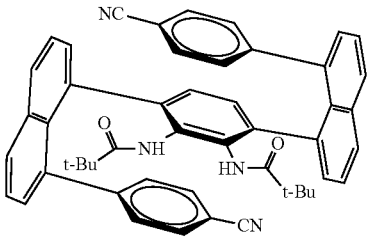
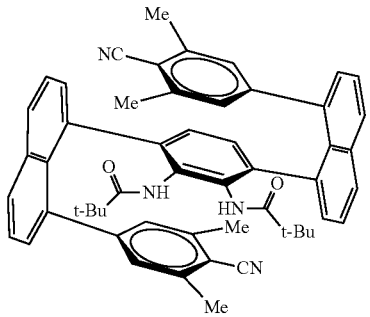
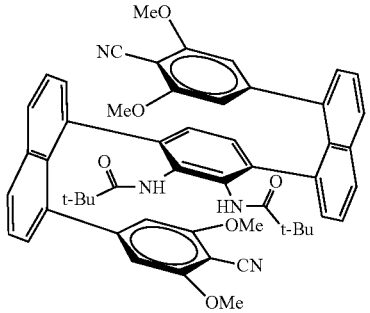
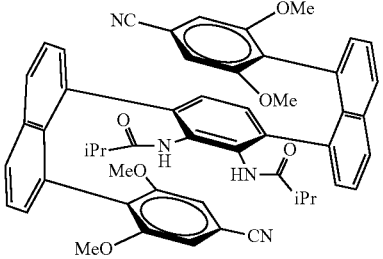

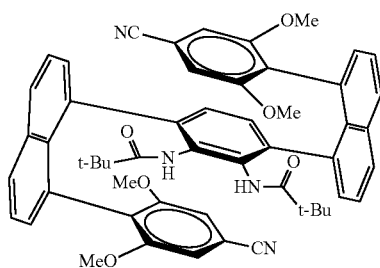
21f
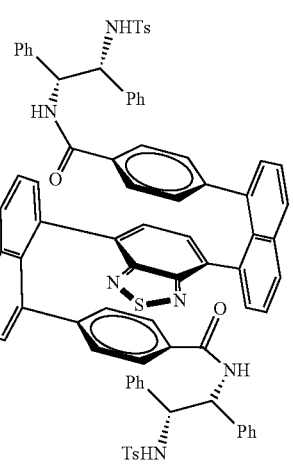
10e
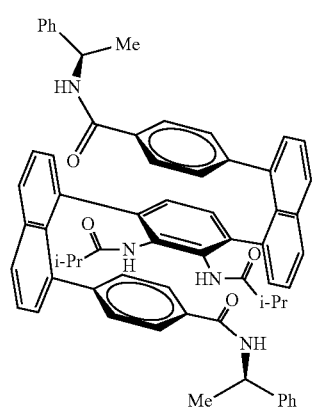
18e
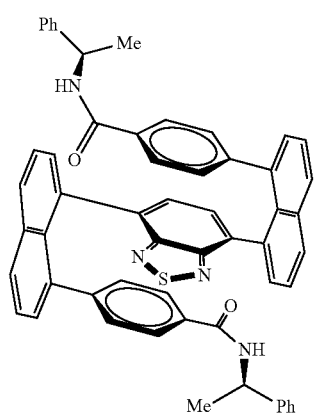
10a
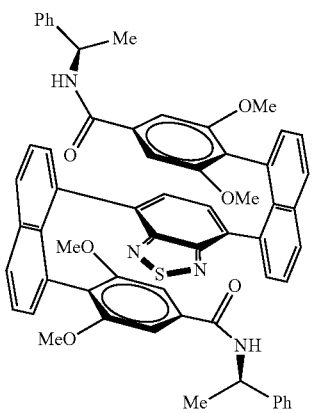
13a
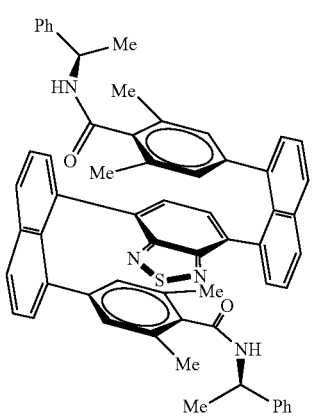
13c
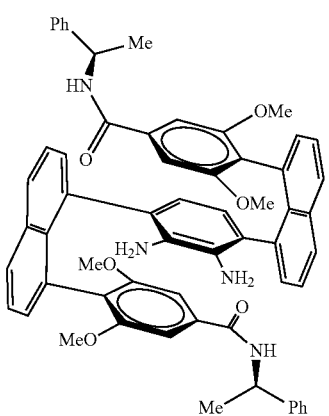
19a
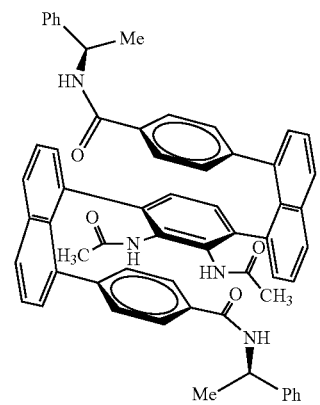
18a -continued
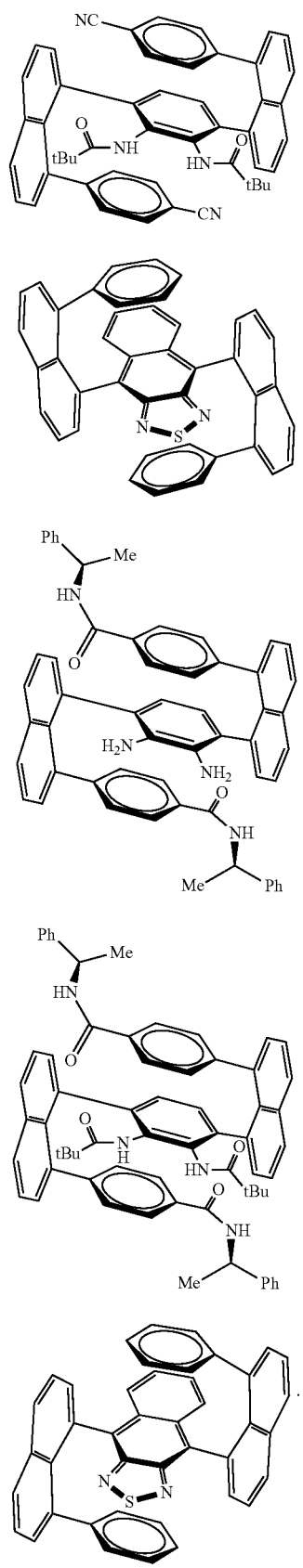
In another aspect, the multi-layer 3D material is selected from at least one of
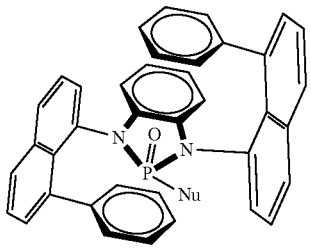
16
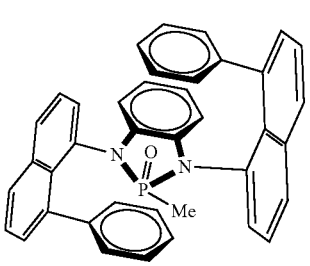
17
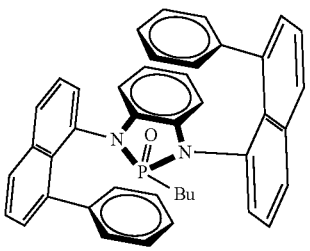
18
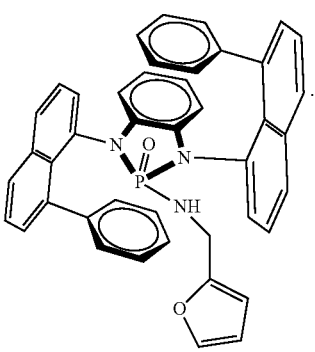
19
In another aspect, the product of formula:
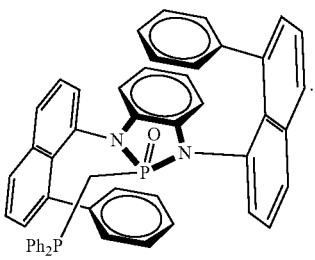
26 is made by a method comprising:

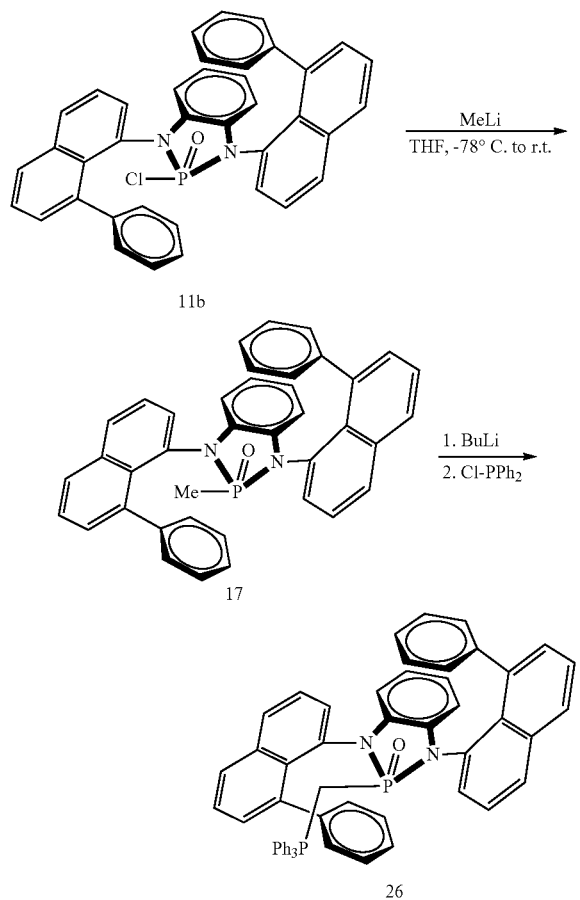

In another embodiment, the present invention also includes a method of conducting a synthetic reaction comprising: providing a Group-Assisted Purification (GAP) catalyst comprising a multi-layer 3D material comprising: a first, a second, and a third layer, wherein each of the layers are arranged in a nearly parallel fashion with chirality along a center plane comprising the GAP-catalyst anchored by NN-phosphonyl groups; and catalyzing a reaction in the presence of the GAP-catalyst. In one aspect, the multi-layer 3D material has a right-hand chirality, a left-hand chirality, or both a left- and a right-handed chirality. In another aspect, each of the first, second, and third layers are at least one of: anti, syn, or both anti and syn isomers. In another aspect, each of the first, second, and third layers are NN-phosphornyl amides. In another aspect, each of the first, second, and third layers comprise chiral or achiral N-phosphonyl- or N-phosphinyl groups. In another aspect, each of the first, second, and third layers comprise a Multi-Layer Organic Framework (M-LOF) of single organic molecules with pseudo $C_2$-chiral characteristics. In another aspect, the first, the second, and the third layers have: a right-hand chirality, a left-hand chirality, or both the left- and the right-handed chirality. In another aspect, the first, the second, and the third layers each comprise a plane, and wherein: (a) one of the three planes is replaced by carbon-carbon triple bond (alkyne bridges and arms); (b) further comprising two additional layers having a right-hand chirality, a left-hand chirality, or both the left- and the right-handed chirality. In another aspect, the additional layers comprise at least one of: 4,4'-(2,7-dimethoxynaphthalene-1,8-diyl)bis(3-methoxybenzonitrile); N,N'-(1,8-bis(2-methoxyphenyl)naphthalene-2,7-diyl)bis(4-methylbenzenesulfonamide); 8,8"-dibromo-2,2",7,7"-tetramethoxy-1,1':8',1"-ternaphthalene; (1'R)-8,8"-dibromo-2',7'-dimethoxy-1,1':8',1"-ternaphthalene; wherein, Br can be H, aliphatics, aromatics; MeO can be NHAc, NHTs, NH-protection groups, aromatics, alkylyl, alkenyls; N-(1-((8-([1,1'-biphenyl]-4-yl)naphthalen-1-yl)ethynyl)naphthalen-2-yl)-4-methylbenzenesulfonamide (Ts can be Ac, Ns, Fmoc, t-Boc, CBZ, etc., para Ph can be a halo, alkyl, Aryl, CN, N3, or NHAc. In another aspect, the multi-layer 3D material is a polymer and the first, the second, and the third layers can have a right-hand chirality, a left-hand chirality, or both the left- and the right-handed chirality. In another aspect, monomers are formed into one or more additional layers or polymers are above, below, or both above and below the first, the second, and the third layers.

BRIEF DESCRIPTION OF THE DRAWINGS

For a more complete understanding of the features and advantages of the present invention, reference is now made to the detailed description of the invention along with the accompanying figures and in which:

FIG. 1A shows the DNA i-motif and mycobacterial proteins of the prior art. FIG. 1B shows a two-layer planar chirality of the prior art. By contrast, FIG. 1C shows the mirror models and structures of multi-layer 3D molecules of the present invention.

FIG. 2A shows more efficient GAP groups. FIG. 2B shows the synthesis of N,N-Diaryl benzene-1,2-diamines.

FIGS. 3A, 3B, 3C shows the physical appearance of N,N-bis(8-phenylnaphthalen-1-yl)benzene-1,2-diamine. FIG. 3D shows a Hornet' nest pattern of product 21.

FIG. 4A shows the synthesis of 8-phenylnaphthalen-1-amine precursors and N,N-phosphonyl chlorides. FIG. 4B shows the synthesis of N,N-phosphonyl azides and amides.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

Figure 1A:
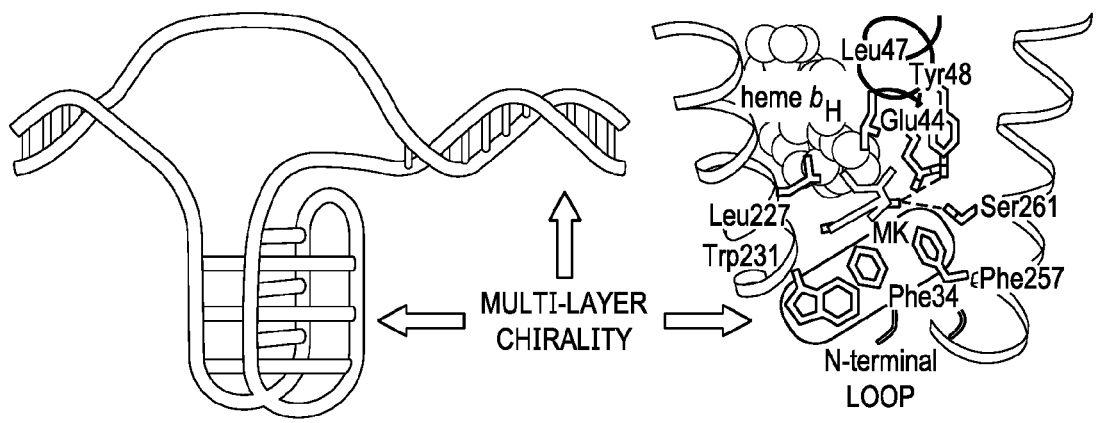
FIGS. 1A to 1C show various examples of planar chirality.
Figure 1B:
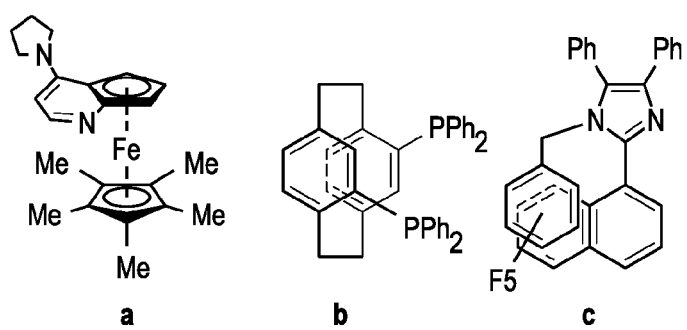
Figure 1C:
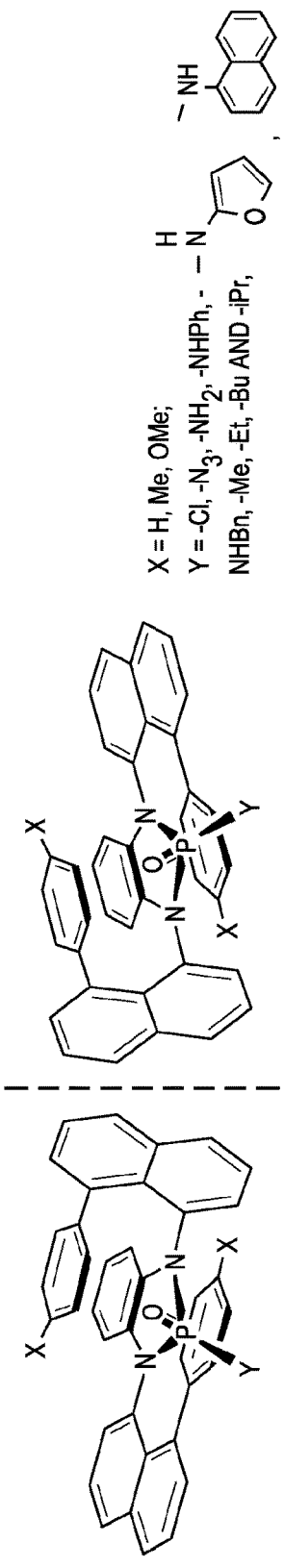
Figure 1D:
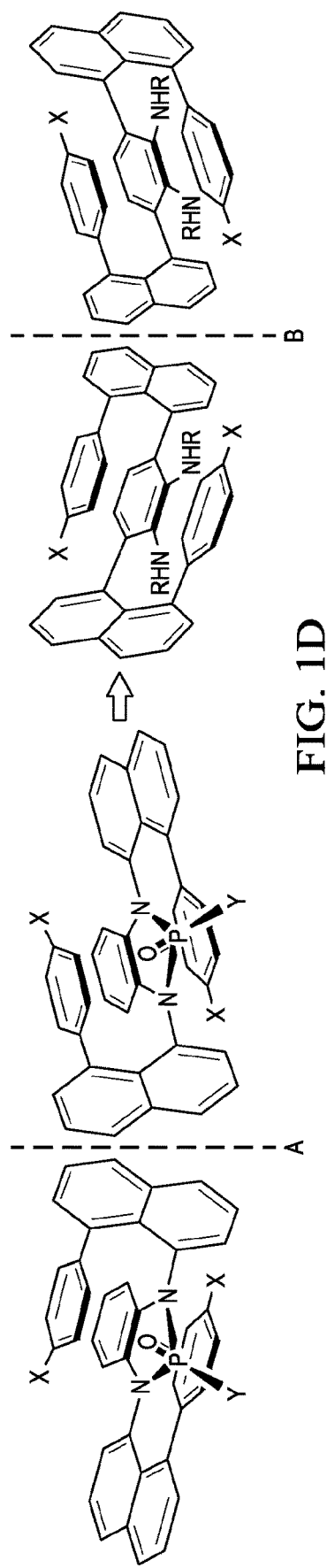
FIG. 1D shows the design of a fully C—C bond-anchored chiral multi-layer 3D frameworks.

In this work, the inventors present the discovery of an unprecedented chirality of multi-layer and three dimensions. This chirality belongs to a type of Multi-Layer Organic Framework (M-LOF) of single organic molecules with pseudo C2-chiral characteristics. The key element of this chirality is characterized by three layers of planes that are arranged nearly in parallel fashion with one on top and another one down from planar center as presented in FIG. 1C (molecular models & chemical structures). FIG. 1D shows the design of a fully C—C bond-anchored chiral multi-layer 3D frameworks.

Figure 2A:
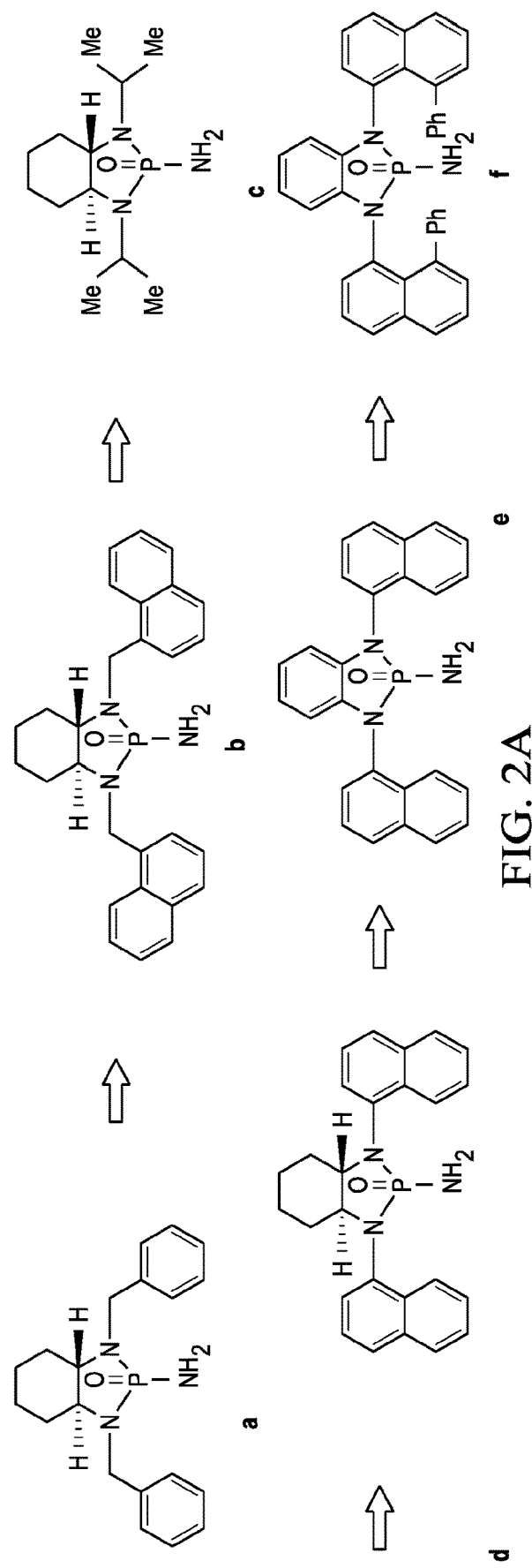
FIGS. 2A and 2B show the design and synthesis of the multi-layer 3D.

This discovery resulted from the use of the present inventor's Group-Assisted Purification (GAP) chemistry by taking advantage of N-phosphonyl imine reagents and their usages for asymmetric reactions (FIG. 2A, a-c). In this example, it was found that chiral and achiral N-phosphonyl- or N-phosphinyl groups avoided the formation of oily and sticky products; instead, they afforded special crystalline solids that can be purified simply by washing crude products with common petroleum solvents without the use of column chromatography and recrystallization. It was also found that these GAP groups can increase chemical yields, particularly for peptide synthesis, which is defined as Group-Assisted Synthesis (GASyn). GASyn chemistry has resulted in nearly quantitative yields for each step of polypeptide synthesis. In addition, GAP and GASyn chemistry has made it possible for the Fmoc-based peptide synthesis to be performed in solution phase synthesis for the first time. In pharmaceutical industry, the synthesis of 1 kg of peptide and oligonucleotide drugs (10-15 mer products), 3000-15000 kg of wastes are generated mostly from purification. The GAP chemistry thus provides a unique environmentally friendly tool by taking advantages of both solution-phase and solid-phase syntheses (50-52) without much of their shortcomings. Indeed, GAP chemistry is the only chemical methodology that combines four aspects into one: reagent, reaction, separation and purification; it requires the consideration of both reactants and products on their chemical and physical factors in regard to reactivity, selectivity, stability and solubility. For asymmetric synthesis and catalysis, diastereo-, enantio- and chemoselectivity have to be taken into account concurrently.

Typical GAP functionality is represented by N,N-phosphonyl amides with their development process described in FIG. 2A. Continuing the search for more efficient GAP functionality has been a main goal has been pursued by the present inventors to provide more environmentally friendly and greener syntheses, particularly, asymmetric synthesis. In one example, the strategy was to replace NN-dialkyl motifs of GAP functionality with their naphthyl counterparts, which improves GAP synthesis (FIG. 2A-d). This novel chemistry allows, for the first time, to create new chirality if the chiral centers on vicinal cyclohexyl diamine framework is removed, from which two individual enantiomers of NN-phosphonyl GAP amides are generated.

As shown in FIG. 2A, the synthesis of naphthyl-based GAP functionality was started with the Buchwald-Hartwig cross coupling of 1-bromo-8-phenylnaphthalene with (1S, 2S)-cyclohexane-1,2-diamine or vicinal benzene diamine under a slightly modified condition consisting of Pd(OAc)2 and butylphosphine as catalysts and potassium tert-butoxide as base additive. The reactions proceeded smoothly to give the corresponding coupling products in over 80% chemical yields (FIG. 2A-d & e). The following steps included cyclization of resulting NN-protected diamines with phosphoryl trichloride in pyridine, displacement with sodium azide in DMF, and Pd/C-catalyzed hydrogenation to give NN-phosphornyl amides in overall over 65% yields. While the product of FIG. 2A-d showed the arrangement of di-1-nathphyl rings in anti configuration; however, product of FIG. 2A-e were formed as a mixture of anti and syn isomers, which can be separated via column chromatography. Increasing temperature of this mixture in dichloromethane to 50° C. for over 5 hours, these two isomers reached equilibrium with two paired of enantiomeric peaks as 25% for each as revealed by chiral HPLC analysis.

Figure 2B:
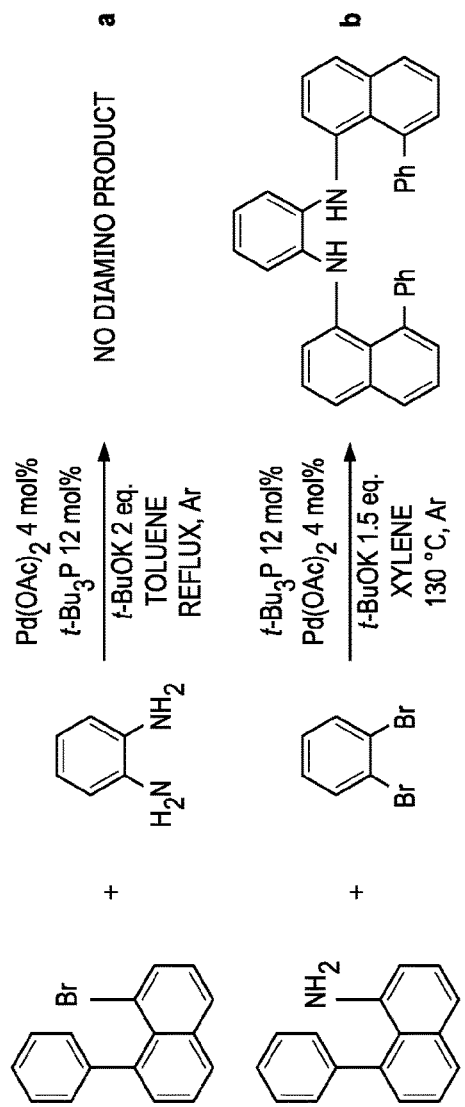
Figure 2C:
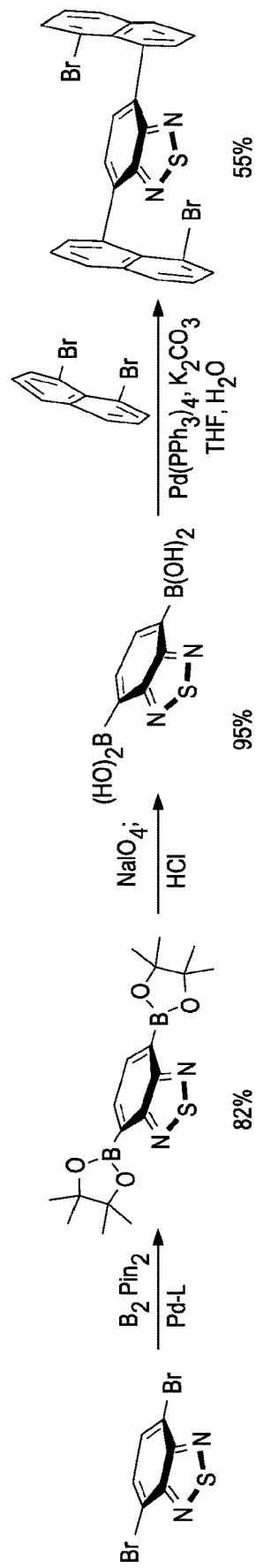
FIG. 2C shows the Scheme for Synthesis of 4,7-bis(8-bromonaphthalen-1-yl)benzo[c][1,2,5]thiadiazole.
Figure 4A:
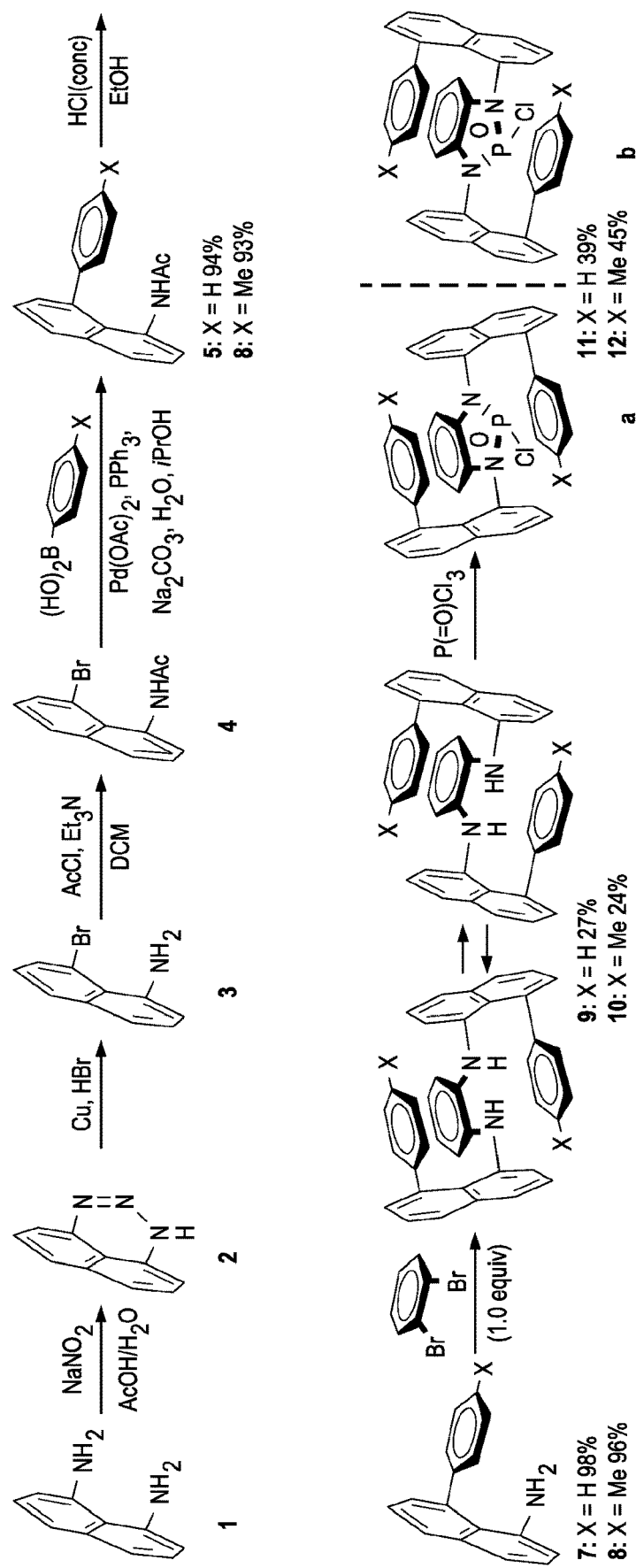
FIGS. 4A and 4B shows the synthetic routes.
Figure 4B:
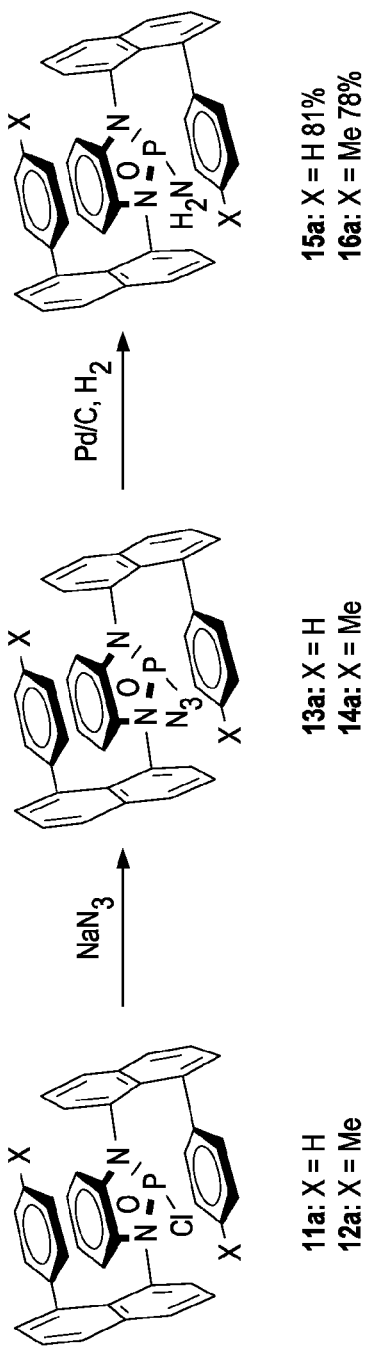

Next, the NN-phosphonyl GAP functionality was changed by introducing a phenyl group onto 1-bromonaphthalene on its position 8 to restrict the axial flexibility so as to control anti isomerism of N,N-di-1-nathphyls predominantly. The synthesis was started with the Buchwald-Hartwig cross coupling (53,54) between vicinal benzene diamine and 1-bromo-8-phenylnaphthalene. Surprisingly, the coupling reaction resulted in a complex mixture with nearly no formation of N,N-protected diamino product under the same condition as the above (FIG. 2B, equation a). Other similar modifications on catalytic conditions all failed to result in any promising outcomes. The strategy was thus changed to use 1,2-dibromobezene for the reaction with 1-amino-8-phenylnaphthalene under Pd(OAc)$_2$-based catalytic systems. Among three common phosphines (Bu$_3$P, t-Bu$_3$P and Ph$_3$P), only t-Bu$_3$P gave promising results when reaction was performed by refluxing in toluene for three days. The use of Pd(OAc)2 and t-Bu3P in 4 mol % and 10 mol %, respectively, afforded the coupling product, N,N-bis(8-phenylnaphthalen-1-yl)benzene-1,2-diamine in a chemical yield of 15%. Replacing toluene with xylenes as solvents under the similar condition increased the formation of desired product to 27% yield (FIG. 2B, equation b); the reaction was run at 130° C. for 16 hours to completion. Although the yield of this step is still much lower than that of normal cross coupling reactions, it enabled the following steps to be continued to achieve NN-phosphonyl GAP amides (FIG. 4). FIG. 2C shows the Scheme for Synthesis of 4,7-bis(8-bromonaphthalen-1-yl)benzo[c][1,2,5]thiadiazole.

Figure 3A:
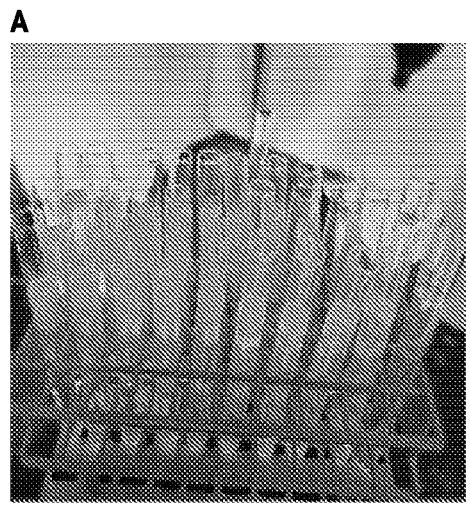
FIGS. 3A to 3D shows the physical characteristics of diamino products.
Figure 3B:
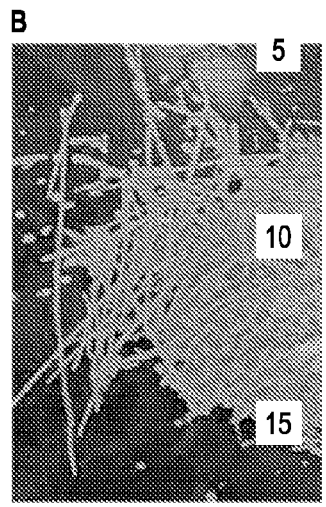
Figure 3C:
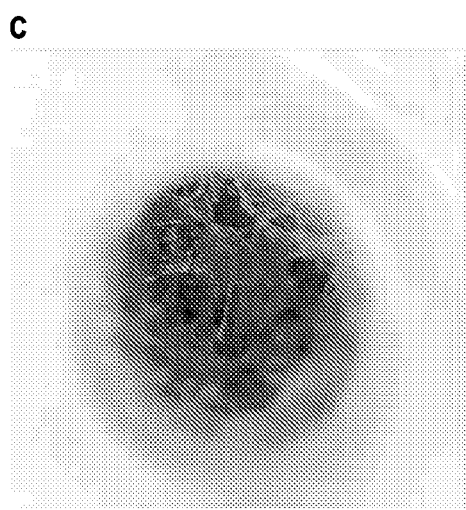

While performing the C—N coupling reactions, N,N-bis(8-phenylnaphthalen-1-yl)benzene-1,2-diamine (9) was found to be show green colored shining under irradiation under UV light (FIG. 3A). A major unknown side product also shines with purple color under UV irradiation. This product was formed as various long bars of firm solids with up to a length of a few centimeters (FIG. 3B); When they are evaporated in a relatively smaller flask, a nest-work of firm solid was formed, which filled the majority flask space (FIG. 3C). Single crystals of this product were obtained from co-solvent of EtOAc/hexane during a period of two weeks; the X-ray structural analysis revealed that each phenyl ring is nearly parallel to the naphthylene ring of their neighboring 8-phenylnaphthalen-1-yl group (not shown). There was no hydrogen bonding formation existing between two amino groups; and there is no intermolecular hydrogen bonding observed either. Interestingly, the intermolecular packing of N,N-bis(8-phenylnaphthalen-1-yl)benzene-1,2-diamine shows a helix type of structural arrangement (not shown).

The total synthesis (FIG. 4) of this new chirality was started from oxidative cyclization by reacting naphthalene-1,8-diamine with sodium nitrite in aqueous media containing acetic acid to give 1H-naphtho[1,8-de][1,2,3]triazine (2). Ring-opening of this triazine was performed by treating with metal copper in hydrogen bromide. The resulting 8-bromonaphthalen-1-amine (3) was converted to N-(8-bromonaphthalen-1-yl)acetamide (4), followed by Suzuki coupling to afford N-acetyl 8-phenylnaphthalen-1-amine (5). 8-Phenylnaphthalen-1-amine (7), was generated by acidic hydrolysis with concentrated aqueous HCl, which is subjected to the Buchwald-Hartwig C—N double cross couplings.

The NN-diamino cross coupling product was anticipated to exist in the form of two major enantiomeric conformers (9), which are not distinguishable by chiral HPLC. However, after they are cyclized into 2-chloro-1,3-bis(8-phenylnaphthalen-1-yl)-1,3-dihydrobenzo[d][1,3,2]diazaphosphole 2-oxide (11), two individual enantiomers can be analyzed and separated through analytical and preparative chiral HPLC columns, respectively. At this cyclization step, previous conditions for forming amides by treating diamines with in triethyl amines or pyridine failed to give any cyclization product for case FIG. 2A-f, although they worked well for cases of FIG. 2A-a to FIG. 2A-e. The cyclization reaction was successfully conducted by deprotonating N,N-bis(8-phenylnaphthalen-1-yl)benzene-1,2-diamines (9) with n-butyl lithium followed by treating with trichlorophosphine oxide at −78° C. in dried THF. This cyclization difficulty is probably due to the large steric effect from the phenyl group on position 8 of naphthalene ring, this would also be responsible for the incomplete conversion of this reaction. A yield of 39% was obtained at this step while the remained 1,2-diamine starting material was recovered for re-use via column chromatography in 48% yield.

Attempts were made to obtain single crystals of individual enantiomers of 2-chloro-1,3-bis(8-phenylnaphthalen-1-yl)-1,3-dihydrobenzo[d][1,3,2]diazaphosphole 2-oxide (N-phosphonyl chloride, 11a) without success. Pleasantly, the inventors achieved X-ray diffraction analysis of crystals of 2-amino-1,3-bis(8-phenylnaphthalen-1-yl)-1,3-dihydrobenzo[d][1,3,2]diazaphosphole 2-oxide (15a) (not shown), which was derived from the above N,N-phosphonyl chloride through the formation of corresponding azide precursor, which eventually enabled the absolute structure of the N-phosphonyl chloride to be determined indirectly. Also, the effort on obtaining single crystals for 2-azido-1,3-bis(8-phenylnaphthalen-1-yl)-1,3-dihydrobenzo[d][1,3,2]diazaphosphole 2-oxide (13a) were unsuccessful. Also unsuccessful were finding chiral analytical HPLC conditions for the azide racemic samples. Quantitative yields were obtained at the azide displacement step when the reaction was performed in acetonitrile at 90° C., the resulting N,N-phosphonyl azide was directly subjected to the final Pd/C catalyzed hydrogenation which showed quantitative yields as well.

Figure 5:
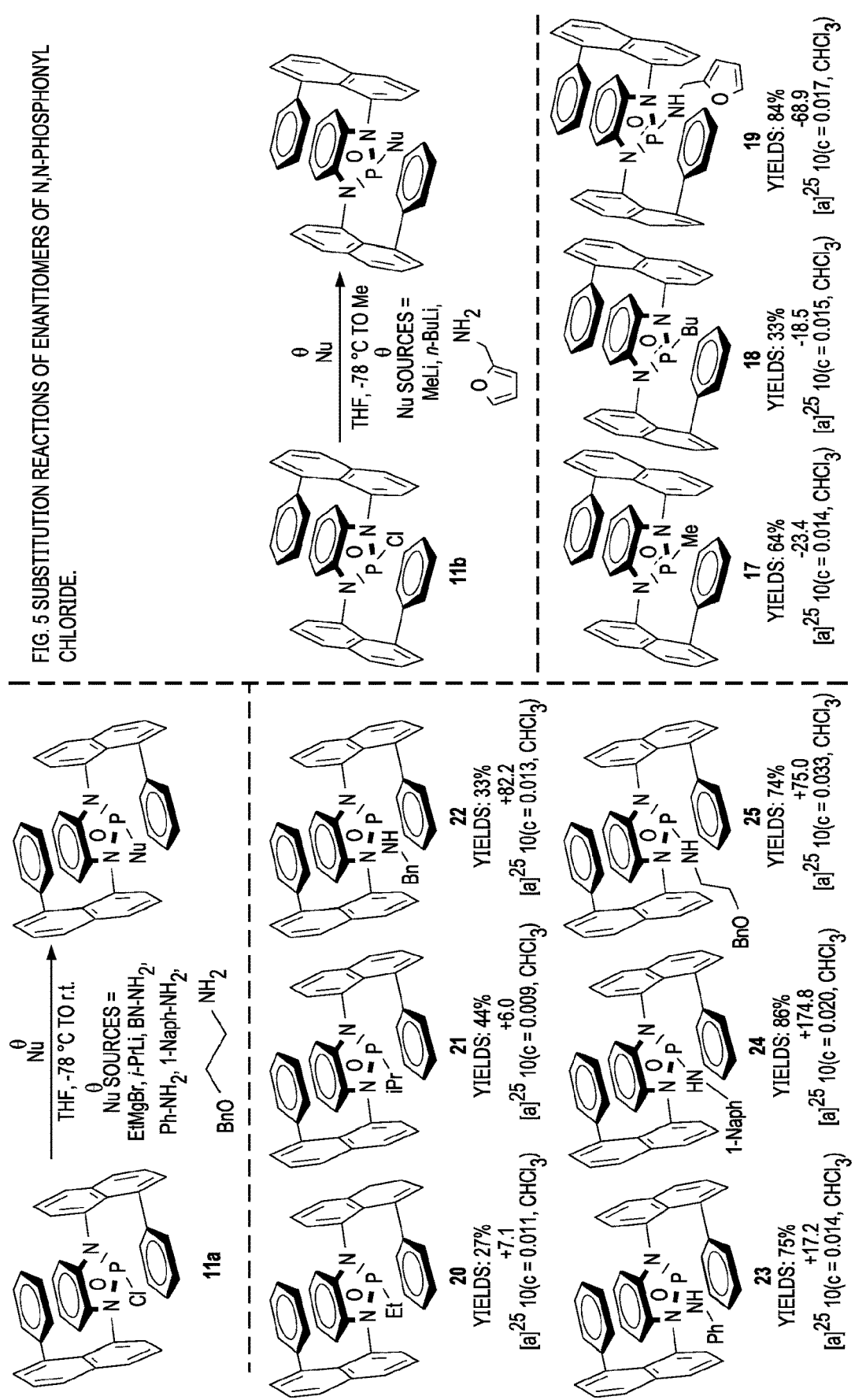
FIG. 5 shows the substitution reactions of enantioners of N,N-phosphonyl chloride.

After individual enantiomers of N,N-phosphonyl chlorides were generated through preparative chiral HPLC, the inventors investigated their synthetic potentials by transferring them into various building blocks. At first, methyl lithium was subjected to the nucleophilic substitution reaction with isomer (11b) of N,N-phosphonyl chloride (FIG. 5). The reaction was finished by running in dried THF at −78° C. for 30 min and then raised to room temperature for 6 h. A yield of 64% was achieved without observation of any racemization; this was confirmed by running the same reaction using racemic N,N-phosphonyl chloride with the resulting product subjected to chiral HPLC analysis (see SI). As the inventors expected that bulky sandwich center plane can prevent the axial rotation which is necessitated for racemization. Other two nucleophiles, n-butyl lithium and furan-2-ylmethanamine, were also employed for the reaction with this enantiomer under similar conditions to give 2-butyl-1,3-bis(8-phenylnaphthalen-1-yl)-1,3-dihydrobenzo[d][1,3,2]diazaphosphole 2-oxide and 2-((furan-2-ylmethyl)amino)-1,3-bis(8-phenylnaphthalen-1-yl)-1,3-dihydrobenzo[d][1,3,2]diazaphosphole 2-oxide (19) in yields of 33% and 84%, respectively (FIG. 5).

Based on the availability of enantiomerically pure N,N-phosphonyl chlorides generated from preparative HPLC, the inventors then examined other nucleophiles for the similar reaction with the other isomer (11a). These nucleophiles include ethyl magnesium bromide, i-propyl lithium, phenylmethanamine, aniline, naphthalen-1-amine and 2-(benzyloxy)ethan-1-amine. All of these nucleophiles reacted with N,N-phosphonyl chloride isomer (11a) smoothly to give good to high yields as shown in FIG. 5. It should be noted that for amino nucleophiles, their treatment with n-butyl lithium was performed for pre-formation of lithium alkylamide or lithium arylamide prior to the nucleophilic substitution reaction. All of these products (FIG. 5, 20-25) were proven to be stable at room temperature, no decomposition was detected for more than one month without any inner gas protection.

Figure 3D:
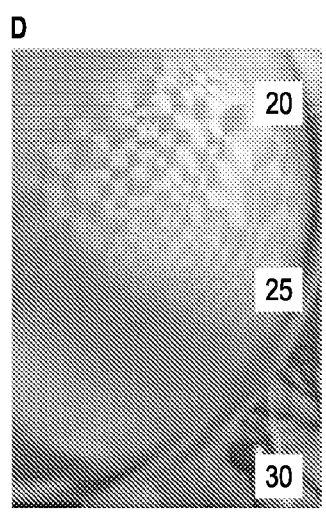

Interestingly, during conducting i-propyl lithium-based substitution, the inventors found the resulting product of 2-isopropyl-1,3-bis(8-phenylnaphthalen-1-yl)-1,3-dihydrobenzo[d][1,3,2]diazaphosphole 2-oxide (21) was formed in flask by showing a hornet' nest pattern of white color after evaporation was operated to dryness (FIG. 3D). The hornet's nest units include an almost identical shape of various sizes. Other alkyl derivatives did not show this phenomenon, indicating that i-propyl groups can be used for controlling properties for certain materials.

Figure 6:
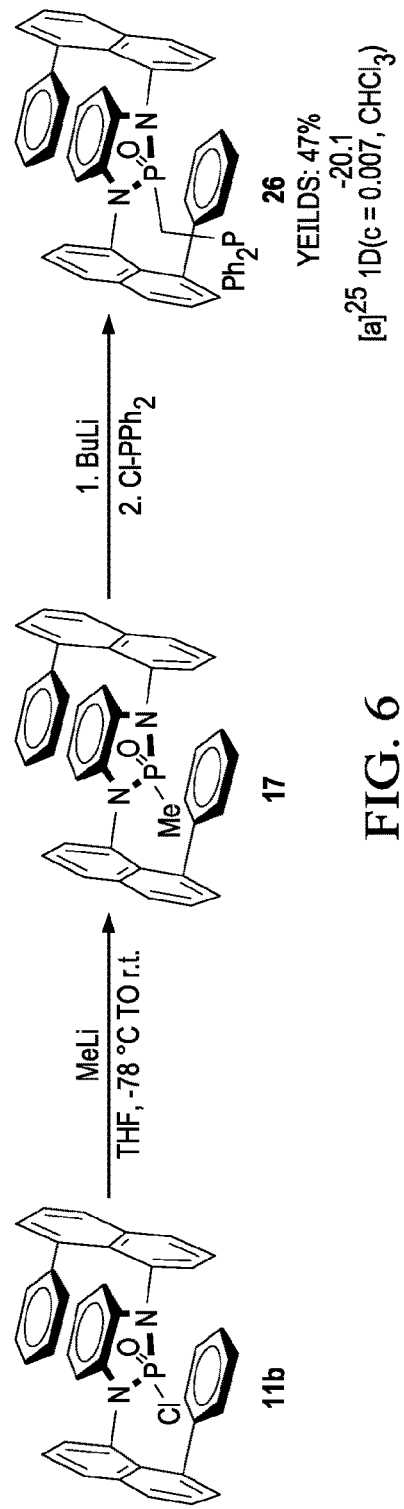
FIG. 6. Conversion of one isomer of N,N-phosphonyl chloride to phosphine.

To further investigate synthetic potential of this novel chirality, the inventor converted enantiomerically pure isomer (11b) of N,N-phosphonyl chloride into a chiral phosphine ligand which belongs to the most active field in asymmetric catalysis (FIG. 6, 26) (60-66). The key step was to conduct the deprotonation of 2-methyl-1,3-bis(8-phenylnaphthalen-1-yl)-1,3-dihydrobenzo[d][1,3,2]diazaphosphole 2-oxide by using n-BuLi followed by nucleophilic substitution reaction with chlorodiphenylphosphine. This two-step synthesis gave an excellent overall yield of 47%. Since this new ligand is anchored by GAP functionality, it would be anticipated to be recyclable for re-use via simple GAP purification. The work on improving yields of N,N-di-coupling reaction and applications of this new chirality are currently being investigated in our labs.

In conclusion, the inventor discovered a novel organic sandwich chirality showing multi-layer three dimensions. The absolute structure has been unambiguously confirmed by X-ray diffraction analysis of signal crystals. The key element of this chirality is characterized by three planes that are arranged nearly in parallel fashion with one on top and one down from the center layer. The resulting 3D-multi-layer chiral products have been converted into various building blocks, particularly, anchored by N,N-phosphonyl GAP group to give new chiral phosphine ligands for asymmetric chemistry. The GAP-catalyst strategy resulted in the design, synthesis and applications of more environmentally friendly materials and catalysts for recycling and re-use. The work would be anticipated to have a great impact on chemical, pharmaceutical and material sciences in future.

Next, the inventors pursued additional structural designs by analyzing original chiral sandwich-shaped structures of multi-layer 3D chirality. As shown in FIG. 1C, the key characteristics of this chirality are shown by three levels of planar units arranging nearly in parallel fashion with one on top and the other one down from the central layer, and by its unique pseudo $C_2$ symmetry which is made possible by differentiating moieties on phosphorous on N-phosphonyl ring. In the nine-step total synthesis of this chirality, the key steps involved the dual Buchwald-Hartwig C—N couplings [83-85] and diamino cyclization. At beginning, only 15%-19% and 39%-45% were achieved for these two steps, respectively. Afterwards, these yields were improved to 27%-41% and 45%-65%, respectively, by choosing more suitable substrates and by changing Buchwald-Hartwig catalytic conditions. An additional shortcoming in that work is that the free diamine products are not so stable, particularly when they are dissolved in solutions. Usually, they are utilized just after they are prepared. This situation prompted us to continue seeking new multi-layer 3D molecules and corresponding synthetic strategies for future applications.

For the previous multi-layer 3D chirality anchored by C—N bonds, shown above, the inventors had to obtain individual enantiomers through physical separation via pre-preparative chiral HPLC. The inventors envisioned that if the dual C—N bonds in the original multi-layer 3D structures (FIG. 1C)) were moved backwards onto the central phenyl rings, this would result in fully C—C bond-anchored multi-layer 3D chiral molecules and would generate new properties and asymmetric environments for chemical and material applications (FIG. 1D). Furthermore, it would make its asymmetric synthesis to be more convenient and practical. In this communication, the inventors would like to disclose this new design and its synthetic assembly. The present work presents the first fully C—C bond-anchored multi-layer 3D chirality and the first enantioselective assembly of multi-layer 3D chiral molecules.

In these new chiral multi-layer structures (FIGS. 1C and 1D), two smallest hydrogen atoms exist on 4- and 5-positions of the central phenyl ring, which allows the phenyl rings to freely rotate back and forth within an angle range of 180° in classical doubly-layered chiral structures. However, in this new chirality, its top and bottom layers restrict and limit each other from free rotation, i.e., this multi-layer 3D chirality would not exist if it lacks the presence of a third layer. This would fundamentally differentiate the present multi-layer 3D chirality from the well-known planar and axial chirality documented in literature. In addition, the pseudo $C_2$ symmetry of previous C—N anchored chirality has become $C_2$ symmetry in the present structural frameworks.

Figure 7A:
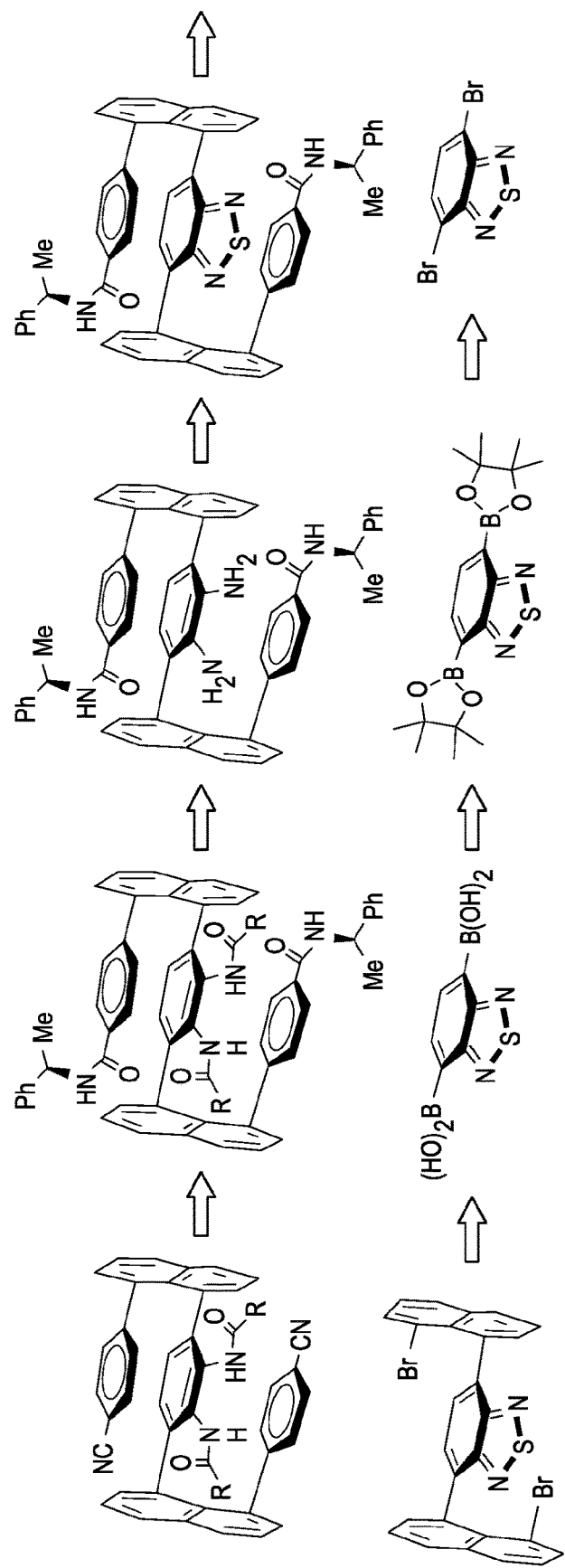
FIGS. 7A to 7C show Retro-Synthetic Analysis (RSA) of fully C—C bond-anchored multi-layer 3D targets.

Retro-Synthetic Analysis (RSA). Retro-synthetic analysis [81] revealed that there are several strategies to assemble the present multi-layer 3D molecular framework. These strategies are mainly based on the dual Suzuki-Miyaura C—C couplings as represented by the cases of using (R)-(+)-1-phenylethylamine derivatives as the substrate (FIG. 7A). Since the inventors have failed several attempts on the direct coupling 2(2,3-diamino-1,4-phenylene)diboronic acid or its N,N-diacetyl derivatives with 1,8-dibromonaphthalene, the inventors have to turn attention to the use of benzo[c][1,2,5]thiadiazole-4,7-diyldiboronic acid as the bridge synthon for this coupling reaction. Benzo[c][1,2,5]thiadiazole-4,7-diyldiboronic acid is readily made by converting 4,7-dibromobenzo[c][1,2,5]thiadiazole into 4,7-bis(4,4,5,5-tetramethyl-1,3,2-dioxaborolan-2-yl)benzo[c][1,2,5]thiadiazole followed by HCl hydrolysis. 1,8-Dibromonaphthalene was synthesized by reacting 1,8-diaminonaphthalene with $NaNO_2$ followed by the treatment with copper (I) bromide [82].

Figure 7B:
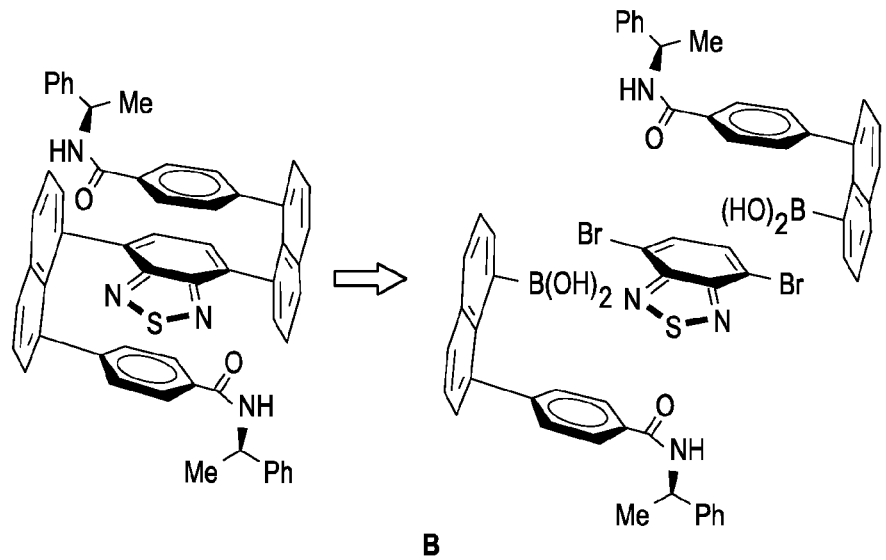
Figure 7C:
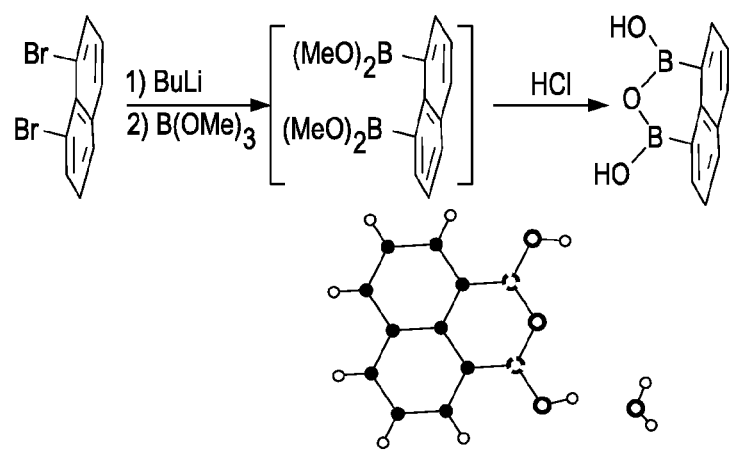

The retro-synthetic analysis revealed the coupling of (R)-(8-(4-((1-phenylethyl)carbamoyl)phenyl)naphthalen-1-yl)boronic acid with 1,8-dibromonaphthalene (FIG. 7B) would be less suitable because the preparation of this boronic acids and its derivatives requires more steps and more costs for the total synthesis of nine targets than strategy FIG. 7A. Naphthalene-1,8-diyldiboronic acid was also planned as a synthon unit for the coupling with 4,7-dibromobenzo[c][1,2,5]thiadiazole (FIG. 7C). Unfortunately, during the synthesis of this precursor, the inventors found when tetramethyl naphthalene-1,8-diyldiboronate was subjected to hydrolysis, naphthalene-1,8-diyldiboronic acid cannot be generated. Instead, its dehydrated product, 1H,3H-naphtho[1,8-cd][1,2,6]oxadiborinine-1,3-diol, was formed predominantly as confirmed by X-ray structural analysis (FIG. 7C). This compound is inert to the coupling reaction under the standard and even more harsh conditions. These results also proved that it is promising to directly employ 4,7-bis(4,4,5,5-tetramethyl-1,3,2-dioxaborolan-2-yl)benzo[c][1,2,5]thiadiazole as a bridge synthon for this synthetic assembly.

Figure 8A:
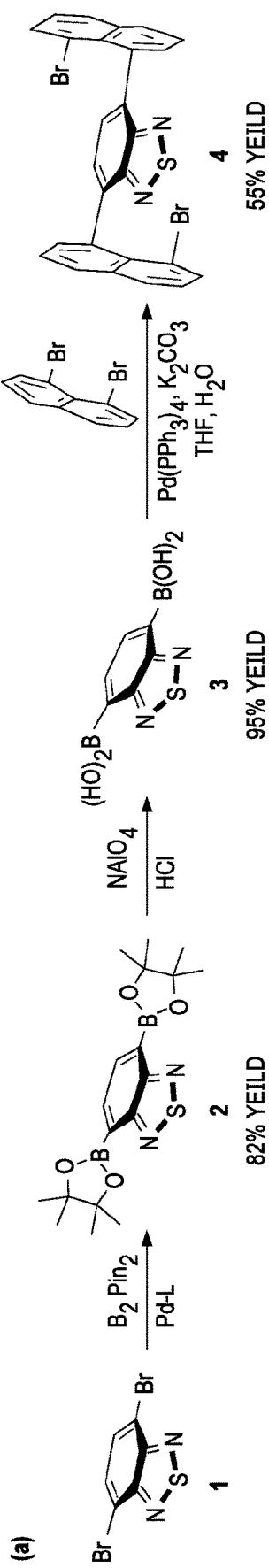
FIGS. 8A to 8C show: 8A Synthesis of 4,7-bis(8-bromonaphthalen-1-yl)benzo[c][1,2,5]thiadiazole. 8B Synthesis of chiral 1-arylethylamine or alkylethylamine-attached boronic acids. 8C Synthesis of chiral 1-arylethylamine-derived boronic acids. [a]combined yields of two diastereoisomers [b]determined by proton NMR.

Synthetic Assembly. The inventors used dual Buchwald-Hartwig C—N couplings, which played a key role in the nine-step synthesis [83-85]. Similarly, in this synthesis, the dual Suzuki-Miyaura C—C couplings [86-88] were planned to assembly two moles of 1,8-dibromonaphthalene with one mole of 1,4-di-boronic acid bridge. Therefore, the synthesis of central planar building block, 4,7-bis(8-bromonaphthalen-1-yl)benzo[c][1,2,5]thiadiazole, was started by reacting 4,7-dibromo-2,1,3-benzothiadiazole with bis(pinacolato)diboron in the presence of (1,1-bis(diphenylphosphino)ferrocene) dichloropalladium(II) as the catalyst [87]. The resulting diboronic ester was treated with sodium periodate and subsequently by hydrochloric acid, to give 2,1,3-benzothiadiazole-4,7-diboronic acid. The dual Suzuki-Miyaura C—C couplings of this diboronic acid with 1,8-dibromonaphthalene in the presence of Pd(PPh$_3$)$_4$ in co-solvent of THF/H$_2$O resulted in 4,7-bis(8-bromonaphthalen-1-yl)benzo[c][1,2,5]thiadiazole in an overall yield of 43% in three steps (FIG. 8A) [88]. The major reason of affording a low yield at the last step is partially caused by mono- and di-debromination occurred during the Suzuki-Miyaura catalytic process.

Figure 8B:
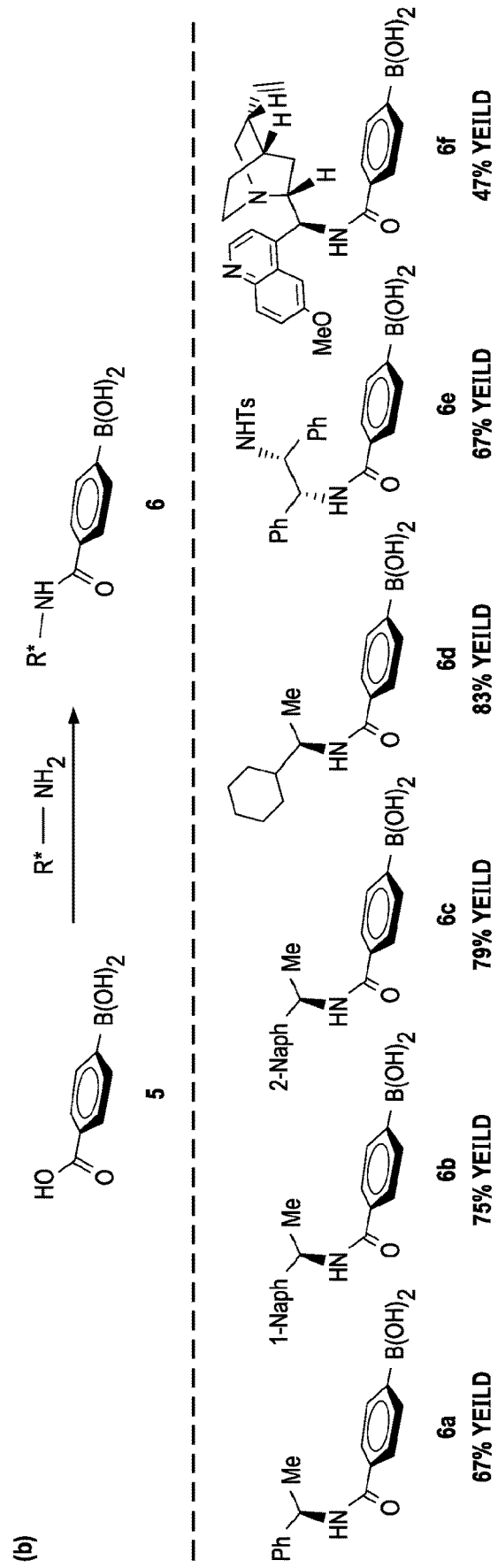
Figure 8C:
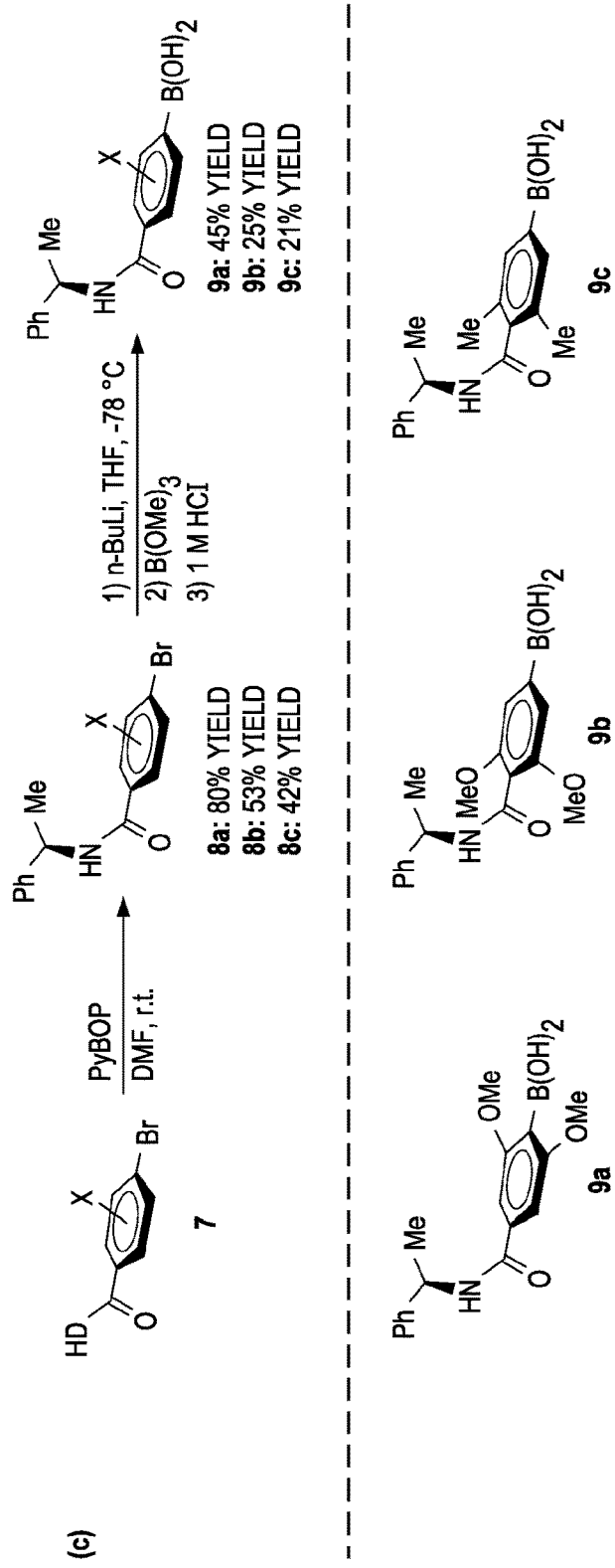

The chiral auxiliary is attached onto the para-position on phenyl ring of 4-boronobenzoic acid which is commercially available. A literature procedure is followed for the preparation of six chiral amide-based boronic acids [89]. In this preparation, 4-carboxybenzeneboronic acid (1.0 equiv) was treated with PyBOP (2.0 equiv) in DMF stirring for a few minutes, followed by adding chiral 1-arylethylamine or alkylethylamine (2.0 equiv) into the reaction mixture. The carbonyl coupling was completed within 14 h at room temperature prior to quenching, work-up and purification via column chromatography to give 6a-6f in chemical yields arranging from 47% to 83%. It is not surprising the bulkier the amine reagents, the lower the chemical yields as shown in FIGS. 8B and 8C.

Figure 9A:
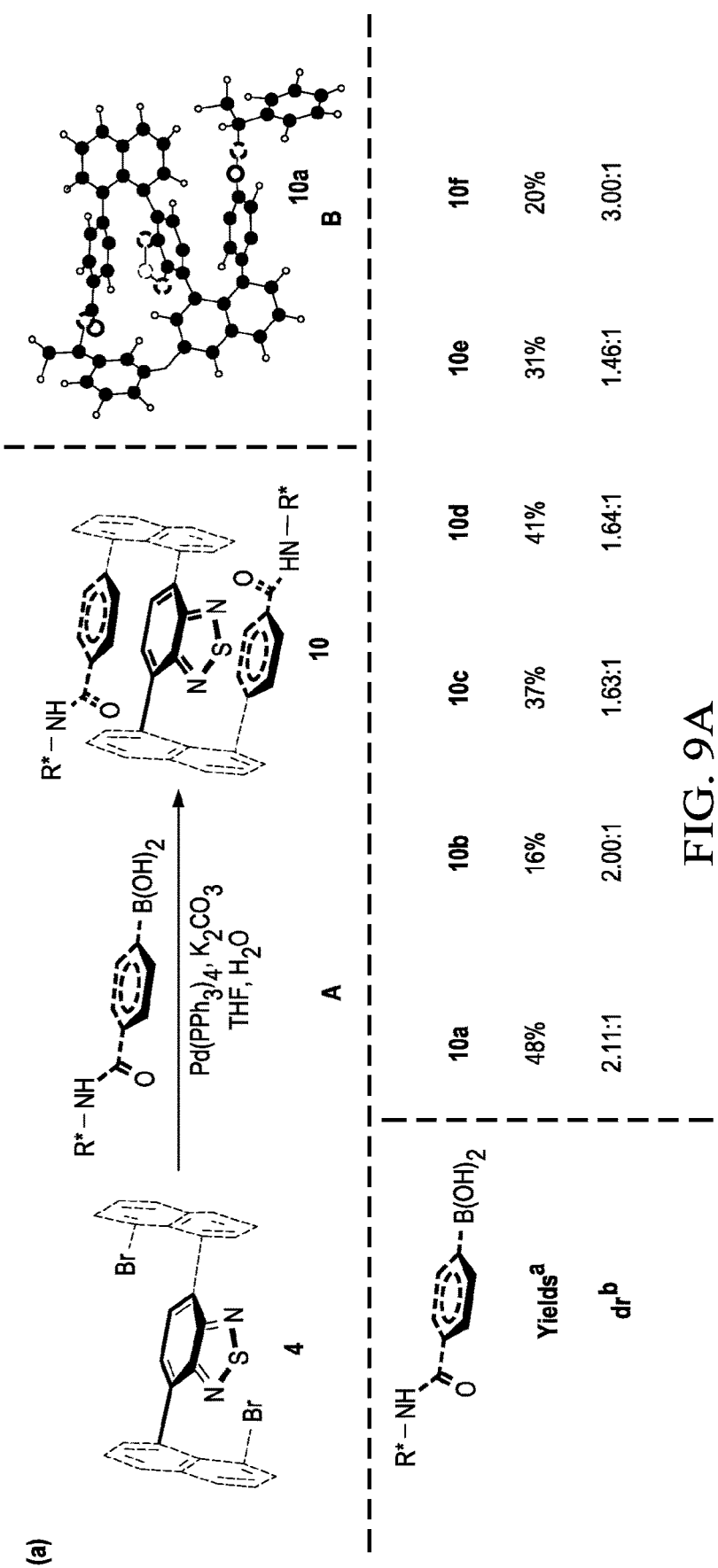
FIGS. 9A to 9D show: 9A Synthetic results of chiral multi-layer 3D amides. 9B Alternative approaches to chiral multi-layer 3D amides. 9C Synthetic results of chiral multi-layer 3D amides by using branched boronic acids. 9D Synthesis of 4,9-bis(8-phenylnaphthalen-1-yl)naphtho[2,3-c][1,2,5]thiadiazole. [a]combined yields of two diastereoisomers [b]determined by proton NMR.

The dual Suzuki-Miyaura C—C couplings were conducted by following a typical procedure of mono Suzuki-Miyaura C—C coupling [86-88]. An excess amount of (R)-(8-(4-((1-arylethyl)carbamoyl)phenyl)naphthalen-1-yl)-, or, (R)-(8-(4-((1-alkylethyl)carbamoyl)phenyl)naphthalen-1-yl)-boronic acids (6a-6f, 2.3 equiv) was reacted with 4,7-bis(8-bromonaphthalen-1-yl)benzo[c][1,2,5]thiadiazole (4, 1.0 equiv) in presence of Pd(PPh$_3$)$_4$(20% mol) and potassium carbonate (6.0 equiv) in THF/H$_2$O (5:1, v/v). The limiting reagent of 4,7-bis(8-bromonaphthalen-1-yl)benzo[c][1,2,5]thiadiazole dibromide can be consumed within 12 h after being stirred at 85° C. As shown in FIG. 9A that the dual coupling product of (R)-(8-(4-((1-phenylethyl)carbamoyl)phenyl)naphthalen-1-yl)boronic acid (6a) gave highest yield of 48% among the above six chiral boronic acids (6a-6f) which were examined. These chiral boronic acids showed similar diastereoselectivity arranging from 1.46:1 to 3.00:1 dr. The modest diastereoselectivity would be attributed to relatively high temperature of catalytic condition leading to some degrees of rotation of chiral reactants during asymmetric induction processes. Since the absolute structure of chiral boronic acid 6a-derived major isomer of multi-layer 3D chirality was assigned by X-ray diffraction analysis (FIG. 9A-B), and its overall outcomes (yield and diastereoselectivity) are among the best, it was thus chosen as the substrate for extension with other branched chiral amide-derived boronic acids (FIG. 9C) and for other steps of the present total synthesis (FIGS. 10A and 10B).

Figure 9B:
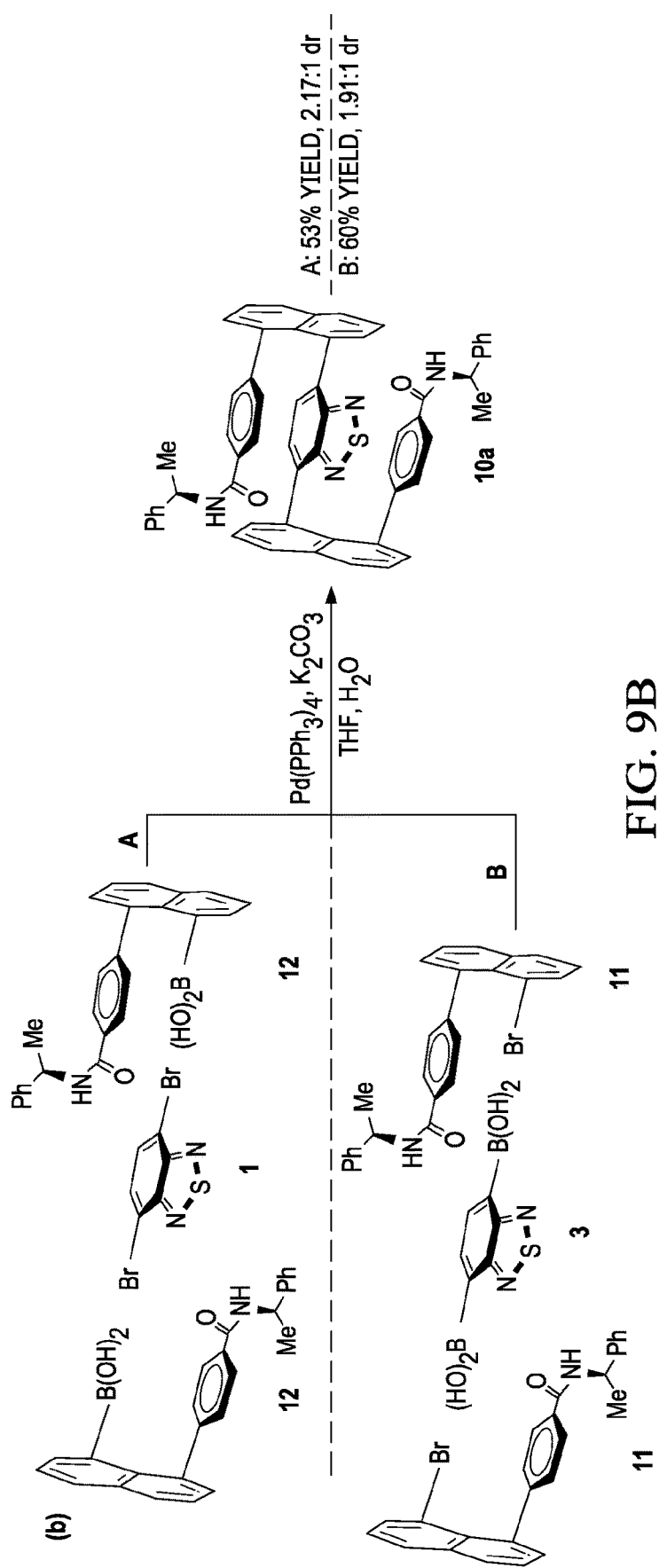
Figure 10A:
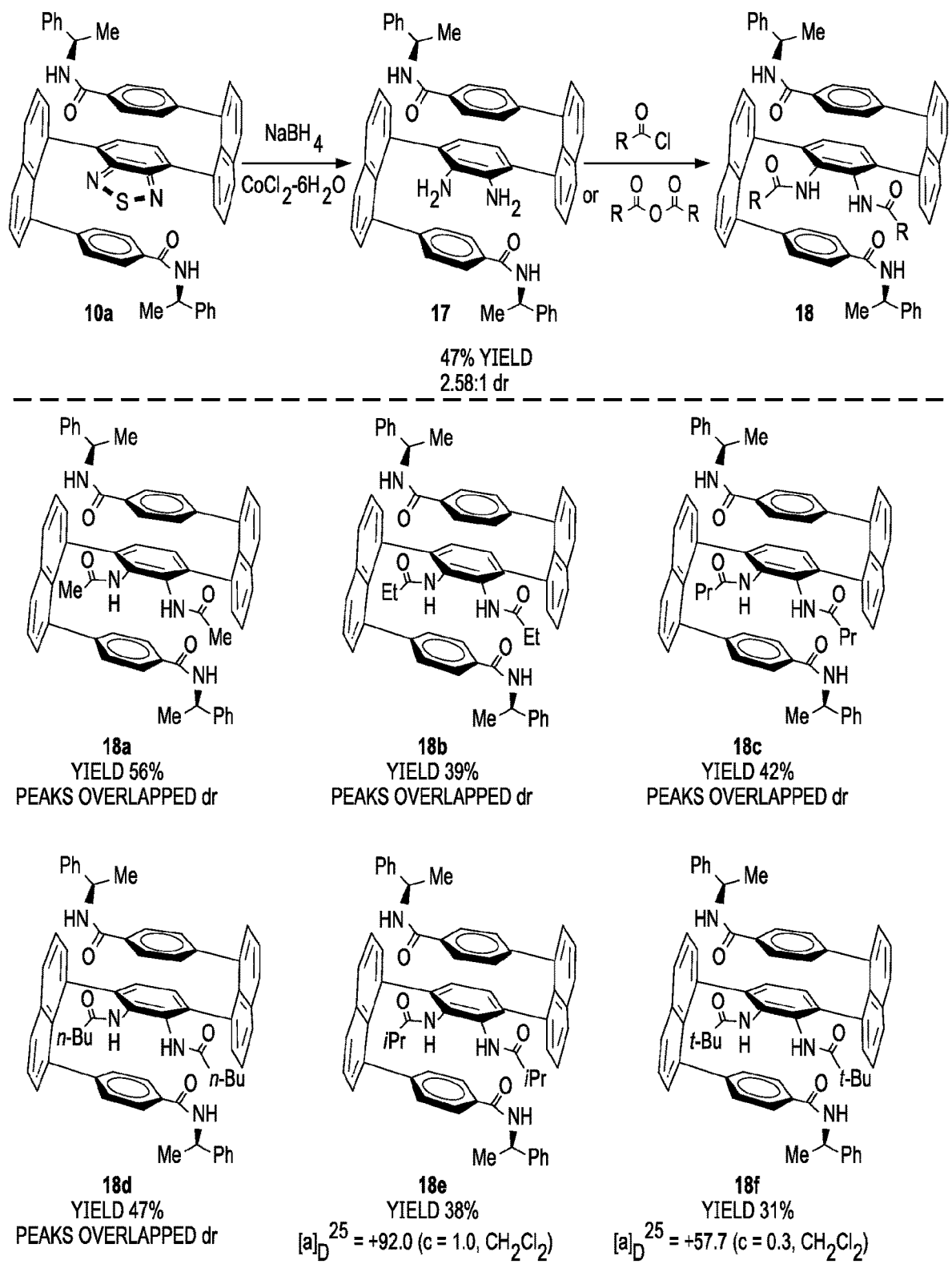
FIGS. 10A to 10C show: 10A and 10B show the results of free diamines and N-carbonyl-protected multi-layer 3D chiral compounds. (1° C. shows converting diastereomeric isomers into enantiomers under mild conditions.
Figure 10B:
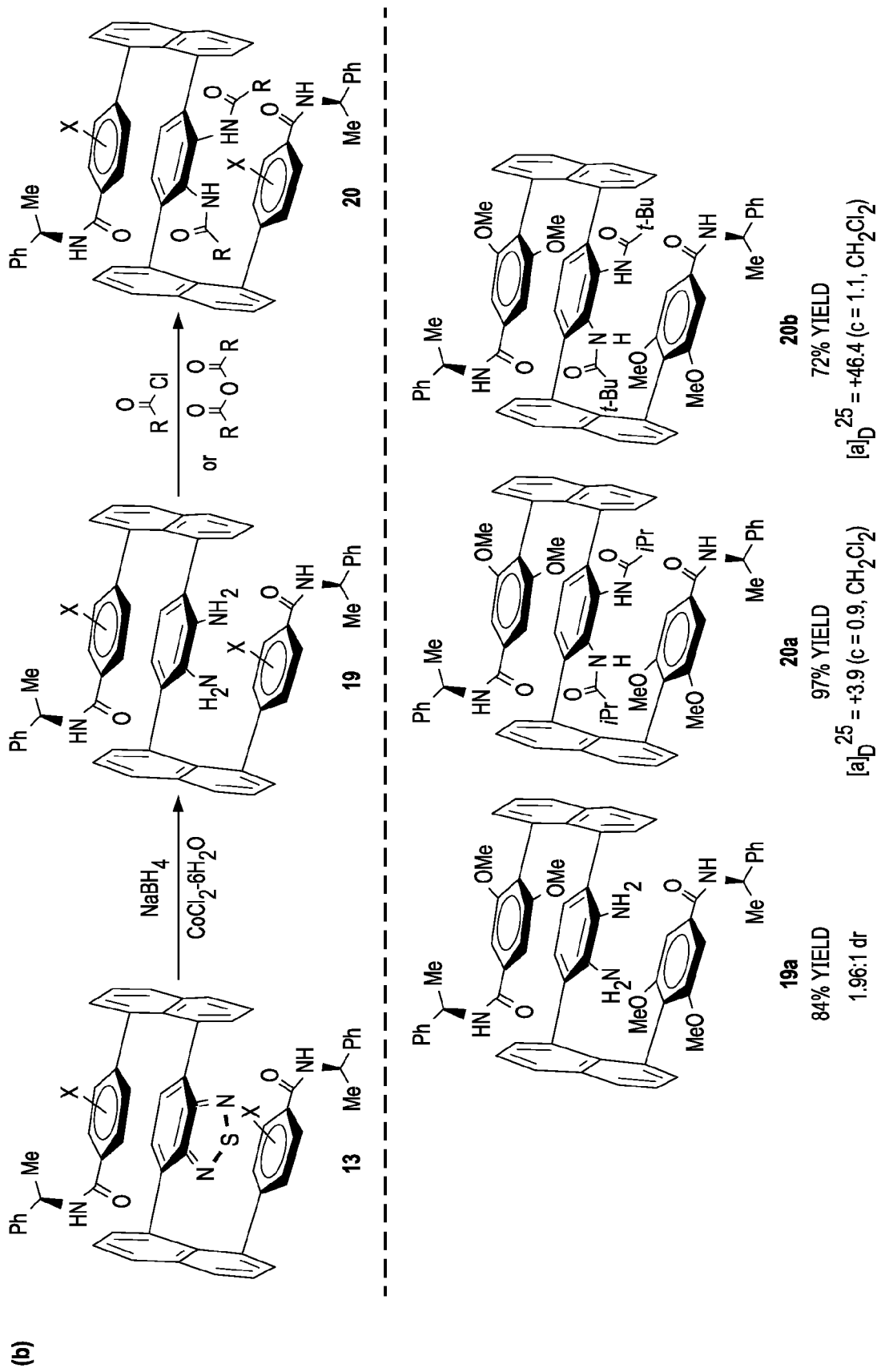
Figure 10B:
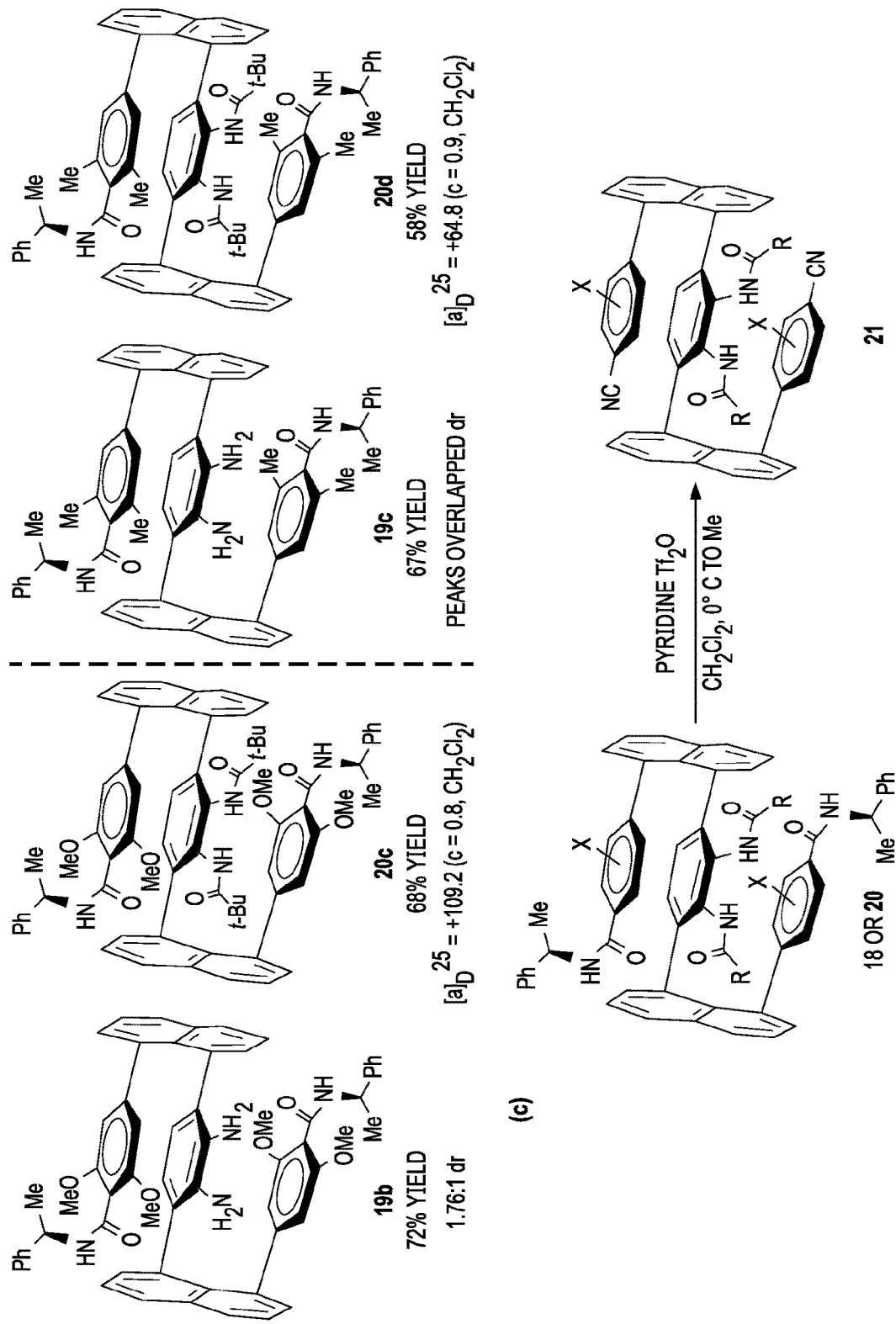
Figure 10B:
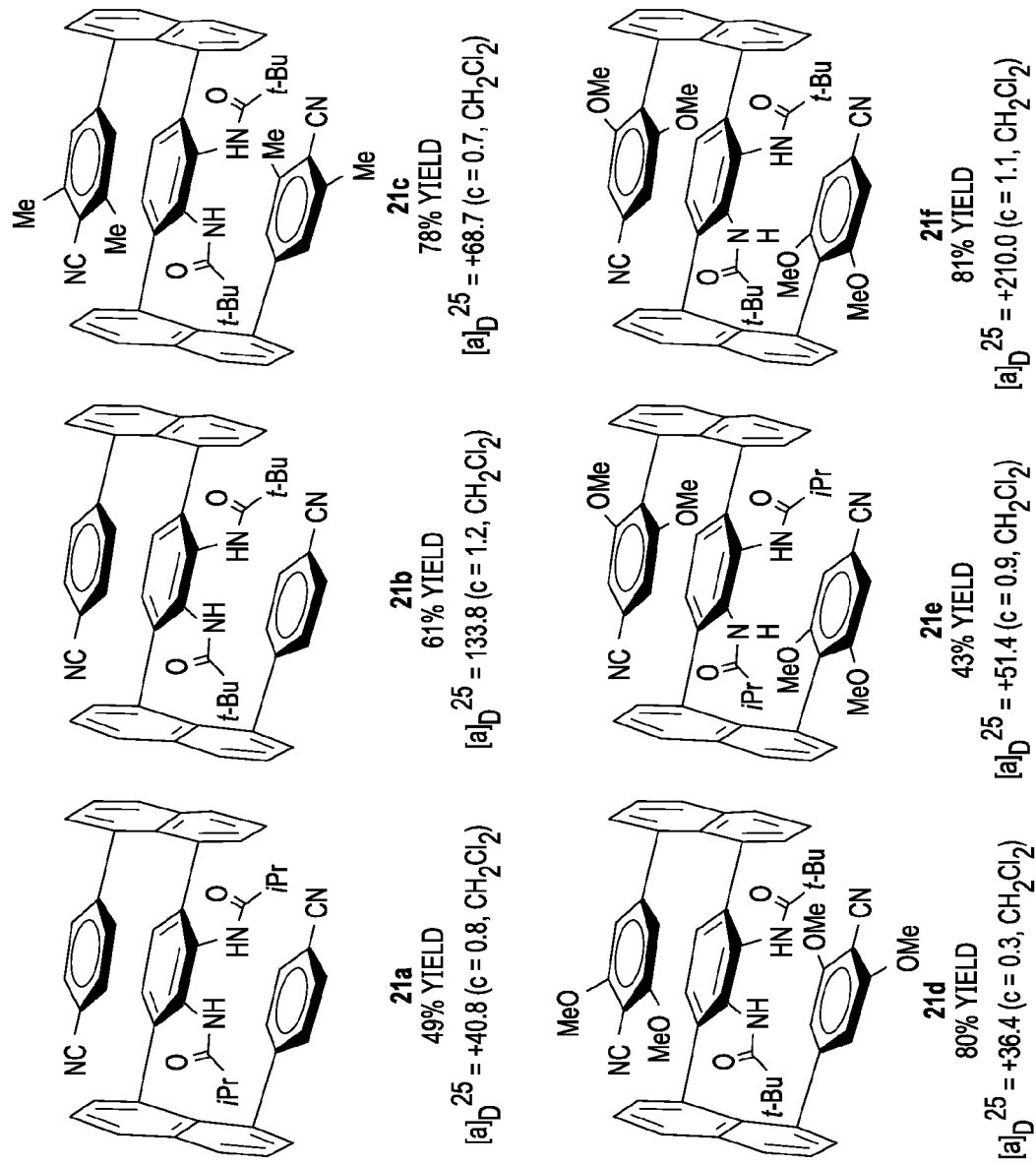

The inventors also enhanced yields and diastereoselectivity for the synthesis of chiral multi-layer 3D amides by changing C—C bond connections based on the use of (R)-(8-(4-((1-phenylethyl)carbamoyl)phenyl)naphthalen-1-yl)boronic acid or its bromide precursor (FIG. 9B). Unfortunately, the two alternative methods did not give obvious improvements on either yield (60% and 53%, respectively) and diastereoselectivity (1.91:1 and 2.17:1, respectively). The former is to use 4,7-dibromobenzo[c][1,2,5]thiadiazole as the anchor for the reaction with (R)-(8-(4-((1-phenylethyl)carbamoyl)phenyl)naphthalen-1-yl)boronic acid under the standard the Suzuki-Miyaura coupling system (FIG. 9B-A). The disadvantage of this strategy is shown by lower yields for the preparation of individual (8-(4-((1-phenylethyl)carbamoyl)aryl)naphthalen-1-yl)boronic acids. The latter is to employ benzo[c][1,2,5]thiadiazole-4,7-diyldiboronic acid as the bridge template for the reaction with (R)-4-(8-bromonaphthalen-1-yl)-N-(1-phenylethyl)benzamide (FIG. 9B-B). It also showed a disadvantage on the synthesis of individual 4-(8-bromonaphthalen-1-yl)-N-(1-phenylethyl)benzamide derivatives, i.e., it is not as divergent as the other two assembly strategies.

Figure 11:
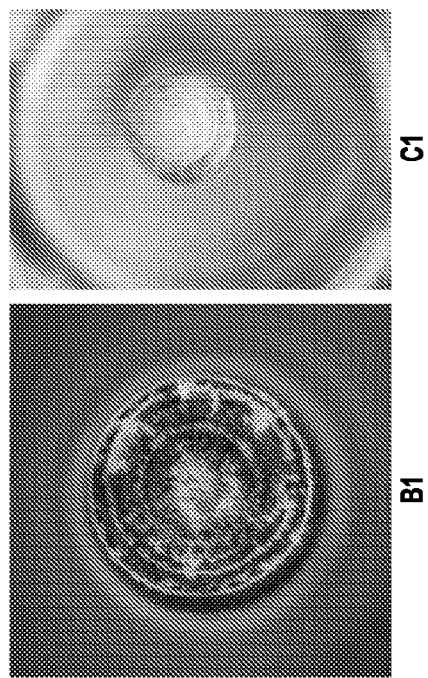
FIG. 11 shows the macrochirality phenomenon of 10e: image under natural light with black background (A1); image under UV light (365 nm) (B1); image under natural light after rotavapor evaporation (C1). Spiro textile-type of macrochirality of 18e formed inside NMR tube (A2 and B2); luminescence of samples under UV light (365 nm): A3-A8 without UV irradiation, B3-B8 with UV irradiation; fluorescence images of 16 under different physical conditions (A9, appearance under natural lights; B9, UV irradiation in natural background; C2, UV irradiation in dark background).
Figure 11:
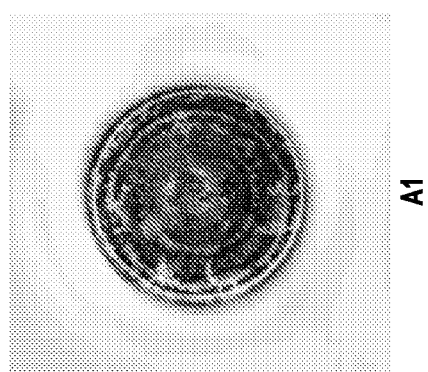
Figure 11:
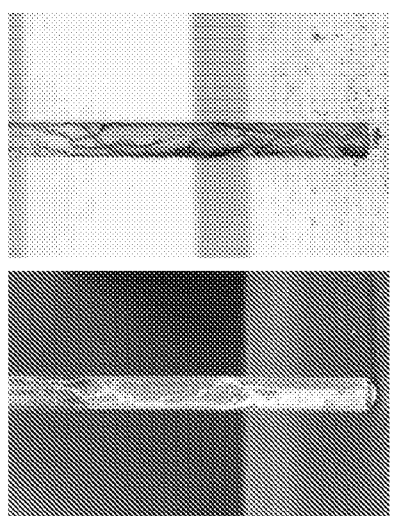
Figure 11:
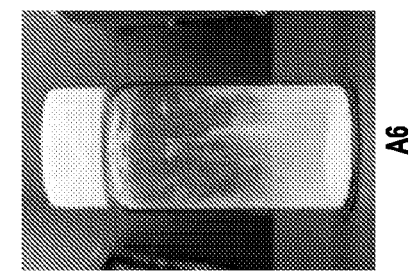
Figure 11:
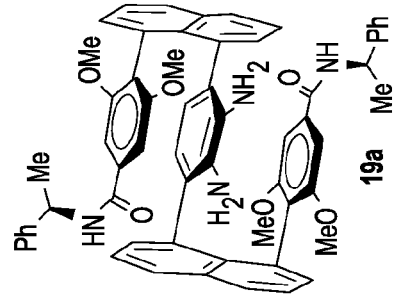
Figure 11:
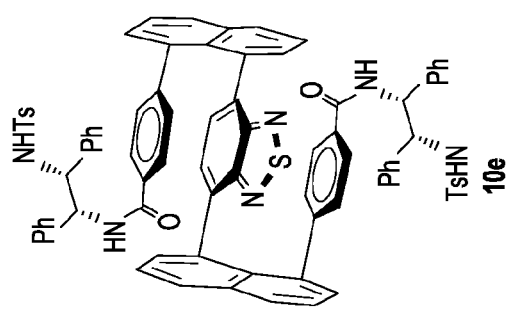
Figure 11:
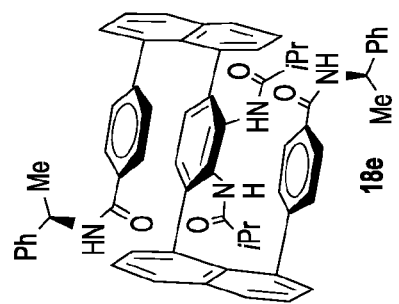
Figure 11:
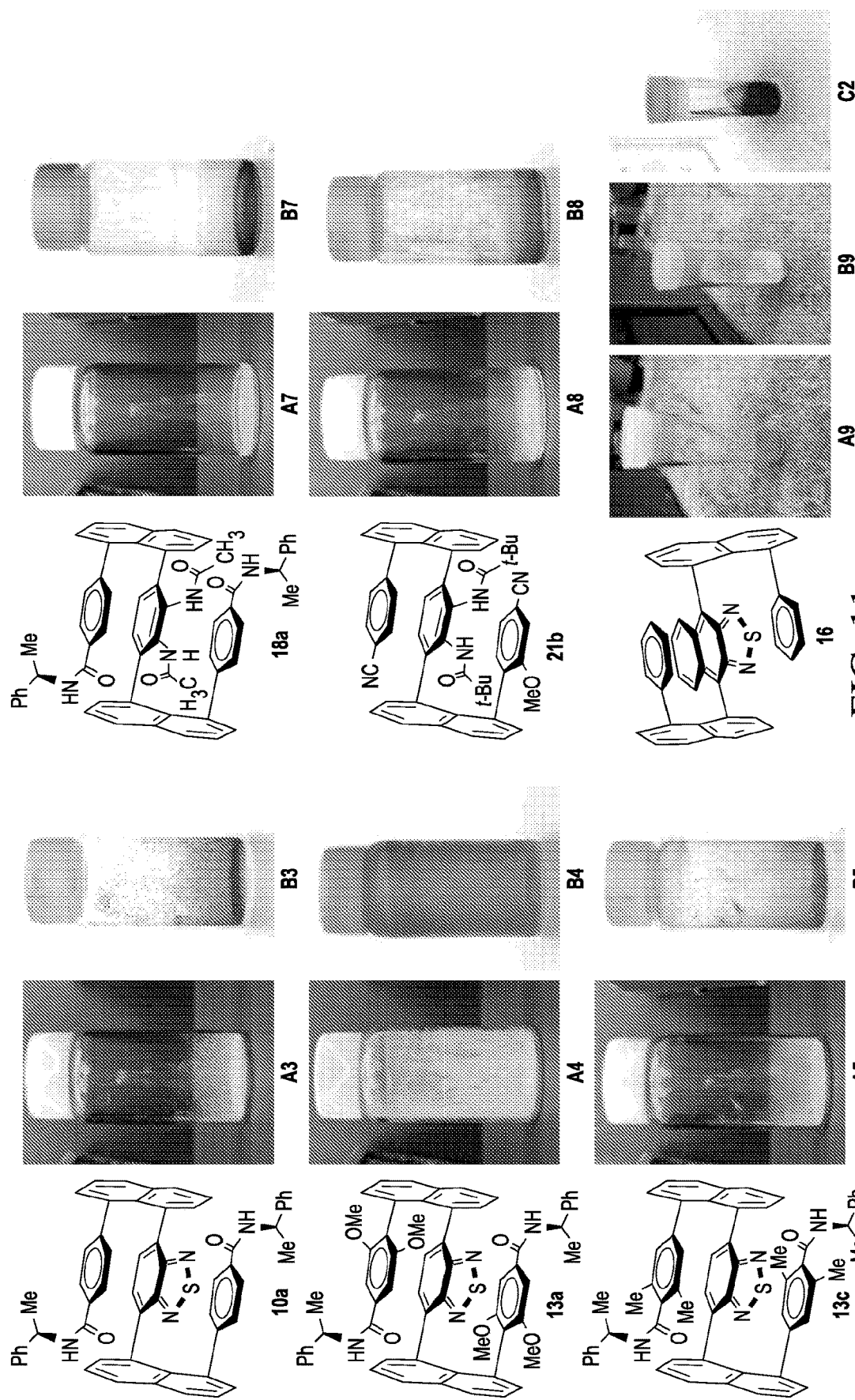

It is very intriguing that the resulting chiral multi-layer 3D amides displayed macro-chirality phenomenon which has not been reported in literature to the best of our knowledge. As shown in FIGS. 11-A1 and B1 that when a solution containing diamino boronic acid-derived product 10e was slowly evaporated by being exposed to air for a few days, anti-clockwise spiral loops were formed. These spiral loops shine with green color when it is irradiated under UV light at 365 nm. Unlike reported macro-chiral cases in which the chiral mappings can only be seen with the aid of microscopic devices, but the present macro-chiral mapping can be observed by eyes directly. It is similarly interesting that anti-clockwise spiral loops are formed when the same solution was evaporated in rotavapor (FIG. 11-(a)-C1), which is also very rarely encountered in organic synthesis.

Since two individual diastereoisomers of 10a were extremely difficult to be separated via column chromatography or recrystallization, its mixture was thus directly subjected to the reductive opening by treating with an excess amount of sodium borohydride in the presence of CoCl$_2$·6H$_2$O as the catalyst [90]. The resulting vicinal diamino product 17 was purified via column chromatography to give isomeric mixture (17 and its diastereoisomer) in a combined yield of 47% and 2.58:1 dr. This free diamine mixture was next protected with carbonyl anhydride in anhydrous THF solution containing an excess amount of trimethylamine (FIG. 10A). Fortunately, as indicated by proton NMR that two of these protected diamino products can be separated to give pure major individual isomers (18e & 18f, FIG. 10A) while minor isomers are always contaminated with the major one. The rest of other four cases failed to give pure individual isomers via column chromatography.

It is also very intriguing when a capped NMR tube containing a CDCl$_3$ solution of compound 18e was stored at r.t. for over three weeks, right-handed spiro textile-shaped solids were formed inside the NMR tube. For small chiral organic molecules, this is also an unprecedented phenomenon to the best of our knowledge, FIG. 11-(b) shows the images of chirally wired textile-type of forms of 18e upon irradiation with UV light under natural lights (FIG. 11-(b)-A2) and dark backgrounds (FIG. 11-(b)-B2).

After the successful separation of pure major isomers of 18e and 18f was achieved with bulkier N-isobutyryl and N-pivaloyl groups, the inventors envisioned that similarly increasing steric effects on top and bottom aromatic rings of this series would benefit obtaining corresponding major single isomers as well. Therefore, the inventors conducted the synthesis of three bulkier chiral amide-anchored boronic acids: (R)-(2,6-dimethoxy-4-((1-phenylethyl)carbamoyl)phenyl)-(R)-(3,5-dimethoxy-4-((1-phenylethyl)carbamoyl)phenyl)-, and (R)-(3,5-dimethyl-4-((1-phenylethyl)carbamoyl)phenyl)-boronic acids (9a, 9b and 9c, FIG. 8C). Unlike the case of (R)-(4-((1-phenylethyl)carbamoyl)phenyl)-boronic acid in FIG. 8B where 4-boronobenzoic acid is commercially available, for latter three substrates, chiral boronic acids need to be pre-generated by starting from their 4-bromobenzoic acid precursors (FIG. 8C The first step is to perform the carbonyl coupling under standard condition[91,92] to give (R)-4-bromo-N-(1-arylethyl)benzamides 9a, 9b and 9c in yields of 42%, 25% and 21%, respectively, which were then converted into corresponding boronic acids by treating with n-BuLi followed by B(OMe)$_3$ and subsequently by aqueous HCl [93]. The poor yields at this in situ synthesis could be caused by the presence of —NH group which may participate in nucleophilic reaction with B(OMe)$_3$ and HCl hydrolysis to form more side products. The reason to employ these symmetrically branched aromatic rings is to avoid stereochemical complexity in forming various diastereoisomers; for most of these resulting multi-layer 3D isomers, there has not been a nomenclature system available to name their stereochemistry yet.

Figure 9C:
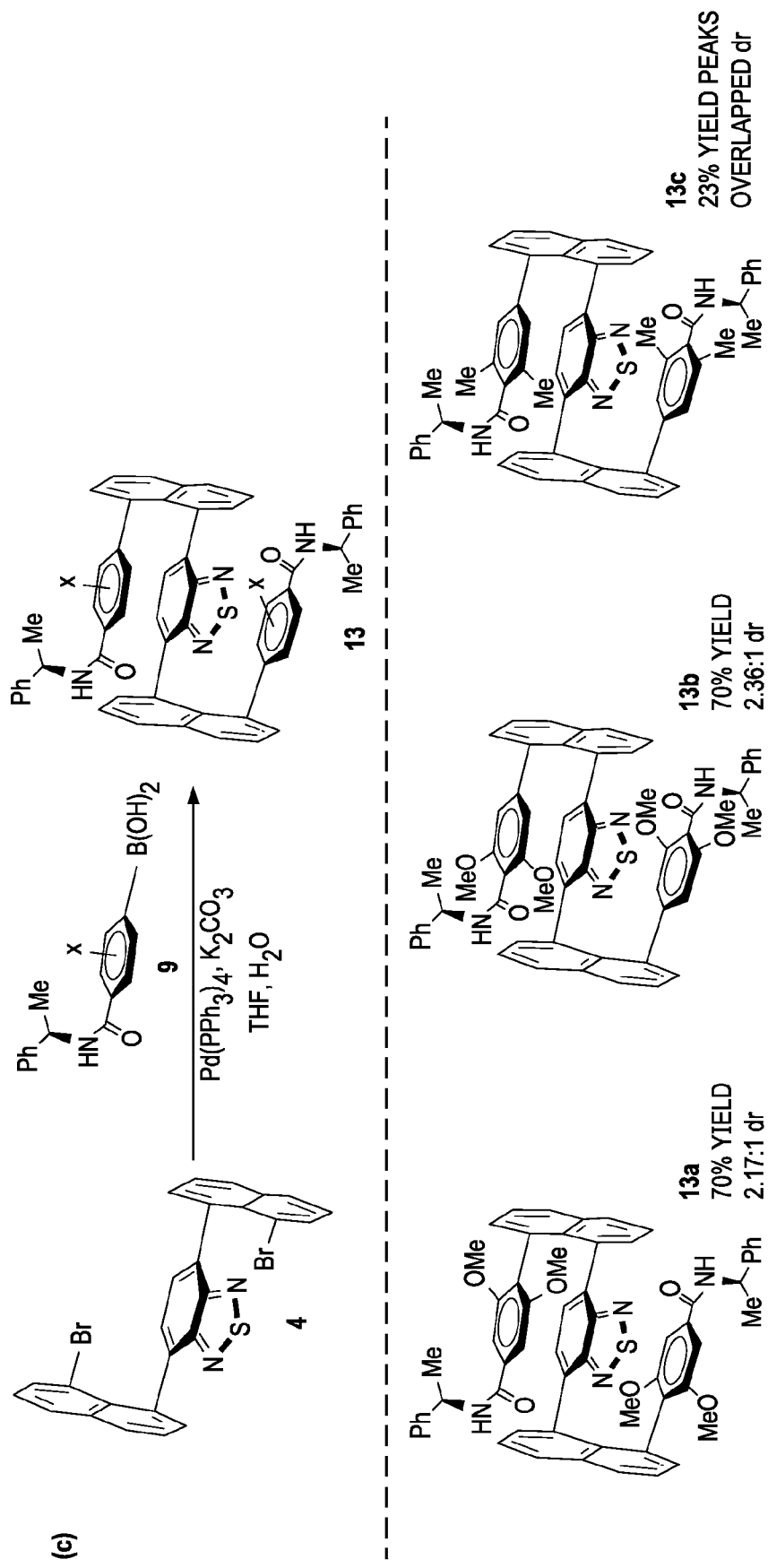
Figure 9D:
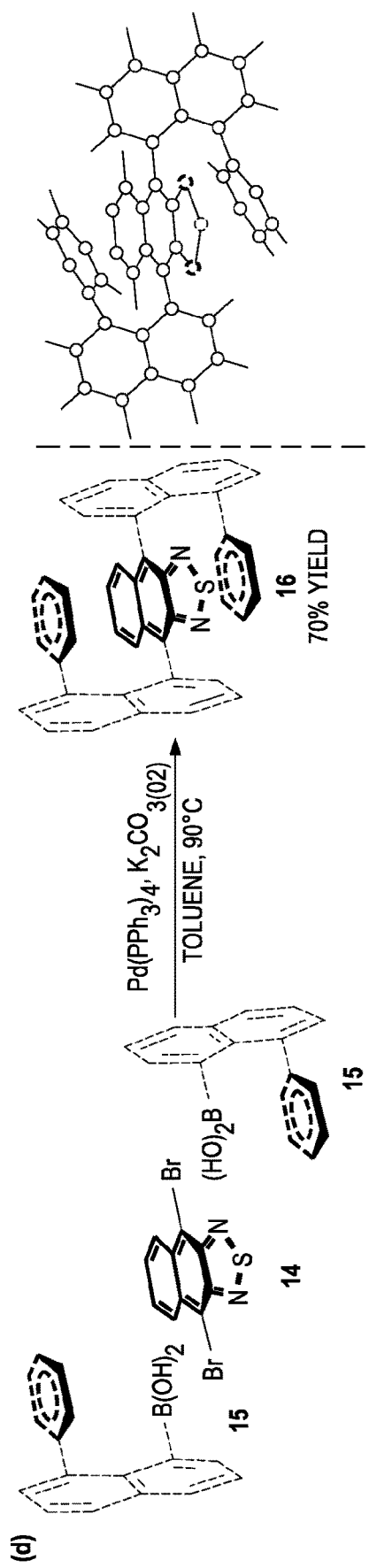

The above three new chiral amide-anchored boronic acids were subjected to the dual Suzuki-Miyaura C—C couplings [88] with synthetic results summarized in FIG. 9C. Surprisingly, although bulkier chiral 1-arylethylamine-derived boronic acids were utilized for this reaction, the resulting diastereoselectivity is still in a similar range to that of the non-branched assembly as shown in FIGS. 9A and 9C. In this latter assembly, 13b was obtained with the highest diastereoselectivity of 2.36:1 dr. The yields of cases 13a and 13b were achieved as 70%. As indicated in FIG. 9C, the yields are much higher than those of non-branched assembly arranging from 16% to 48% (FIG. 9A), although the yield of 13c still remained as low as 23% (FIG. 9C).

The inventors selected a few samples of this series for irradiating with ultraviolet light (365 nm), and the inventors found these solid products showed luminescence with strong fluorescence of various colors (FIG. 11B). The substituents of different electronic properties on top and bottom aromatic rings are responsible for the change of different colors. They may also impose the effects on the fluorescence activity via certain degrees of conformationally constrained stereochemistry.

A similar situation to above cases still exists where two individual diastereoisomers of 13a-13c cannot be separated via column chromatography. The dr after column chromatography can be determined by —CH$_3$ proton NMR integration of (R)-1-phenylethylamino functionality as 2.17:1 and 2.36:1, for 13a and 13b, respectively (FIG. 9C). However, due to the overlap of the peaks in proton NMR of 13c, the dr was not able to be measured. Therefore, these isomeric mixtures were directly subjected to the reductive opening under the literature conditions as mentioned previously [90]. It was difficult to separate the resulting free vicinal diamines 19a-19c either via column chromatography or recrystallization. After purified by column chromatography, these free diamino products showed dr of 1.96:1 and 1.76:1 for 19a and 19b, respectively (FIG. 10B), but for case 19c, the proton NMR signals of two diastereoisomers are seriously overlapped, making it difficult to measure its dr. Pleasantly, after these free diamine mixtures were protected by bulky isobutyryl and pivaloyl groups by the treatment with isobutyryl anhydride and pivaloyl chloride at r.t. [91, 92], the inventors were able to obtain optically pure major isomers of 20a-20d via column chromatography. All of these optical isomers have been proven to be stable at room temperature as revealed by —CH$_3$ proton NMR signals of (R)-1-phenylethylamino functionality.

Figure 10C:
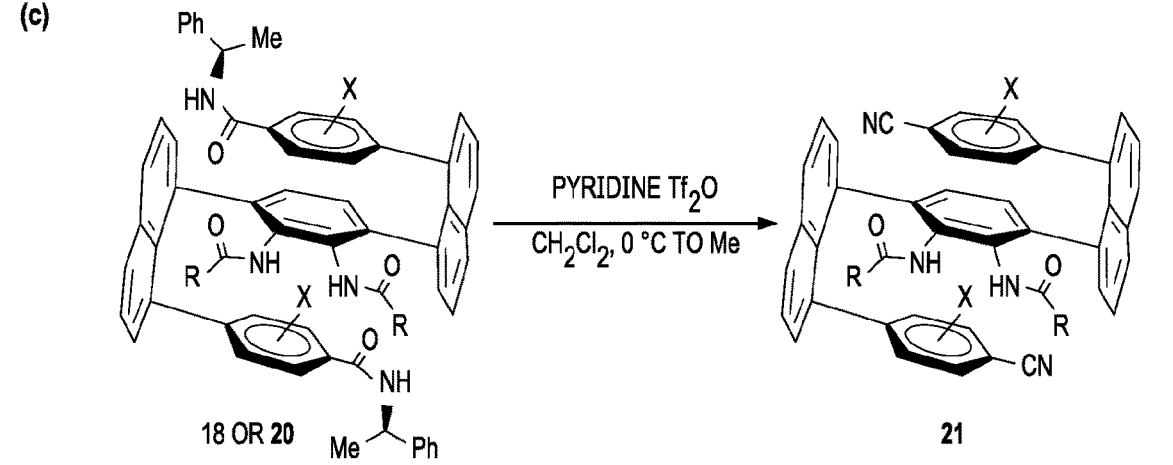
Figure 10C:
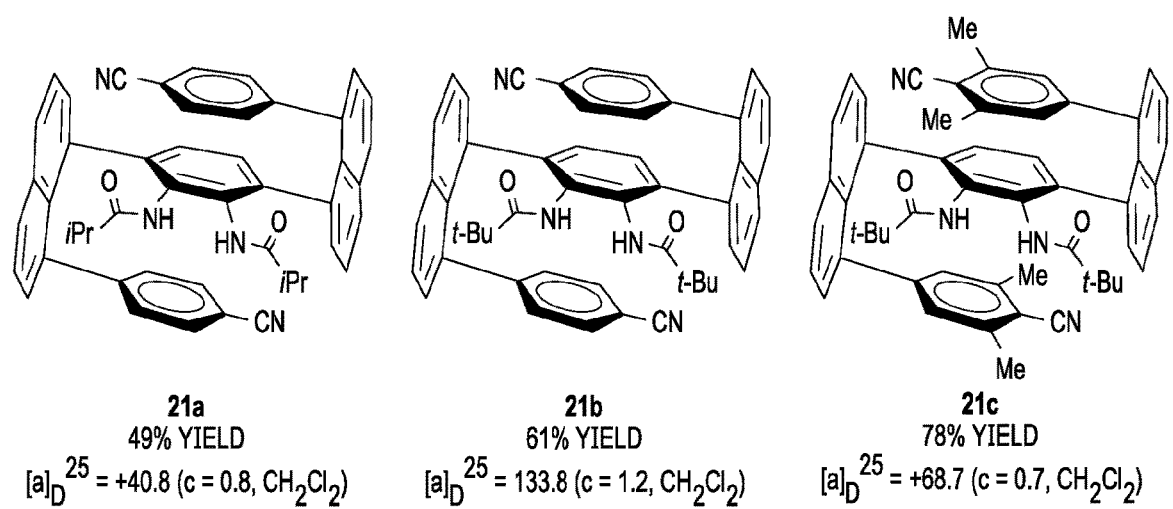
Figure 10C:
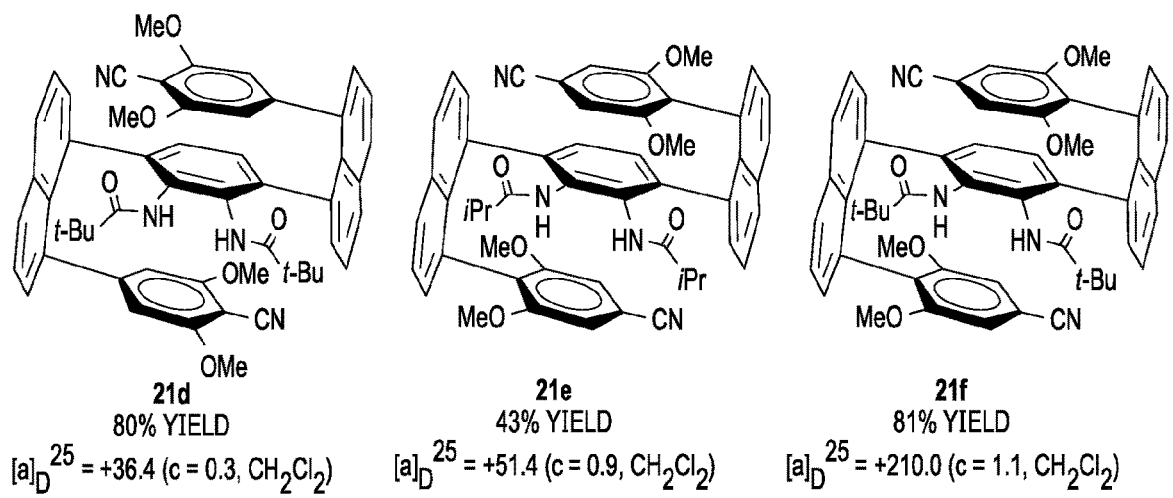
Figure 12:
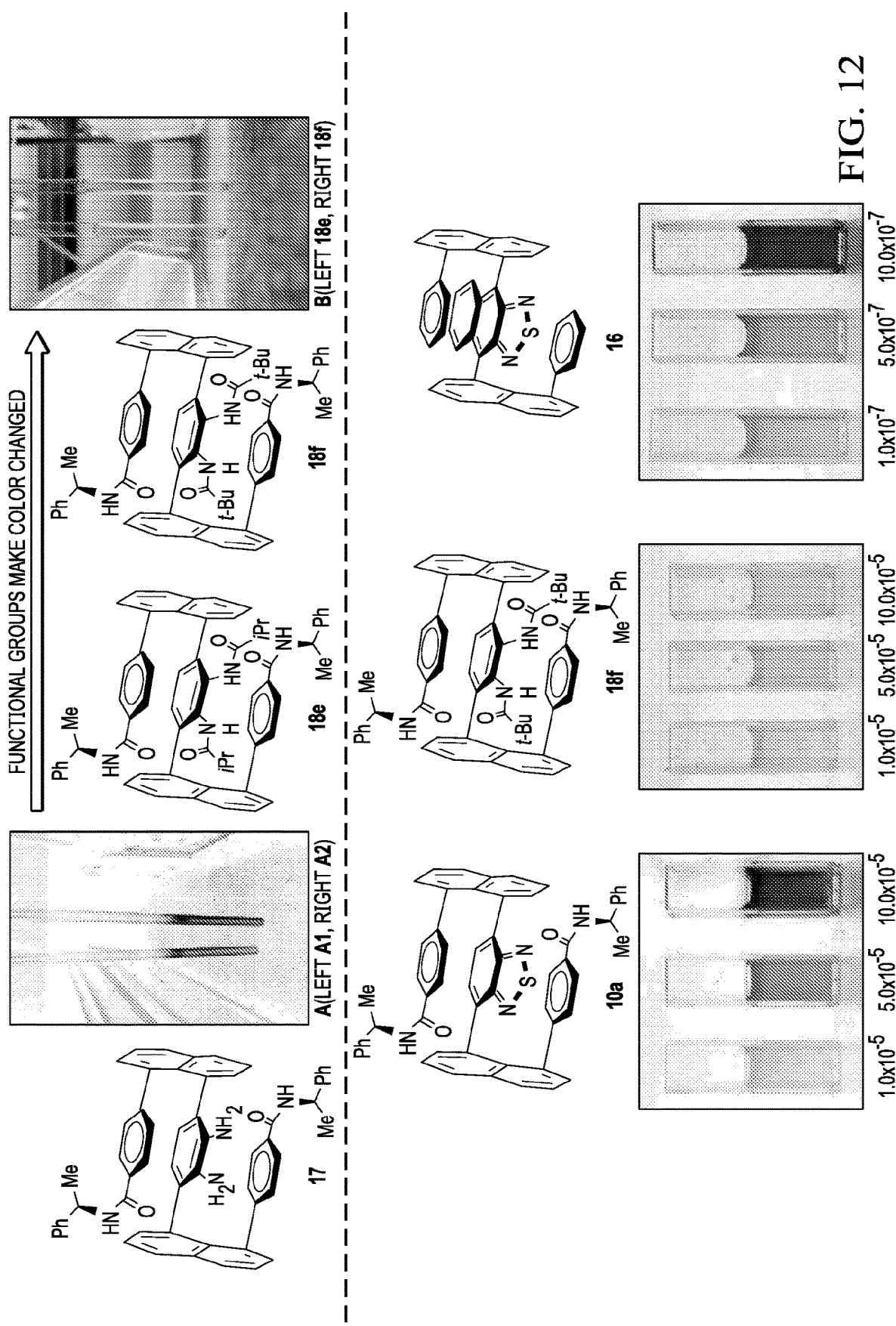
FIG. 12 shows the luminescence of CDCl3 solutions of samples 17, 18e and 18f in NMR tubes, [c](mg/ml): A, left=6.7 right=2.2; B, left (18e) and right (18f)=8. AIE displays of multi-layer 3D molecules: 10a; 18f and 16 in THF/water systems; (M).

The isolation of individual diastereomeric isomers of 4,4'-((2,3-di-alkylamido-1,4-phenylene)bis(naphthalene-8, 1-diyl))-bis(N-((R)-1-phenylethyl)benzamide) (18e & 18f) and their symmetrically substituted derivatives (20a-20d) enabled us to convert them into corresponding enantiomenc isomers under mild conditions at 0° C. to r.t. [94,95]. The inventors conducted this transformation by stirring a cold anhydrous DCM solution containing the diastereomerically pure isomers above together with pyridine and Tf$_2$O for 30 min, and then warmed up to room temperature, kept stirring the reaction mixture for about 6-8 hours until the starting materials are consumed as monitored by TLC. As revealed by FIG. 10C that modest to good yields (43% to 81%) were achieved for six cases with their optical rotation data measured. It is interesting to note that all these six enantiomers showed positive optical rotation data, albeit these numbers vary substantially from $[\alpha]_D25=36.4$ to 210.0. Qualitative examination of fluorescence sensitivity was conducted on randomly selected samples in NMR tubes with CDCl$_3$ as solvent. As shown in FIG. 12A that the vicinal free diamino compound 17 displayed gold color. Sample 17-A2 with a higher concentration showed stronger fluorescence activity than 17-A1 with a lower concentration, indicating its potential as aggregation-induced emission (AIE) and bioanalytical probe candidate in future [37, 96-99]. The corresponding NN-bis-isobutyryl and N,N-bis-pivaloyl protected samples 18e and 18f displayed the same blue color. Intriguingly, these two protection groups were able to convert the color from gold to blue, indicating there are great potentials for structure-activity-relationship (SAR) study on these compounds serving for AIE materials by changing protection groups on diamino functionality on the aromatic rings.

Finally, naphtho[2,3-c][1,2,5]thiadiazole was used as the bridge for assembling this series of fully C—C anchored 3D chiral targets. The racemic product 16 was formed; its structure has been unambiguously confirmed by X-ray diffractional analysis (FIG. 8D). Intriguingly, even in its solid form, the product 16 showed strong fluorescence sensitivity under UV light at 365 nm (FIG. 11-(b)-C2). This racemic compound and two other chiral multi-layer 3D products, 10a and 18f, displayed aggregation-induced emission (AIE) properties (FIG. 12) in which the higher fraction of water, the stronger the luminescence.

Thus, the inventors demonstrate the first enantioselective total synthesis of sandwich-shaped organic targets of multi-layer 3D chirality. Asymmetric dual Suzuki-Miyarua couplings were proven to be a suitable tool for this 3D assembly by taking advantage of chiral amide-derived boronic acids and other reactions. This work presents the first design of fully C—C anchored multi-layer 3D chirality as represented by six optically pure enantiomers; each of them takes seven to ten synthetic steps. The absolute structure of this fully C—C anchored multi-layer 3D chirality has been unambiguously confirmed by X-ray diffractional analysis. Unlike well-known planar or axial chirality in literature, the present chirality would not exist if it lacks a third layer either above or below the central aromatic ring. Nearly all resulting multi-layer 3D chiral products in this work displayed strong fluorescence activity of different colors and aggregation-induced emission (AIE) properties under UV irradiation. The conversions of cyanide functional group on multi-layer 3D chiral products into many other groups and interdisciplinary collaboration on this project among chemistry, pharmaceutical and material sciences is now possible.

Unless otherwise stated, all reactions were magnetically stirred and conducted in oven-dried glassware in anhydrous solvents under Ar. Solvents and liquid reagents, as well as solutions of solid or liquid reagents were added via syringes, stainless steel or polyethylene cannulas through rubber septa or through a weak Ar counter-flow. Cooling baths were prepared in Dewar vessels, filled with ice/water (0° C.) or dry ice/acetone (−78° C.). Heated oil baths were used for reactions requiring elevated temperatures. Solvents were removed under reduced pressure at 40-65° C. using a rotavapor. All given yields are isolated yields of chromatographically and NMR spectroscopically materials.

All commercially available chemicals were used as received without further purification. Solvents as follows: EtOH, toluene, hexane, EA, ether, DCM, dioxane, acetone, TEA, DMF, water were used without further purification. THF and DCM are delivered from an Innovation Technology solvent system.

The $^1$H and $^{13}$C NMR spectra were recorded in CDCl$_3$ or DMSO-d$_6$ on 400 MHz and 500 MHz instruments with TMS as internal standard. For referencing of the $^1$H NMR spectra, the residual solvent signal (δ=7.26 for CDCl$_3$ and δ=2.50 for DMSO-d$_6$) were used. In the case of the $^{13}$C NMR spectra, the signal of solvents (δ=7.16 for CDCl$_3$ and δ=39.52 for DMSO-d$_6$) were used. Chemical shifts (δ) were reported in ppm with respect to TMS. Data are represented as follows: chemical shift, multiplicity (s=singlet, d=doublet, t=triplet, m=multiplet), coupling constant (J, Hz), and integration. HRMS analyses were carried out using a TOF-MS instrument with an ESI source. Optical rotations were measured with a Rudolph Research Analytical APIV/2W Polarimeter at the indicated temperature with a sodium lamp. Measurements were performed in a 2 ml with concentrations (g/(100 ml)) reported in the corresponding solvent. X-Ray crystallographic analysis was performed with a SMART CCD and a P4 diffractometer. X-ray data were collected on a Rigaku XtaLAB Synergy-i Kappa diffractometer equipped with a PhotonJet-i X-ray source operated at 50 W (50 kV, 1 mA) to generate Cu Kα radiation (λ=1.54178 Å) and a HyPix-6000HE HPC detector.

Synthetic Procedures and Data 2 and 3 were synthesized from 4,7-Dibromo-2,1,3-benzothiadiazole following the reported procedure [1] with very minor modification.

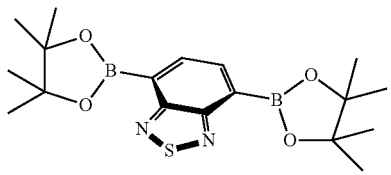

4,7-bis(4,4,5,5-tetramethyl-1,3,2-dioxaborolan-2-yl)benzo[c][1,2,5]thiadiazole (2): yellow solid, 82% yield. H NMR (400 MHz, CHLOROFORM-D) δ 8.10 (d, J=8.8 Hz, 2H), 1.46-1.38 (m, 24H). MS(ESI): m/z, 389.2 [M+H]$^+$.

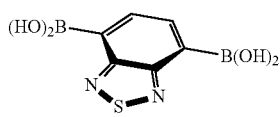

benzo[c][1,2,5]thiadiazole-4,7-diyldiboronic acid (3): yellow solid, 95% yield. $^1$H NMR (400 MHz, DMSO-D6) δ 8.51-8.22 (m, 4H), 7.96 (s, 2H). MS(ESI): m/z, 225.0 [M+H]$^+$.

Data for 4

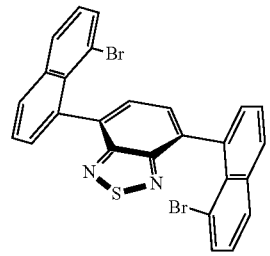

4,7-bis(8-bromonaphthalen-1-yl)benzo[c][1,2,5]thiadiazole (4): green yellow solid, 55% yield. $^1$H NMR (400 MHz, CHLOROFORM-D) δ 8.04-7.99 (m, 2H), 7.96 (dd, J=8.2, 1.0 Hz, 2H), 7.79-7.57 (m, 8H), 7.34 (dd, J=15.2, 7.3 Hz, 2H); $^{13}$C NMR (101 MHz, CHLOROFORM-D) δ 155.55, 155.48, 136.58, 136.22, 136.17, 135.95, 135.82, 135.52, 133.83, 133.75, 132.02, 131.84, 130.58, 130.39, 130.37, 130.31, 129.42, 129.37, 129.18, 128.85, 126.51, 126.45, 125.71, 125.70, 120.64, 119.93. HRMS (ESI-TOF) m/z [C$_{26}$H$_{14}$Br$_2$N$_2$S+H]$^+$ calcd for 545.9395, found 545.9383.

General Procedure for 6a-6f

4-Carboxybenzeneboronic acid (0.16 g, 1.0 mmol) was introduced into a round bottom flask followed by PyBOP (1.04 g, 2.0 mmol) and 5 ml DMF. The mixture was stirred for 5 min and chiral amine (2.0 mmol) was added. After 14 hours, the reaction mixture was diluted with EA (40 ml) and the organic layer was washed with water (3×20 ml). The solvent was evaporated under reduced pressure and the residue was purified by flash chromatography on silica gel (hexane/EA, 10/1 to 4/1) to afford pure product. Or using acid-base purification by adjusting pH of the crude product to afford pure product as white solid.

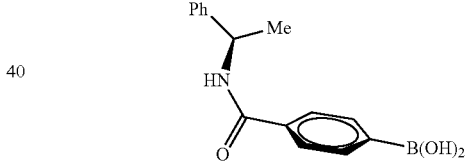

(R)-(4-((1-phenylethyl)carbamoyl)phenyl)boronic acid (6a): [α]$_D$25=-28.0 (c=1.1, MeOH); white solid, 67% yield. H NMR (400 MHz, DMSO-D6) δ 8.75 (d, J=5.7 Hz, 1H), 8.15 (d, J=3.2 Hz, 2H), 7.92-7.67 (m, 4H), 7.41-7.12 (m, 5H), 5.19-5.01 (m, 1H), 1.43 (dd, J=6.9, 2.9 Hz, 3H).

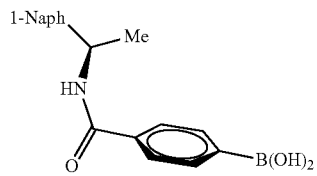

(R)-(4-((1-(naphthalen-1-yl)ethyl)carbamoyl)phenyl)boronic acid (6b): [α]$_D$25=-108.8 (c=1.0, MeOH); white solid, 75%. H NMR (400 MHz, DMSO-D6) δ 8.95 (d, J=7.9 Hz, 1H), 8.17 (d, J=8.3 Hz, 1H), 7.95 (d, J=8.4 Hz, 1H), 7.92-7.88 (m, 1H), 7.83 (s, 4H), 7.78 (d, J=8.2 Hz, 1H), 7.69 (dt, J=8.4, 0.9 Hz, 1H), 7.60 (d, J=6.8 Hz, 1H), 7.55-7.33 (m, 4H), 5.93 (p, J=7.0 Hz, 1H), 1.58 (d, J=6.9 Hz, 3H); $^{13}$C NMR (101 MHz, DMSO-D6) δ=166.11, 140.97, 136.23, 134.43, 133.89, 130.95, 129.19, 127.75, 126.85, 126.71, 126.10, 126.03, 123.67, 123.11, 45.22, 22.02. HRMS (ESI-TOF) m/z [C$_{19}$H$_{18}$BNO$_3$+H]$^+$ calcd for 320.1458, found 320.1448.

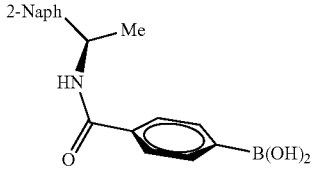

(R)-(4-((1-(naphthalen-2-yl)ethyl)carbamoyl)phenyl)boronic acid (6c): [α]$_D$25=+42.9 (c=0.7, MeOH); white solid, 79%. H NMR (400 MHz, DMSO-D6) δ 8.93 (t, J=12.1 Hz, 1H), 8.21 (s, 2H), 7.95-7.73 (m, 8H), 7.63-7.50 (m, 1H), 7.49-7.33 (m, 2H), 5.32 (p, J=7.0 Hz, 1H), 1.54 (d, J=7.0 Hz, 3H); $^{13}$C NMR (101 MHz, DMSO-D6) 6=166.13, 142.80, 136.16, 134.30, 133.23, 132.42, 128.27, 128.03, 127.82, 126.70, 126.48, 125.96, 125.41, 124.49, 49.00, 22.45. HRMS (ESI-TOF) m/z [C$_{19}$H$_{18}$BNO$_3$+H]$^+$ calcd for 320.1458, found 320.1467.

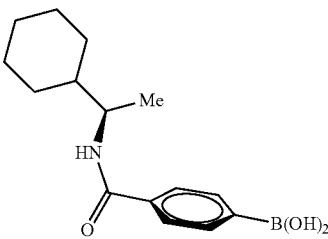

(R)-(4-((1-cyclohexylethyl)carbamoyl)phenyl)boronic acid (6d): [α]$_D$25=−22.6 (c=0.8, MeOH); white solid, 83%. $^1$H NMR (400 MHz, DMSO-D6) δ 8.15 (s, 2H), 8.07 (d, J=8.7 Hz, 1H), 7.82-7.76 (m, 2H), 7.74 (d, J=8.2 Hz, 2H), 3.86-3.71 (m, 1H), 1.74-1.60 (m, 4H), 1.56 (d, J=9.3 Hz, 1H), 1.36 (ddd, J=11.1, 9.6, 5.9 Hz, 1H), 1.17-1.02 (m, 6H), 0.89 (td, J=11.9, 3.2 Hz, 2H); $^{13}$C NMR (101 MHz, DMSO-D6) 6=166.21, 136.77, 134.34, 126.66, 49.71, 42.91, 29.82, 29.51, 26.55, 26.28, 18.22.

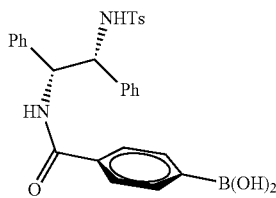

(4-(((1R,2R)-2-((4-methylphenyl)sulfonamido)-1,2-diphenylethyl)carbamoyl)phenyl)boronic acid (6e): [α]$_D$25=+55.5 (c=0.8, MeOH); white solid, 67%. $^1$H NMR (400 MHz, DMSO-D6) δ 8.74 (d, J=9.1 Hz, 1H), 8.54 (d, J=9.4 Hz, 1H), 8.25-8.18 (m, 1H), 7.87-7.80 (m, 1H), 7.76-7.69 (m, 1H), 7.25 (d, J=8.0 Hz, 1H), 7.20-7.04 (m, 7H), 6.94 (dt, J=13.4, 7.7 Hz, 4H), 6.84-6.82 (m, 2H), 6.76 (d, J=6.3 Hz, 1H), 5.48-4.78 (m, 1H), 4.63-4.42 (m, 1H), 2.19-2.13 (m, 4H), 1.71-1.62 (m, 2H); $^{13}$C NMR (101 MHz, DMSO-D6) 6=166.55, 142.64, 142.15, 140.64, 139.85, 139.06, 138.85, 138.51, 138.22, 136.06, 134.64, 134.43, 129.39, 129.30, 128.35, 128.19, 128.10, 127.87, 127.69, 126.89, 126.71, 126.56, 126.49, 46.39, 46.35, 26.48, 26.40, 21.33. HRMS (ESI-TOF) m/z [C$_{28}$H$_{27}$BN$_2$O$_5$S+H]$^+$ calcd for 515.1812, found 515.1846.

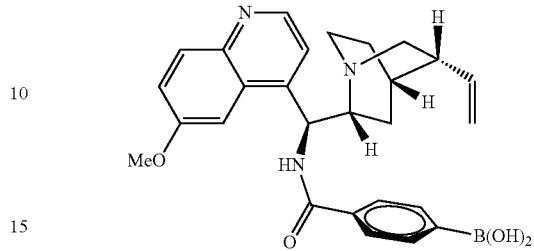

(4-(((1S)-(6-methoxyquinolin-4-yl)((2R,4S,5R)-5-vinylquinuclidin-2-yl)methyl)carbamoyl)phenyl)boronic acid (6f): [α]$_D$25=−23.5 (c=1.1, MeOH); pale orange solid, 47%. $^1$H NMR (400 MHz, DMSO-D6) δ 9.07 (s, 1H), 8.75 (d, J=4.5 Hz, 1H), 8.23 (s, 1H), 7.99-7.53 (m, 8H), 7.48-7.28 (m, 1H), 6.14-5.93 (m, 1H), 5.17 (dd, J=22.7, 13.8 Hz, 1H), 4.34 (s, 1H), 3.88 (s, 3H), 3.63-3.08 (m, 6H), 2.69 (d, J=15.8 Hz, 1H), 2.01-1.78 (m, 2H), 1.13 (d, J=6.3 Hz, 1H); $^{13}$C NMR (101 MHz, DMSO-D6) δ 168.05, 167.12, 158.21, 148.08, 144.69, 139.30, 135.05, 134.65, 134.33, 132.50, 131.92, 128.64, 127.25, 122.17, 120.79, 119.55, 117.11, 103.17, 59.13, 56.18, 53.92, 48.80, 42.10, 37.05, 26.68, 24.99, 24.01. HRMS (ESI-TOF) m/z [C$_{27}$H$_{30}$BN$_3$O$_4$+H]$^+$ calcd for 472.2407, found 472.2405.

General Procedure for 8a-8c

Different substituted benzoic acid (2 mmol) was introduced into a round bottom flask followed by PyBOP (4 mmol) and 50 ml DMF. The reaction mixture was stirred for 5 min and (R)-(+)-1-Phenylethylamine (4 mmol) was added. After 48 hours, the reaction mixture was diluted with EA (40 ml) and the organic layer was washed with water (3×20 ml). The solvent was evaporated under reduced pressure and the residue was purified by flash chromatography (hexane/EA, 10/1 to 4/1) to afford pure product.

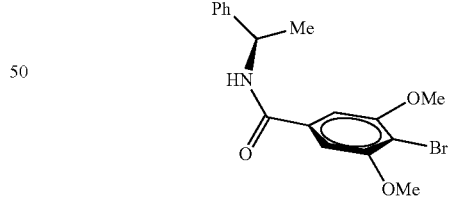

(R)-4-bromo-3,5-dimethoxy-N-(1-phenylethyl)benzamide (8a): [α]$_D$25=−24.2 (c=0.6, CH$_2$C2); white solid, 80% yield. $^1$H NMR (400 MHz, CHLOROFORM-D) δ 7.42-7.33 (m, 4H), 7.31-7.25 (m, 1H), 7.15 (d, J=11.0 Hz, 2H), 6.94 (s, 2H), 6.43 (d, J=7.6 Hz, 1H), 5.31 (p, J=7.0 Hz, 1H), 3.90 (d, J=7.8 Hz, 6H), 1.62 (d, J=6.9 Hz, 3H); $^{13}$C NMR (101 MHz, CHLOROFORM-D) 6166.18, 157.20, 142.95, 135.03, 128.88, 127.67, 126.41, 104.77, 103.32, 56.75, 49.58, 21.66. HRMS (ESI-TOF) m/z [C$_{17}$H$_{18}$BrNO$_3$+H]$^+$ calcd for 364.0548, found 364.0548.

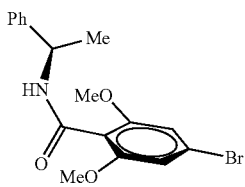

(R)-4-bromo-2,6-dimethoxy-N-(1-phenylethyl)benzamide (8b): [α]$_D$25=−25.2 (c=0.7, CH$_2$Cl$_2$); white solid, 53% yield. $^1$H NMR (400 MHz, CHLOROFORM-D) δ 7.40-7.22 (m, 5H), 6.91 (s, 2H), 6.53 (d, J=7.2 Hz, 1H), 5.28 (p, J=7.1 Hz, 1H), 3.86 (s, 6H), 1.59 (t, J=7.4 Hz, 3H); $^{13}$C NMR (101 MHz, CHLOROFORM-D) δ 166.19, 157.19, 142.97, 135.02, 128.87, 127.66, 126.41, 104.75, 103.32, 56.73, 49.58, 21.66. HRMS (ESI-TOF) m/z [C$_{17}$H$_{18}$BrNO$_3$+H]$^+$ calcd for 364.0548, found 364.0555.

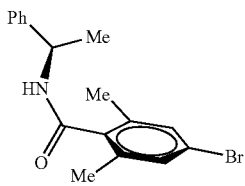

(R)-4-bromo-2,6-dimethyl-N-(1-phenylethyl)benzamide (8c): [α]$_D$25=+3.0 (c=1.1, CH$_2$Cl$_2$); white solid, 42% yield. $^1$H NMR (400 MHz, CHLOROFORM-D) δ 7.33-7.20 (m, 5H), 7.05 (s, 2H), 6.60 (d, J=8.3 Hz, 1H), 5.22 (dq, J=14.0, 7.0 Hz, 1H), 2.09 (d, J=6.1 Hz, 6H), 1.50 (d, J=7.0 Hz, 3H); $^{13}$C NMR (101 MHz, CHLOROFORM-D) δ 168.46, 143.14, 136.48, 136.31, 130.11, 128.64, 127.41, 126.46, 122.20, 48.78, 21.48, 18.82. HRMS (ESI-TOF) m/z [C$_{17}$H$_{18}$BrNO+H]$^+$ calcd for 332.065, found 332.066.

General Procedure for 9a-9c

To a dried and argon-flushed round bottom flask with a stir bar, dissolved bromide substrate (8a-8c) (10 mmol) into anhydrous THF and stirred for 5 min at −78° C. Transferred 1.6 M n-butyllithium (25 mmol) solution dropwise with syringe, stirred at −78° C. for 0.5 h. Then B(OMe)$_3$ (40 mmol) was added dropwise at −78° C.; reaction mixture was warmed up to r.t. and stirred for 8 h. Added 1 M HCl (10 mmol) and stirred the reaction for 6 h. Monitored by TLC analysis and exacted with EA, dried for column directly (Hexane/EA=5/1 to 1/1).

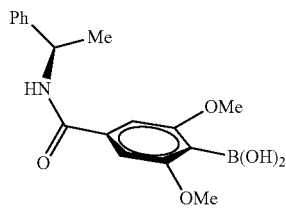

(R)-(2,6-dimethoxy-4-((1-phenylethyl)carbamoyl)phenyl)boronic acid (9a): [α]$_D$25=−15.0 (c=0.2, MeOH); white solid, 45% yield. $^1$H NMR (400 MHz, CHLOROFORM-D) δ 7.42-7.33 (m, 4H), 7.31-7.25 (m, 1H), 7.15 (d, J=11.0 Hz, 2H), 6.94 (s, 2H), 6.43 (d, J=7.6 Hz, 1H), 5.31 (p, J=7.0 Hz, 1H), 3.90 (d, J=7.8 Hz, 6H), 1.62 (d, J=6.9 Hz, 3H); $^{13}$C NMR (101 MHz, CHLOROFORM-D) δ 166.02, 165.53, 165.52, 142.81, 139.29, 128.94, 128.93, 128.92, 127.75, 126.44, 126.43, 126.42, 103.06, 56.45, 56.44, 56.43, 56.42, 56.41, 49.62, 26.66, 21.62, 14.00. HRMS (ESI-TOF) m/z [C$_{17}$H$_{20}$BNO$_5$+H]$^+$ calcd for 330.1513, found 330.1523.

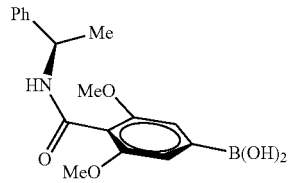

(R)-(3,5-dimethoxy-4-((1-phenylethyl)carbamoyl)phenyl)boronic acid (9b): [α]$_D$25=−23.8 (c=0.2, MeOH); white solid, 25% yield. $^1$H NMR (400 MHz, CHLOROFORM-D) δ 7.45-7.28 (m, 5H), 7.27-7.23 (m, 2H), 6.91 (s, 1H), 6.64 (s, 1H), 6.02 (dd, J=16.8, 8.2 Hz, 1H), 5.39-5.29 (m, 1H), 3.82-3.72 (m, 6H), 1.58-1.54 (m, 3H); $^{13}$C NMR (101 MHz, DMSO-D6) δ 165.86, 161.93, 145.43, 136.58, 128.79, 127.12, 126.56, 103.25, 55.93, 48.89, 27.00, 25.61, 22.74, 14.45. HRMS (ESI-TOF) m/z [C$_{17}$H$_{20}$BNO$_5$+H]$^+$ calcd for 330.1513, found 330.1516.

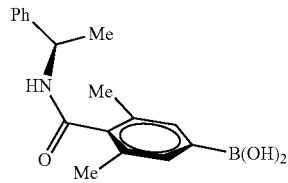

(R)-(3,5-dimethyl-4-((1-phenylethyl)carbamoyl)phenyl)boronic acid (9c): [α]$_D$25=+24.6 (c=1.0, MeOH); white solid, 21% yield. $^1$H NMR (400 MHz, DMSO-D6) δ 8.62 (d, J=7.4 Hz, 1H), 8.21 (s, 1H), 7.55-7.05 (m, 8H), 5.21-4.92 (m, 1H), 2.34-2.11 (m, 6H), 1.39 (dd, J=21.5, 7.4 Hz, 3H); $^{13}$C NMR (101 MHz, DMSO-D6) δ 166.34, 145.63, 138.98, 134.03, 128.72, 127.02, 126.54, 125.05, 48.78, 22.85, 22.43. HRMS (ESI-TOF) m/z [C$_{17}$H$_{20}$BNO$_3$+H]$^+$ calcd for 298.1614, found 298.1624.

Data for 10a-10f

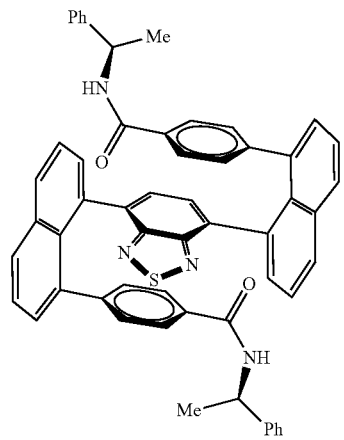

4,4'-(benzo[c][1,2,5]thiadiazole-4,7-diylbis(naphthalene-8,1-diyl))bis(N-((R)-1-phenylethyl)benzamide) (10a): green yellow solid, 48% yield. ¹H NMR (400 MHz, CHLOROFORM-D) δ 7.95 (dddd, J=32.8, 16.6, 8.2, 1.3 Hz, 4H), 7.60 (dt, J=15.0, 7.5 Hz, 1H), 7.54-7.46 (m, 2H), 7.43-7.31 (m, 4H), 7.27 (dt, J=3.8, 1.4 Hz, 2H), 7.24-7.08 (m, 12H), 7.01 (s, 1H), 6.88 (ddd, J=23.6, 8.0, 1.7 Hz, 2H), 6.58 (ddd, J=23.9, 8.0, 1.9 Hz, 2H), 6.44 (ddd, J=8.1, 6.4, 1.8 Hz, 2H), 5.84-5.64 (m, 2H), 5.14 (dp, J=32.6, 7.0 Hz, 2H), 1.48 (d, J=6.9 Hz, 2H), 1.27 (d, J=6.9 Hz, 4H); ¹³C NMR (101 MHz, CHLOROFORM-D) δ 165.77, 165.46, 153.26, 153.24, 145.65, 145.16, 143.25, 142.65, 138.94, 135.84, 135.36, 134.87, 134.84, 134.82, 134.79, 131.35, 131.12, 130.79, 130.65, 130.29, 130.20, 130.18, 129.97, 129.80, 129.69, 129.66, 129.61, 129.39, 129.12, 128.61, 128.58, 127.22, 127.14, 126.78, 126.27, 126.13, 126.04, 125.63, 125.57, 125.32, 125.25, 125.07, 124.93, 122.82, 122.20, 49.17, 48.91, 21.73, 21.45. HRMS (ESI-TOF) m/z [C₅₆H₄₂N₄O₂S+K]⁺ calcd for 857.2816, found 875.2776.

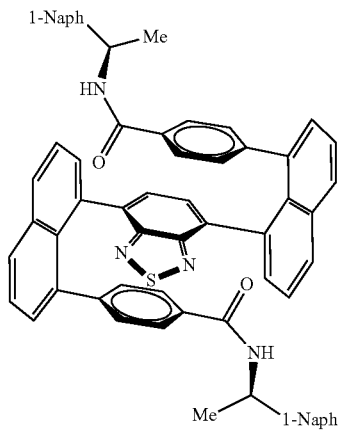

4,4'-(benzo[c][1,2,5]thiadiazole-4,7-diylbis(naphthalene-8,1-diyl))bis(N-((R)-1-(naphthalen-1-yl)ethyl)benzaiide) (10b): yellow solid, 16%. ¹H NMR (400 MHz, CHLOROFORM-D) δ 8.07-7.93 (m, 5H), 7.92-7.86 (m, 1H), 7.85-7.64 (m, 6H), 7.53-7.40 (m, 6H), 7.39-7.27 (m, 9H), 7.12 (d, J=2.5 Hz, 2H), 7.11-6.82 (m, 4H), 6.66-6.36 (m, 4H), 6.01-5.72 (m, 4H), 1.65 (d, J=5.7 Hz, 2H), 1.49 (d, J=6.7 Hz, 4H); ¹³C NMR (101 MHz, CHLOROFORM-D) δ=165.78, 153.39, 145.38, 139.09, 138.44, 135.94, 135.07, 134.99, 134.00, 131.42, 131.08, 130.84, 130.46, 130.28, 129.91, 129.83, 129.77, 129.27, 128.87, 128.35, 126.95, 126.80, 126.55, 125.95, 125.90, 125.87, 125.55, 125.34, 125.22, 123.42, 123.38, 122.68, 122.41, 45.45, 20.97. HRMS (ESI-TOF) m/z [C₆₄H₄₆N₄O₂S+Na]⁺ calcd for 959.3390, found 959.3390.

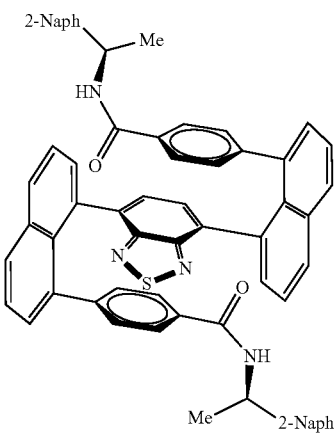

4,4'-(benzo[c][1,2,5]thiadiazole-4,7-diylbis(naphthalene-8,1-diyl))bis(N-((R)-1-(naphthalen-2-yl)ethyl)benzamide) (10c): yellow solid, 37%. ¹H NMR (400 MHz, CHLOROFORM-D) δ 7.94 (d, J=8.1 Hz, 2H), 7.80-7.68 (m, 5H), 7.66-7.56 (m, 5H), 7.55-7.41 (m, 6H), 7.40-7.35 (m, 3H), 7.35-7.30 (m, 2H), 7.29-7.25 (m, 1H), 7.24-7.02 (m, 6H), 6.91-6.83 (m, 2H), 6.65-6.41 (m, 4H), 5.84 (dd, J=55.2, 7.3 Hz, 2H), 5.35 (p, J=6.6 Hz, 1H), 5.26 (p, J=7.0 Hz, 1H), 1.44 (dd, J=69.7, 13.2 Hz, 6H); ¹³C NMR (101 MHz, CHLOROFORM-D) δ=165.66, 153.13, 145.45, 145.06, 140.41, 139.80, 138.74, 135.64, 134.66, 134.56, 133.08, 132.46, 132.41, 131.20, 130.48, 130.11, 129.93, 129.91, 129.59, 129.50, 129.46, 128.96, 128.22, 127.80, 127.66, 127.33, 127.25, 126.75, 125.92, 125.86, 125.59, 125.43, 125.12, 124.89, 124.63, 124.40, 124.38, 124.29, 122.11, 49.10, 29.48, 21.48. HRMS (ESI-TOF) m/z [C₆₄H₄₆N₄O₂S+H]⁺ calcd for 936.3492, found 936.3477.

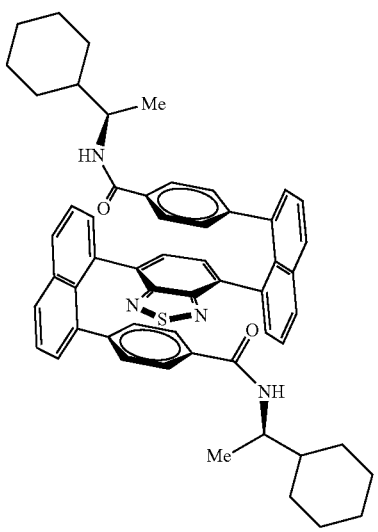

4,4'-(benzo[c][1,2,5]thiadiazole-4,7-diylbis(naphthalene-8,1-diyl))bis(N-((R)-1-cyclohexylethyl)benzamide) (10d): yellow solid, 41%. $^1$H NMR (400 MHz, CHLOROFORM-D) δ 8.03-7.88 (m, 4H), 7.70-7.60 (m, 2H), 7.48 (t, J=7.6 Hz, 2H), 7.39-7.27 (m, 4H), 7.14 (dt, J=6.9, 4.9 Hz, 2H), 7.11-6.94 (m, 2H), 6.92-6.76 (m, 2H), 6.56 (ddd, J=33.3, 8.0, 1.7 Hz, 2H), 6.46-6.38 (m, 2H), 5.49 (dd, J=14.6, 6.8 Hz, 1H), 5.33 (d, J=8.5 Hz, 1H), 3.94-3.80 (m, 2H), 1.59 (dd, J=31.3, 21.6 Hz, 10H), 1.32-1.21 (m, 2H), 1.12-0.83 (m, 16H); $^{13}$C NMR (101 MHz, CHLOROFORM-D) δ=165.77, 153.24, 145.37, 144.98, 144.97, 138.97, 138.96, 135.75, 135.26, 134.88, 134.86, 131.80, 130.76, 130.60, 130.19, 129.66, 129.65, 129.51, 129.03, 127.35, 126.68, 125.67, 125.37, 125.02, 122.72, 121.93, 49.59, 43.00, 42.99, 29.05, 28.74, 26.30, 26.06, 26.04, 17.46. HRMS (ESI-TOF) m/z [$C_{56}H_{54}N_4O_2S+H$]$^+$ calcd for 848.4118, found 848.4107.

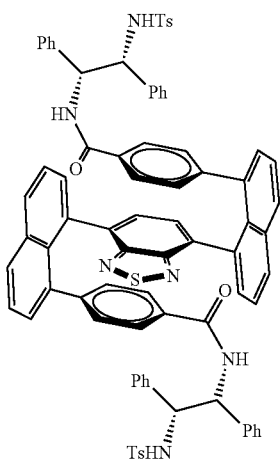

N-((1R,2R)-2-((4-methylphenyl)sulfonamido)-1,2-diphenylethyl)-4-(8-(7-(8-(4-(((1R,2R)-2-((4-methylphenyl)sulfonamido)-1,2-diphenylethyl)carbamoyl)phenyl)naphthalen-1-yl)benzo[c][1,2,5]thiadiazol-4-yl)naphthalen-1-yl)benzamide (10e): pale yellow solid, 31%. $^1$H NMR (400 MHz, CHLOROFORM-D) δ 7.97-7.74 (m, 4H), 7.43 (dd, J=14.2, 7.2 Hz, 3H), 7.30 (t, J=9.3 Hz, 5H), 7.12 (dd, J=17.6, 6.8 Hz, 7H), 7.03 (d, J=6.5 Hz, 4H), 6.95 (dd, J=12.6, 6.8 Hz, 4H), 6.92-6.77 (m, 11H), 6.71 (t, J=7.3 Hz, 3H), 6.61 (d, J=7.9 Hz, 1H), 6.50 (d, J=7.5 Hz, 1H), 6.34 (d, J=7.9 Hz, 1H), 5.85 (t, J=32.8 Hz, 2H), 5.16 (dd, J=9.8, 6.7 Hz, 1H), 5.08 (dd, J=13.6, 6.8 Hz, 1H), 4.49 (t, J=9.2 Hz, 1H), 4.38 (t, J=9.2 Hz, 1H), 2.21 (d, J=10.6 Hz, 6H), 1.58 (s, 6H); $^{13}$C NMR (126 MHz, cdcl$_3$) δ=167.24, 166.90, 153.21, 153.06, 146.05, 142.91, 142.84, 139.22, 139.08, 138.09, 137.58, 137.42, 137.20, 135.81, 135.41, 134.93, 134.77, 134.70, 130.76, 130.52, 130.42, 130.15, 129.93, 129.80, 129.63, 129.16, 128.47, 128.39, 128.16, 128.00, 127.58, 127.33, 126.79, 126.48, 126.14, 125.84, 125.48, 125.03, 122.91, 72.53, 70.49, 69.92, 66.73, 63.71, 63.09, 61.84, 59.05, 31.93, 29.71, 22.70, 21.38, 15.09, 14.14. HRMS (ESI-TOF) m/z [$C_{82}H_{64}N_6O_6S_3+H$]$^+$ calcd for 1326.4200, found 1326.4237.

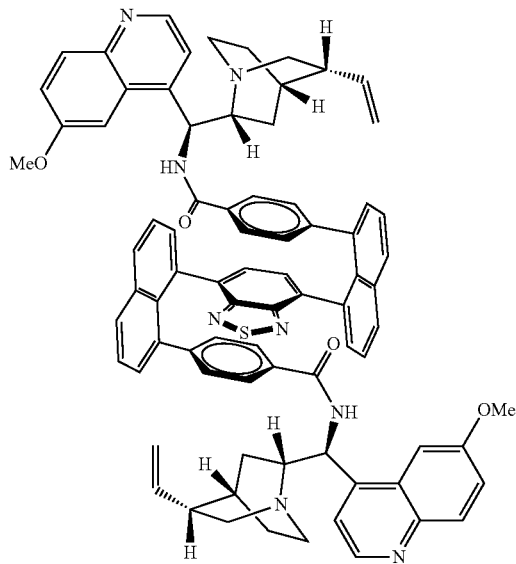

4,4'-(benzo[c][1,2,5]thiadiazole-4,7-diylbis(naphthalene-8,1-diyl))bis(N-((1S)-(6-methoxyquinolin-4-yl)((2R,4S,5R)-5-vinylquinuclidin-2-yl)methyl)benzamide) (10f): green yellow solid, 20% yield. $^1$H NMR (400 MHz, DMSO-D6) δ 8.72-8.65 (m, 2H), 8.30 (s, 2H), 8.09-7.68 (m, 9H), 7.60 (d, J=4.6 Hz, 2H), 7.56-7.24 (m, 8H), 7.08-6.85 (m, 4H), 6.83-6.70 (m, 6H), 6.50-6.37 (m, 1H), 6.28 (dd, J=8.0, 1.5 Hz, 2H), 6.15 (dd, J=8.0, 1.6 Hz, 1H), 5.77 (dt, J=17.3, 7.7 Hz, 3H), 5.02-4.82 (m, 5H), 3.94 (d, J=21.6 Hz, 6H), 3.06-2.96 (m, 2H), 2.61 (t, J=21.8 Hz, 3H), 2.36-2.22 (m, 2H), 2.21-2.09 (m, 2H), 1.57-1.15 (m, 11H); $^{13}$C NMR (101 MHz, CHLOROFORM-D) δ 214.17, 170.49, 170.00, 169.40, 161.05, 160.84, 156.39, 156.30, 151.26, 150.94, 149.15, 148.63, 147.94, 144.08, 142.35, 142.03, 139.04, 138.37, 138.28, 137.95, 137.84, 137.69, 136.95, 135.11, 134.98, 134.93, 134.17, 133.98, 133.92, 133.47, 133.37, 133.06, 132.62, 132.39, 132.19, 131.72, 130.58, 130.45, 130.02, 128.97, 128.54, 128.33, 128.23, 128.09, 126.50, 126.16, 124.79, 124.38, 118.26, 118.01, 105.36, 105.04, 72.73, 59.20, 58.89, 58.87, 58.79, 56.98, 44.17, 43.76, 43.29, 42.54, 42.45, 35.14, 34.98, 32.92, 32.58, 32.47, 30.92, 30.48, 30.42, 29.00, 25.92, 17.36, 4.24. HRMS (ESI-TOF) m/z [$C_{80}H_{70}N_8O_4S+H$]$^+$ calcd for 1240.5392, found 1240.5392.

Data for 11

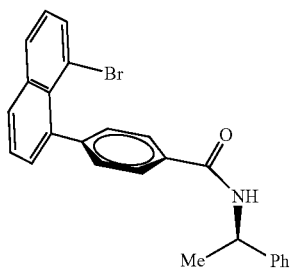

(R)-4-(8-bromonaphthalen-1-yl)-N-(1-phenylethyl)benzamide (11): white solid, 49% yield. $^1$H NMR (400 MHz, CHLOROFORM-D) δ 7.89 (dt, J=8.2, 1.5 Hz, 2H), 7.83-7.73 (m, 3H), 7.52-7.47 (m, 1H), 7.45-7.34 (m, 7H), 7.33-7.26 (m, 2H), 6.38 (d, J=7.3 Hz, 1H), 5.38 (p, J=7.0 Hz, 1H), 1.63 (t, J=5.9 Hz, 3H); $^{13}$C NMR (101 MHz, CHLOROFORM-D) δ 166.63, 146.50, 143.33, 139.38, 136.15, 133.92, 133.10, 131.23, 130.43, 130.41, 129.48, 129.43, 129.06, 128.86, 127.55, 126.46, 126.37, 126.26, 126.18, 125.40, 120.05, 49.38, 21.87. HRMS (ESI-TOF) m/z $[C_{25}H_{20}BrNO+H]^+$ calcd for 430.0806, found 430.0825.

Synthesis for 12

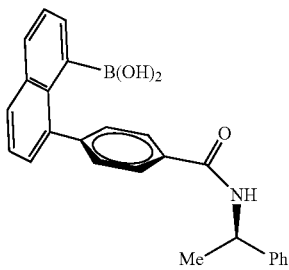

Synthesis of (R)-(8-(4-((1-phenylethyl)carbamoyl)phenyl)naphthalen-1-yl)boronic acid (12)

To a dried and argon-flushed round bottom flask with a stir bar, dissolved bromide substrate 11 (10 mmol) into anhydrous THF and stirred for 5 min at −78° C. Transferred 1.6 M n-butyllithium (25 mmol) solution dropwise with syringe, stir at −78° C. for 0.5 h. B(OMe)$_3$ (40 mmol) was added dropwise at −78° C.; reaction mixture was warmed up to r.t. and stirred for 8 h. Added 1 M HCl (10 mmol) and stirred the reaction for 6 h. Monitored by TLC analysis and exacted with EA. The organic phase was combined, dried with MgSO$_4$, and the solvent was evaporated under reduced pressure. The crude product was used without further purification.

Data for 13a-13c

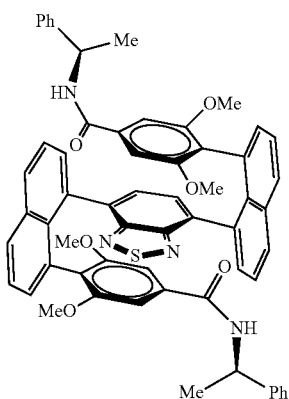

4,4'-(benzo[c][1,2,5]thiadiazole-4,7-diylbis(naphthalene-8,1-diyl))bis(3,5-dimethoxy-N-((R)-1-phenylethyl)benzamide) (13a): bright yellow solid, 70% yield. $^1$H NMR (400 MHz, CHLOROFORM-D) δ 8.01-7.87 (m, 4H), 7.57-7.47 (m, 3H), 7.43-7.36 (m, 1H), 7.31-7.19 (m, 12H), 7.07 (d, J=7.0 Hz, 2H), 6.93 (d, J=28.2 Hz, 2H), 6.56 (dd, J=18.8, 0.8 Hz, 2H), 5.82 (dd, J=54.8, 22.4 Hz, 4H), 5.17 (qd, J=13.6, 6.8 Hz, 2H), 3.62-3.50 (m, 6H), 3.35-3.15 (m, 6H), 1.52 (t, J=6.6 Hz, 2H), 1.37 (d, J=6.9 Hz, 4H); $^{13}$C NMR (101 MHz, DMSO-D6) δ 164.97, 164.89, 156.54, 156.44, 156.32, 156.31, 153.58, 153.57, 145.24, 135.89, 135.76, 134.86, 134.81, 134.03, 133.95, 133.47, 133.08, 131.91, 131.89, 131.39, 131.37, 131.10, 130.35, 130.24, 129.53, 128.96, 128.74, 127.10, 127.07, 126.69, 126.63, 125.65, 122.75, 122.48, 55.86, 55.61, 55.13, 54.94, 48.87, 48.81, 22.64, 22.60. HRMS (ESI-TOF) m/z $[C_{60}H_{50}N_4O_6S+H]^+$ calcd for 956.3602, found 956.3585.

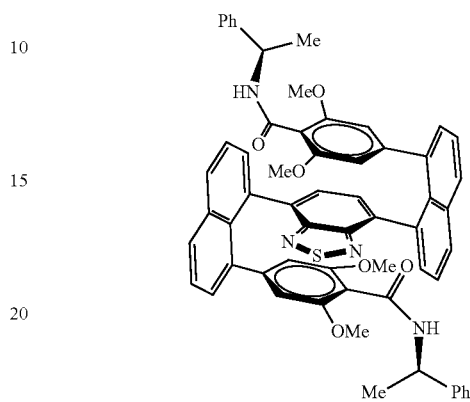

4,4'-(benzo[c][1,2,5]thiadiazole-4,7-diylbis(naphthalene-8,1-diyl))bis(2,6-dimethoxy-N-((R)-1-phenylethyl)benzamide) (13b): bright yellow solid, 70% yield. $^1$H NMR (400 MHz, CHLOROFORM-D) δ 8.02-7.88 (m, 3H), 7.83 (dt, J=13.8, 6.9 Hz, 1H), 7.71 (dd, J=7.0, 1.3 Hz, 1H), 7.61-7.53 (m, 2H), 7.53-7.44 (m, 2H), 7.32-7.24 (m, 5H), 7.23-7.13 (m, 8H), 7.04 (d, J=14.4 Hz, 2H), 6.07-5.85 (m, 2H), 5.66-5.56 (m, 3H), 5.50 (d, J=8.0 Hz, 1H), 5.24-5.07 (m, 2H), 3.67-3.53 (m, 6H), 3.37-3.23 (m, 6H), 1.34 (d, J=6.9 Hz, 2H), 1.27 (d, J=7.0 Hz, 4H); $^{13}$C NMR (101 MHz, CHLOROFORM-D) δ 164.52, 164.39, 155.62, 155.40, 155.15, 154.82, 153.90, 153.65, 145.45, 144.91, 143.53, 143.36, 139.85, 139.77, 135.80, 135.31, 135.26, 134.96, 134.93, 134.87, 130.82, 130.78, 130.64, 130.43, 130.31, 129.87, 129.70, 129.58, 129.54, 129.01, 128.96, 128.45, 128.29, 126.97, 126.92, 126.43, 126.37, 126.01, 125.84, 125.12, 125.09, 113.16, 112.97, 106.60, 106.24, 105.73, 104.69, 55.85, 55.56, 55.43, 55.32, 49.09, 48.87, 29.79, 21.91, 14.22. HRMS (ESI-TOF) m/z $[C_{60}H_{50}N_4O_6S+H]^+$ calcd for 956.3602, found 956.3585.

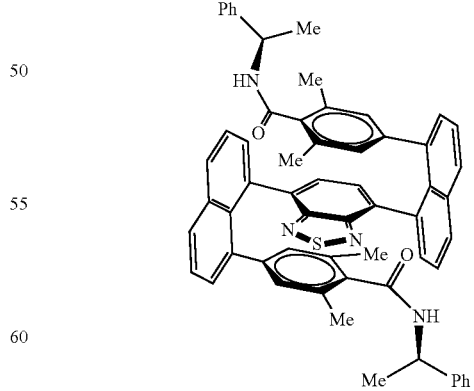

4,4'-(benzo[c][1,2,5]thiadiazole-4,7-diylbis(naphthalene-8,1-diyl))bis(2,6-dimethyl-N-((R)-1-phenylethyl)benzamide) (13c): bright yellow solid, 23% yield. $^1$H NMR (400 MHz, DMSO-D6) δ 8.20 (ddd, J=31.9, 17.2, 10.9 Hz, 2H), 8.11-7.95 (m, 4H), 7.84-7.66 (m, 2H), 7.61-7.43 (m, 4H), 7.39-7.07 (m, 11H), 7.06-6.72 (m, 4H), 6.48 (ddd, J=45.0, 29.6, 14.3 Hz, 2H), 6.02-5.68 (m, 1H), 5.10 (qd, J=15.2, 8.0 Hz, 2H), 2.02-1.89 (m, 2H), 1.83-1.69 (m, 3H), 1.51 (d, J=14.5 Hz, 1H), 1.40-1.04 (m, 12H); $^{13}$C NMR (101 MHz, DMSO-D6) δ 168.79, 168.67, 168.43, 168.40, 154.03, 145.56, 145.50, 142.62, 142.55, 140.51, 140.44, 140.37, 140.35, 138.56, 138.28, 136.39, 136.33, 135.82, 135.36, 135.27, 135.20, 133.16, 132.69, 132.55, 132.35, 130.79, 130.25, 129.87, 129.64, 129.48, 129.41, 129.30, 129.17, 129.11, 129.06, 129.03, 127.60, 127.48, 127.18, 127.12, 127.05, 126.75, 126.27, 126.22, 125.79, 125.50, 48.90, 48.65, 42.22, 32.36, 32.02, 23.10, 22.82, 19.68, 19.57, 19.16, 19.01, 14.85. HRMS (ESI-TOF) m/z $[C_{60}H_{50}N_4O_2S+Na]^+$ calcd for 915.3714, found 915.3703.

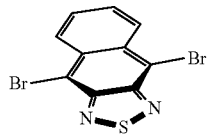

Synthesis of 4,9-dibromonaphtho[2,3-c][1,2,5]thiadiazole (14)

14 was synthesized from 2,3-Diaminonaphthalene following the reported procedure [2] with very minor modification. $^1$H NMR (400 MHz, CHLOROFORM-D) δ 8.45-8.38 (m, 2H), 7.63-7.56 (m, 2H).

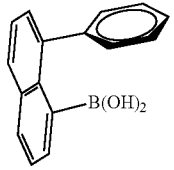

Synthesis of (8-phenylnaphthalen-1-yl)boronic acid (15)

To a dried and argon-flushed round bottom flask with a stir bar, dissolved 1-bromo-8-phenylnaphthalene (10 mmol) into anhydrous THF and stirred for 5 min at −78° C. Transferred 1.6 M n-butyllithium (25 mmol) solution dropwise with syringe, stirred at −78° C. for 0.5 h. B(OMe)$_3$ (40 mmol) was added dropwise at −78° C.; reaction mixture was warmed up to r.t. and stirred for 8 h. Added 1 M HCl (10 mmol) and stirred the reaction for 6 h. Monitored by TLC analysis and exacted with EA. The organic phase was combined, dried with MgSO$_4$, and the solvent was evaporated under reduced pressure. The crude product was used without further purification.
Data for 16

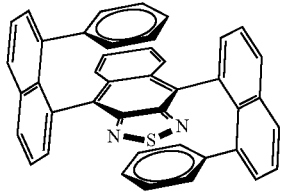

4,9-bis(8-phenylnaphthalen-1-yl)naphtho[2,3-c][1,2,5]thiadiazole (16): orange red solid, 70% yield. $^1$H NMR (400 MHz, CHLOROFORM-D) δ 8.13 (dd, J=8.3, 1.3 Hz, 2H), 8.02 (dd, J=8.2, 1.3 Hz, 2H), 7.75 (dd, J=8.2, 7.0 Hz, 2H), 7.54-7.46 (m, 2H), 7.38 (dd, J=7.0, 1.4 Hz, 2H), 7.33-7.26 (m, 2H), 7.15-7.04 (m, 4H), 6.56 (tt, J=7.4, 1.3 Hz, 2H), 6.38-6.30 (m, 2H), 6.25-6.13 (m, 4H), 6.09 (td, J=7.4, 0.9 Hz, 2H); $^{13}$C NMR (101 MHz, CHLOROFORM-D) δ 151.12, 141.96, 140.31, 135.05, 134.08, 132.47, 131.28, 130.61, 130.39, 130.02, 129.84, 128.96, 128.05, 127.12, 127.08, 125.67, 125.31, 125.27, 125.18, 124.41. HRMS (ESI-TOF) m/z $[C_{42}H_{26}N_2S+H]^+$ calcd for 591.1895, found 591.1932.
Data for 17

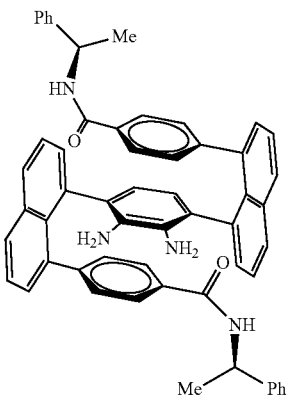

4,4'-((2,3-diamino-1,4-phenylene)bis(naphthalene-8,1-diyl))bis(N-((R)-1-phenylethyl)benzamide) (17): green solid, 47% yield. $^1$H NMR (400 MHz, CHLOROFORM-D) δ 7.87 (ddd, J=30.8, 16.7, 10.6 Hz, 5H), 7.46 (dd, J=14.1, 6.9 Hz, 4H), 7.41-7.29 (m, 6H), 7.28-7.16 (m, 7H), 7.15-7.04 (m, 9H), 7.02 (s, 1H), 6.90-6.79 (m, 2H), 6.50-6.27 (m, 2H), 6.17-5.95 (m, 2H), 5.27-5.04 (m, 2H), 1.53 (d, J=6.8 Hz, 4H), 1.29 (d, J=6.9 Hz, 2H); $^{13}$C NMR (101 MHz, CHLOROFORM-D) δ 167.15, 166.94, 145.56, 145.45, 143.63, 139.63, 139.56, 135.20, 135.15, 132.13, 130.33, 128.85, 128.75, 128.59, 127.52, 127.39, 126.46, 126.26, 126.12, 125.04, 125.01, 124.25, 49.16, 21.96. HRMS (ESI-TOF) m/z $[C_{56}H_{46}N_4O_2+H]^+$ calcd for 808.3772, found 808.3779.
Data 18a-18f

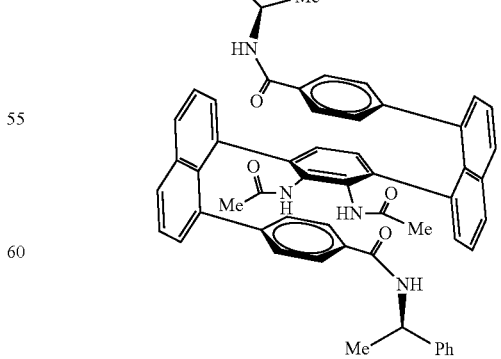

4,4'-((2,3-diacetamido-1,4-phenylene)bis(naphthalene-8,1-diyl))bis(N-((R)-1-phenylethyl)benzamide) (18a): brown yellow solid, 56% yield. $^1$H NMR (400 MHz, CHLOROFORM-D) δ 7.92 (d, J=8.3 Hz, 4H), 7.65 (d, J=7.5 Hz, 2H), 7.54-7.43 (m, 6H), 7.39 (dd, J=10.3, 8.8 Hz, 6H), 7.28 (dd, J=14.4, 6.6 Hz, 6H), 7.20 (t, J=7.0 Hz, 2H), 7.12-6.97 (m, 4H), 6.85 (d, J=7.8 Hz, 2H), 6.70 (s, 2H), 6.34 (s, 2H), 5.31 (p, J=7.1 Hz, 2H), 1.80 (s, 6H), 1.56 (d, J=7.0 Hz, 6H); $^{13}$C NMR (101 MHz, CHLOROFORM-D) δ 169.44, 167.30, 145.67, 144.07, 139.44, 139.02, 135.48, 135.20, 132.69, 130.90, 130.62, 130.13, 130.11, 129.63, 129.43, 129.14, 129.00, 128.49, 128.48, 127.39, 127.33, 127.02, 126.84, 126.28, 125.38, 125.20, 100.00, 49.19, 29.72, 23.26, 22.35. HRMS (ESI-TOF) m/z $[C_{60}H_{50}N_4O_4+H]^+$ calcd for 892.3983, found 892.3966.

4,4'-((2,3-dibutyramido-1,4-phenylene)bis(naphthalene-8,1-diyl))bis(N-((R)-1-phenylethyl)benzamide) (18c): light yellow solid, 42%. $^1$H NMR (400 MHz, CHLOROFORM-D) δ 8.07-7.72 (m, 4H), 7.58-6.82 (m, 30H), 6.52-6.32 (m, 2H), 5.40-5.13 (m, 2H), 1.90-1.67 (m, 5H), 1.55-1.45 (m, 5H), 1.32-0.91 (m, 5H), 0.66 (dt, J=10.3, 8.4 Hz, 5H); $^{13}$C NMR (101 MHz, CHLOROFORM-D) δ=171.43, 167.15, 145.22, 143.94, 139.07, 138.82, 135.36, 134.95, 132.44, 131.32, 130.59, 129.92, 129.73, 129.63, 129.21, 128.99, 128.94, 128.48, 128.29, 127.40, 126.88, 126.82, 126.58, 126.51, 126.08, 125.38, 124.94, 48.97, 38.46, 22.08, 18.75, 13.41. HRMS (ESI-TOF) m/z $[C_{64}H_{58}N_4O_4+H]^+$ calcd for 948.4609, found 948.4581.

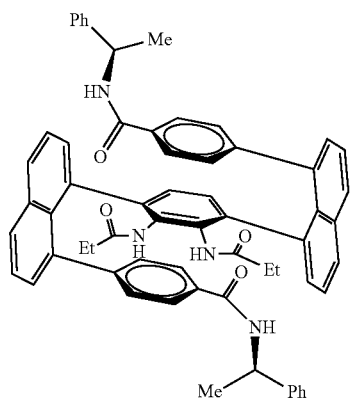

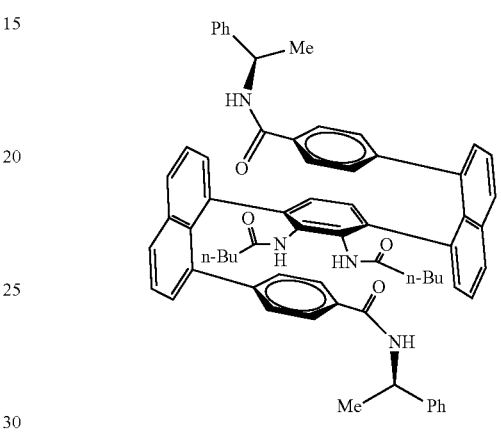

4,4'-((2,3-dipropionamido-1,4-phenylene)bis(naphthalene-8,1-diyl))bis(N-((R)-1-phenylethyl)benzamide) (18b): gray yellow solid, 39% yield. $^1$H NMR (400 MHz, CHLOROFORM-D) δ 7.95-7.71 (m, 4H), 7.58-7.27 (m, 17H), 7.24-7.16 (m, 4H), 7.11-7.04 (m, 2H), 7.00-6.86 (m, 5H), 6.79 (d, J=19.6 Hz, 2H), 6.45-6.31 (m, 2H), 5.30 (dt, J=13.6, 6.7 Hz, 2H), 2.00-1.78 (m, 4H), 1.49 (dd, J=25.3, 18.6 Hz, 6H), 0.84-0.69 (m, 6H); $^{13}$C NMR (101 MHz, CHLOROFORM-D) δ 172.55, 167.61, 167.26, 145.54, 145.43, 144.10, 143.76, 139.26, 139.17, 138.98, 135.46, 135.27, 135.09, 135.00, 132.78, 132.62, 131.63, 131.27, 131.06, 131.02, 130.66, 129.90, 129.86, 129.82, 129.76, 129.64, 129.45, 129.09, 129.03, 128.89, 128.81, 128.62, 128.43, 127.50, 127.11, 126.97, 126.95, 126.88, 126.64, 126.20, 125.62, 125.47, 125.12, 125.03, 49.47, 49.08, 29.77, 29.72, 22.51, 22.24, 9.77, 9.71. HRMS (ESI-TOF) m/z $[C_{62}H_{54}N_4O_4+H]^+$ calcd for 920.4296, found 920.4274.

4,4'-((2,3-dipentanamido-1,4-phenylene)bis(naphthalene-8,1-diyl))bis(N-((R)-1-phenylethyl)benzamide) (18d): gray yellow solid, 47% yield. $^1$H NMR (400 MHz, CHLOROFORM-D) δ 7.95-7.72 (m, 4H), 7.56-7.27 (m, 17H), 7.20 (ddd, J=14.2, 7.8, 5.0 Hz, 5H), 7.09-6.80 (m, 8H), 6.42 (d, J=23.1 Hz, 2H), 5.34-5.20 (m, 2H), 1.92-1.77 (m, 4H), 1.50 (t, J=7.8 Hz, 6H), 1.18-0.95 (m, 8H), 0.78-0.68 (m, 6H); $^{13}$C NMR (101 MHz, CHLOROFORM-D) δ 176.66, 171.73, 167.55, 167.19, 145.34, 145.27, 143.96, 143.65, 139.13, 138.99, 138.84, 135.39, 135.20, 134.96, 134.87, 132.58, 132.38, 131.30, 131.12, 130.60, 129.92, 129.79, 129.73, 129.68, 129.58, 129.27, 129.24, 128.97, 128.83, 128.71, 128.52, 128.50, 128.33, 128.31, 128.29, 127.55, 127.45, 126.99, 126.91, 126.84, 126.62, 126.53, 126.09, 125.54, 125.39, 124.97, 124.89, 49.39, 49.00, 36.35, 33.53, 29.61, 27.53, 27.46, 26.80, 22.35, 22.14, 22.03, 22.00, 21.97, 13.64, 13.63, 13.58. HRMS (ESI-TOF) m/z $[C_{66}H_{62}N_4O_4+H]^+$ calcd for 976.4922, found 976.4926.

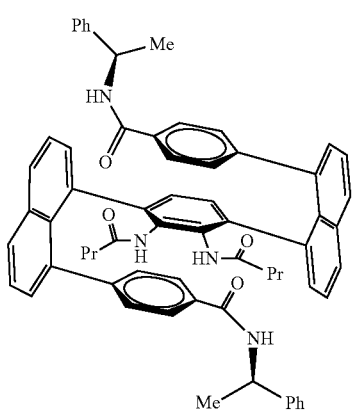

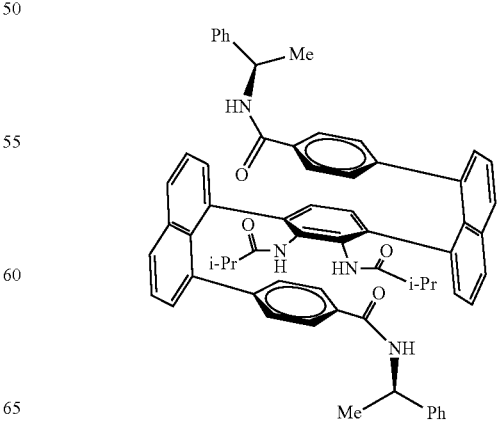

4,4'-((2,3-diisobutyramido-1,4-phenylene)bis(naphthalene-8,1-diyl))bis(N-((R)-1-phenylethyl)benzamide) (18e): [α]$_D$25=+92.0 (c=1.0, CH$_2$Cl$_2$); pale brown solid, 38% yield. $^1$H NMR (400 MHz, CHLOROFORM-D) δ 7.90 (dd, J=14.2, 7.4 Hz, 3H), 7.79-7.73 (m, 1H), 7.55-7.26 (m, 18H), 7.19 (ddd, J=10.6, 9.9, 4.9 Hz, 4H), 7.09-6.86 (m, 8H), 6.56-6.48 (m, 2H), 5.34-5.22 (m, 2H), 1.97 (ddt, J=20.4, 13.8, 6.8 Hz, 2H), 1.49 (dd, J=11.1, 6.9 Hz, 6H), 0.72 (dd, J=9.3, 6.9 Hz, 6H), 0.66-0.58 (m, 6H); $^{13}$C NMR (101 MHz, CHLOROFORM-D) δ 174.94, 174.79, 167.63, 167.30, 145.19, 145.14, 144.11, 143.76, 139.13, 138.95, 138.92, 138.89, 135.47, 135.28, 134.98, 134.88, 132.80, 132.61, 131.75, 131.62, 130.80, 130.78, 130.47, 130.38, 129.60, 129.55, 129.53, 129.36, 129.24, 129.17, 129.12, 129.08, 129.00, 128.84, 128.64, 128.43, 127.68, 127.54, 127.17, 127.08, 127.03, 126.94, 126.59, 126.35, 126.16, 125.77, 125.63, 125.07, 124.97, 49.46, 49.12, 35.73, 35.69, 30.31, 29.70, 22.47, 22.24, 19.39, 18.94. HRMS (ESI-TOF) m/z [C$_{64}$H$_{58}$N$_4$O$_4$+H]$^+$ calcd for 948.4609, found 948.4583.

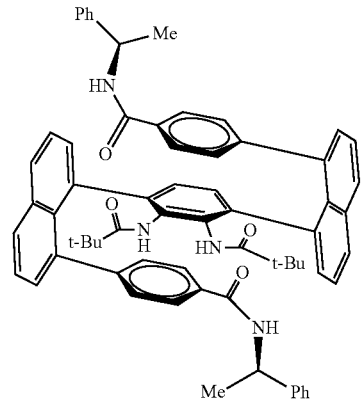

4,4'-((2,3-dipivalaiido-1,4-phenylene)bis(naphthalene-8,1-diyl))bis(N-((R)-1-phenylethyl)benzamide) (18f): [α]$_D$25=+57.7 (c=0.3, CH$_2$C2); pale gray solid, 31% yield. $^1$H NMR (400 MHz, CHLOROFORM-D) δ 7.89 (dd, J=13.8, 7.3 Hz, 3H), 7.78-7.71 (m, 1H), 7.54-7.25 (m, 19H), 7.24-7.06 (m, 8H), 6.99-6.96 (m, 1H), 6.86-6.78 (m, 2H), 6.69 (d, J=18.7 Hz, 2H), 5.35-5.25 (m, 2H), 1.51 (t, J=6.4 Hz, 6H), 0.62 (d, J=3.1 Hz, 18H); $^{13}$C NMR (101 MHz, CHLOROFORM-D) δ 175.67, 175.55, 167.48, 144.66, 144.14, 143.76, 139.08, 138.93, 138.90, 134.81, 134.73, 132.03, 131.94, 131.15, 131.02, 130.78, 130.74, 129.42, 129.15, 129.03, 128.99, 128.94, 128.85, 128.64, 128.43, 127.60, 127.34, 127.06, 126.92, 126.51, 126.09, 125.87, 124.99, 124.89, 100.00, 49.37, 49.12, 38.74, 27.06, 22.36, 22.26. HRMS (ESI-TOF) m/z [C$_{66}$H$_{62}$N$_4$O$_4$+H]$^+$ calcd for 976.4922, found 976.4927.

Data for 19a-19c

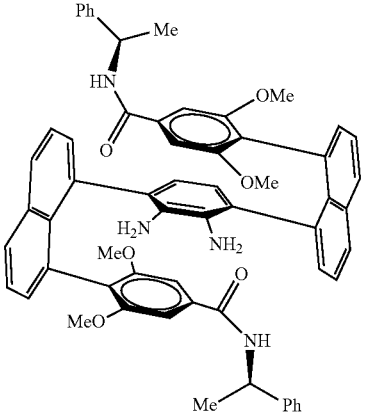

4,4'-((2,3-diamino-1,4-phenylene)bis(naphthalene-8,1-diyl))bis(3,5-dimethoxy-N-((R)-1-phenylethyl)benzamide) (19a): light yellow solid, 84% yield. $^1$H NMR (400 MHz, CHLOROFORM-D) δ 8.00-7.89 (mn, 4H), 7.60-7.44 (mn, 4H), 7.30-7.26 (mn, 5H), 7.16-7.08 (mn, 4H), 7.06-6.99 (mn, 1H), 6.84-6.66 (mn, 4H), 6.62 (d, J=10.2 Hz, 2H), 6.50 (dd, J=25.9, 9.3 Hz, 3H), 6.09 (dd, J=19.5, 10.6 Hz, 2H), 5.25-4.79 (mn, 2H), 3.56-3.40 (mn, 12H), 1.57 (d, J=6.7 Hz, 2H), 1.26-1.16 (mn, 4H); $^{13}$C NMR (101 MHz, CHLOROFORMV-D) δ=168.03, 157.01, 156.82, 143.58, 136.52, 135.52, 134.92, 131.41, 131.16, 130.78, 130.38, 130.27, 130.20, 129.35, 129.15, 129.01, 128.95, 128.56, 128.28, 127.14, 126.63, 126.17, 125.21, 125.11, 123.14, 120.66, 101.87, 101.81, 55.86, 54.97, 49.91, 49.17, 21.49. HRMS (ESI-TOF) m/z [C$_{60}$H$_{54}$N$_4$O$_6$+H]$^+$ calcd for 928.4194, found 928.4195.

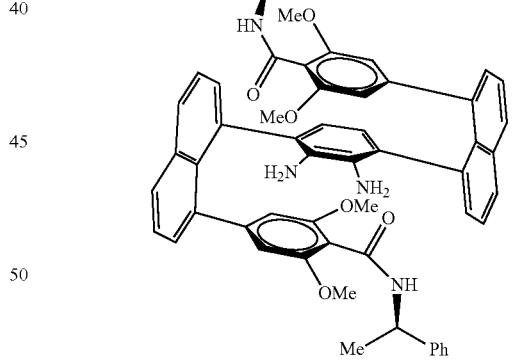

4,4'-((2,3-diamino-1,4-phenylene)bis(naphthalene-8,1-diyl))bis(2,6-dimethoxy-N-((R)-1-phenylethyl)benzamide) (19b): pale solid, 72% yield. $^1$H NMR (400 MHz, CHLOROFORM-D) δ 7.96-7.81 (m, 4H), 7.59-7.27 (m, 13H), 7.23-7.18 (m, 5H), 7.15 (dd, J=7.0, 1.1 Hz, 1H), 7.08-7.02 (m, 2H), 6.00 (d, J=9.7 Hz, 1H), 5.97-5.88 (m, 3H), 5.82-5.72 (m, 1H), 5.35-5.20 (m, 2H), 3.60-3.40 (m, 12H), 2.65 (s, 4H), 1.61 (d, J=5.0 Hz, 2H), 1.48 (d, J=6.9 Hz, 4H); $^{13}$C NMR (101 MHz, CHLOROFORM-D) δ 165.25, 155.17, 154.87, 144.84, 143.39, 140.31, 136.25, 135.02, 131.96, 131.00, 130.10, 130.05, 129.95, 128.72, 128.64, 128.38, 128.26, 128.18, 128.16, 128.13, 127.07, 127.00, 126.90, 126.54, 125.35, 124.88, 122.91, 122.79, 114.32, 114.22, 106.28, 106.12, 104.70, 104.43, 100.00, 56.43, 54.95, 48.84, 29.67, 21.43, 14.11. HRMS (ESI-TOF) m/z [C$_{60}$H$_{54}$N$_{4}$O$_{6}$+H]$^+$ calcd for 928.4194, found 928.4192.

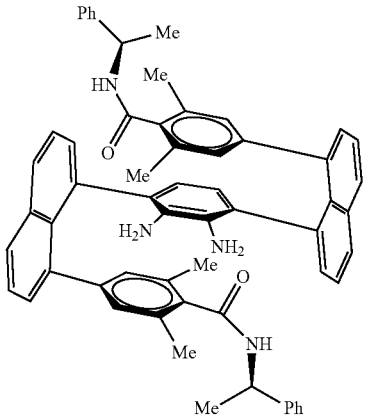

4,4'-((2,3-diamino-1,4-phenylene)bis(naphthalene-8,1-diyl))bis(2,6-dimethyl-N-((R)-1-phenylethyl)benzamide) (19c): green yellow solid, 67% yield. $^1$H NMR (400 MHz, CHLOROFORM-D) δ 7.98-7.81 (m, 4H), 7.70-7.28 (m, 9H), 7.21-6.90 (m, 9H), 6.67-5.82 (m, 8H), 5.31-5.07 (m, 2H), 2.75-2.40 (m, 4H), 2.39-1.86 (m, 12H), 1.66-1.45 (m, 6H); $^{13}$C NMR (101 MHz, CHLOROFORM-D) δ=169.46, 169.34, 169.31, 142.59, 142.48, 140.24, 140.12, 137.53, 137.08, 136.94, 136.84, 136.54, 135.66, 135.19, 135.15, 134.93, 134.74, 134.60, 131.77, 131.45, 130.79, 130.36, 130.17, 129.84, 129.35, 128.69, 128.51, 128.44, 128.38, 128.34, 128.22, 127.55, 127.31, 126.49, 126.44, 126.31, 126.23, 125.68, 125.57, 125.46, 125.01, 124.74, 122.27, 122.00, 121.93, 113.22, 49.10, 33.40, 31.99, 31.92, 30.23, 29.64, 22.44, 22.39, 20.74, 19.29, 19.17, 19.11, 13.98, 13.93. HRMS (ESI-TOF) m/z [C$_{60}$H$_{54}$N$_{4}$O$_{2}$+H]$^+$ calcd for 864.4398, found 864.4378.

Data for 20a-20d

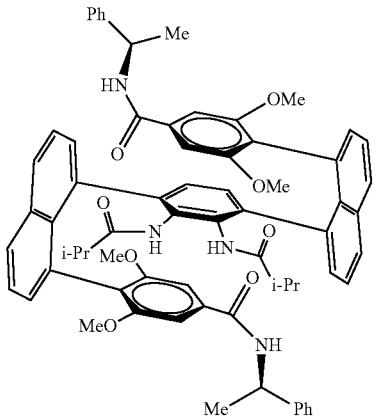

4,4'-((2,3-diisobutyramido-1,4-phenylene)bis(naphthalene-8,1-diyl))bis(3,5-dimethoxy-N-((R)-1-phenylethyl)benzamide) (20a): [α]$_D$25=+3.9 (c=0.9, CH$_2$Cl$_2$); yellow solid, 97% yield. $^1$H NMR (400 MHz, CHLOROFORM-D) δ 8.00-7.62 (m, 6H), 7.52-7.30 (m, 12H), 7.26-7.23 (mn, 1H), 7.21 (d, J=6.2 Hz, 1H), 7.12 (dd, J=21.4, 6.3 Hz, 2H), 6.95-6.55 (mn, 9H), 5.42-5.30 (mn, 2H), 3.64-3.46 (mn, 12H), 2.55 (hept, J=7.0 Hz, 1H), 2.06-1.87 (mn, 2H), 1.58 (dd, J=23.5, 6.9 Hz, 6H), 0.80-0.55 (mn, 12H); $^{13}$C NMR (101 MHz, CHLOROFORM-D) δ=$^{13}$C NMR (101 MHz, CHLOROFORM-D) δ=175.39, 175.15, 168.25, 168.20, 156.74, 156.65, 156.01, 155.55, 144.54, 143.79, 140.56, 139.93, 136.36, 135.98, 135.23, 135.19, 134.52, 134.42, 132.17, 131.83, 131.25, 131.13, 130.97, 130.93, 130.90, 130.63, 130.19, 129.87, 129.08, 129.00, 128.82, 128.78, 128.60, 128.59, 128.56, 127.65, 127.45, 127.23, 126.99, 126.89, 126.24, 125.15, 124.96, 124.65, 124.20, 123.73, 106.93, 103.76, 103.72, 56.97, 56.65, 55.45, 55.44, 49.96, 49.48, 35.72, 35.61, 29.79, 22.86, 22.74, 19.62, 19.43, 18.99, 18.90, 18.83. HRMS (ESI-TOF) m/z [C$_{65}$H$_{66}$N$_{4}$O$_{8}$+H]$^+$ calcd for 1068.5031, found 1068.5034.

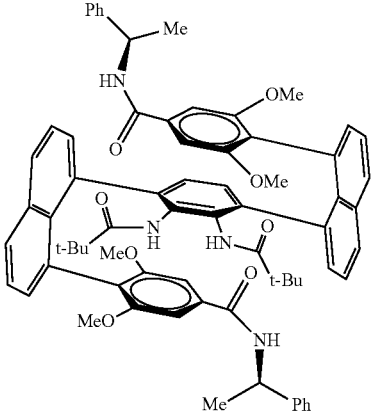

4,4'-((2,3-dipivalamido-1,4-phenylene)bis(naphthalene-8,1-diyl))bis(3,5-dimethoxy-N-((R)-1-phenylethyl)benzamide) (20b): [α]$_D$25=+46.4 (c=1.1, CH$_2$Cl$_2$); grey white solid, 72% yield. $^1$H NMR (400 MHz, CHLOROFORM-D) δ 8.10 (s, 1H), 7.96-7.80 (m, 4H), 7.68 (dd, J=11.5, 4.1 Hz, 2H), 7.50-7.40 (m, 8H), 7.36-7.29 (m, 5H), 7.25 (d, J=1.6 Hz, 1H), 7.15 (dd, J=7.1, 1.3 Hz, 2H), 6.86 (dt, J=3.1, 1.6 Hz, 3H), 6.75-6.72 (m, 3H), 5.46-5.18 (m, 2H), 3.56 (dd, J=20.3, 8.9 Hz, 12H), 1.59 (d, J=7.0 Hz, 6H), 0.73-0.63 (m, 18H); 13C NMR (101 MHz, CHLOROFORM-D) δ=176.15, 168.10, 156.72, 156.40, 143.84, 139.81, 136.23, 134.95, 134.32, 132.35, 131.17, 130.90, 130.80, 130.27, 129.58, 128.85, 128.75, 128.49, 127.25, 127.14, 126.83, 124.95, 124.84, 124.21, 107.24, 103.28, 57.18, 55.43, 49.80, 38.46, 29.80, 27.25, 22.50. HRMS (ESI-TOF) m/z [C$_{70}$H$_{70}$N$_{4}$O$_{8}$+Na]$^+$ calcd for 1118.5169, found 1118.5176. HRMS (ESI-TOF) m/z [C$_{70}$H$_{70}$N$_{4}$O$_{8}$+Na]$^+$ calcd for 1118.5169, found 1118.5176.

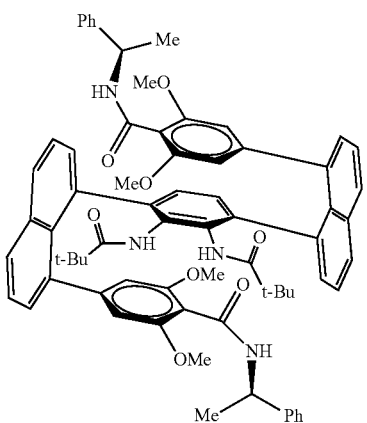

4,4'-((2,3-dipivalamido-1,4-phenylene)bis(naphthalene-8,1-diyl))bis(2,6-dimethoxy-N-((R)-1-phenylethyl)benzamide) (20c): [α]$_D$25=+109.2 (c=0.8, CH$_2$Cl$_2$); pale solid, 68% yield. $^1$H NMR (400 MHz, CHLOROFORM-D) δ 8.64 (d, J=8.8 Hz, 1H), 8.04 (s, 1H), 7.99-7.93 (m, 2H), 7.87-7.79 (m, 2H), 7.69 (dd, J=7.0, 5.7 Hz, 2H), 7.63-7.56 (m, 1H), 7.45 (tdd, J=21.0, 10.2, 4.8 Hz, 6H), 7.33-7.25 (m, 6H), 7.19 (t, J=7.5 Hz, 3H), 7.15-7.07 (m, 3H), 6.84 (s, 1H), 6.74 (s, 1H), 6.20 (d, J=1.0 Hz, 1H), 6.09 (s, 1H), 5.88 (d, J=0.9 Hz, 1H), 5.45-5.36 (m, 1H), 4.60 (q, J=6.7 Hz, 1H), 3.81 (d, J=1.0 Hz, 6H), 3.62 (d, J=6.3 Hz, 3H), 3.39-3.34 (m, 3H), 1.56 (d, J=3.3 Hz, 6H), 0.62 (d, J=8.3 Hz, 9H), 0.35 (s, 9H); $^{13}$C NMR (101 MHz, CHLOROFORM-D) δ 190.94, 176.40, 173.63, 168.93, 165.15, 156.06, 155.92, 155.73, 154.82, 145.45, 144.89, 142.77, 141.64, 140.34, 139.90, 138.96, 137.76, 137.15, 134.71, 134.68, 134.42, 133.57, 132.42, 131.45, 130.26, 129.68, 129.53, 129.47, 129.33, 129.10, 128.80, 128.56, 128.53, 128.15, 127.89, 127.77, 127.65, 127.22, 126.72, 126.67, 126.47, 126.08, 125.02, 124.57, 115.06, 111.40, 108.38, 107.80, 104.58, 103.63, 58.24, 55.50, 55.30, 54.86, 48.42, 44.10, 38.91, 38.17, 31.90, 29.67, 27.77, 26.92, 26.87, 22.90, 22.67, 19.41, 14.10. HRMS (ESI-TOF) m/z [C$_{70}$H$_{70}$N$_4$O$_8$+K]$^+$ calcd for 1135.4982, found 1135.4937.

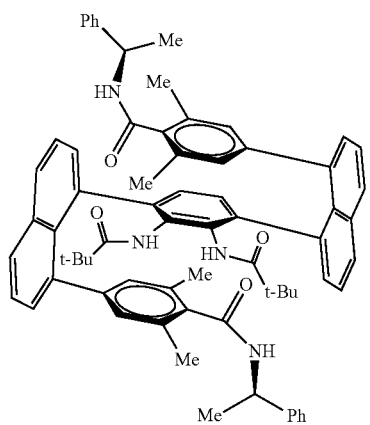

4,4'-((2,3-dipivalamido-1,4-phenylene)bis(naphthalene-8,1-diyl))bis(2,6-dimethyl-N-((R)-1-phenylethyl)benzamide) (20d): [α]$_D$25=+64.8 (c=0.9, CH$_2$Cl$_2$); pale green solid, 58% yield. $^1$H NMR (400 MHz, CHLOROFORM-D) δ 7.92-7.82 (m, 4H), 7.66-7.54 (m, 3H), 7.48-7.36 (m, 8H), 7.35-7.25 (m, 6H), 7.24-7.16 (m, 4H), 7.14-6.82 (m, 5H), 6.47-6.38 (m, 2H), 5.42 (dd, J=14.5, 7.8 Hz, 2H), 2.17-2.10 (m, 4H), 1.97-1.89 (m, 5H), 1.60 (dd, J=13.8, 6.8 Hz, 9H), 0.57-0.36 (m, 18H); $^{13}$C NMR (101 MHz, CHLOROFORM-D) δ 175.47, 169.61, 169.43, 143.55, 140.27, 140.16, 139.77, 139.57, 139.49, 139.28, 138.69, 137.30, 136.39, 135.83, 135.29, 134.89, 134.82, 133.84, 133.74, 132.28, 132.21, 132.13, 131.83, 131.43, 131.35, 131.25, 131.20, 130.98, 129.71, 129.42, 129.20, 129.13, 128.92, 128.86, 128.67, 128.53, 128.46, 128.37, 127.19, 127.05, 126.89, 126.81, 126.30, 126.23, 126.11, 125.50, 125.10, 125.02, 48.67, 48.60, 38.69, 38.59, 33.37, 32.27, 31.36, 29.78, 27.01, 27.00, 22.78, 21.88, 19.19, 14.14. HRMS (ESI-TOF) m/z [C$_{70}$H$_{70}$N$_4$O$_4$+K]$^+$ calcd for 1071.5185, found 1071.5209.

Data for 21a-21f

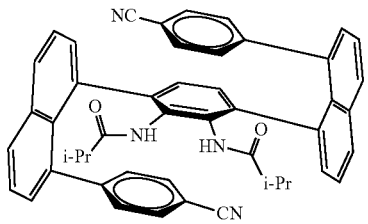

N,N-(3,6-bis(8-(4-cyanophenyl)naphthalen-1-yl)-1,2-phenylene)bis(2-methylpropanamide) (21a): [α]$_D$25=+40.8 (c=0.8, CH$_2$Cl$_2$); pale green solid, 49% yield. $^1$H NMR (400 MHz, CHLOROFORM-D) δ 8.04-7.92 (m, 5H), 7.83 (dd, J=10.2, 4.9 Hz, 1H), 7.74 (d, J=8.0 Hz, 1H), 7.56-7.30 (m, 9H), 7.12 (dd, J=10.5, 7.5 Hz, 2H), 6.88 (d, J=7.6 Hz, 1H), 6.83-6.72 (m, 2H), 6.64 (dd, J=23.2, 7.9 Hz, 2H), 6.41 (d, J=8.0 Hz, 1H), 2.78-2.63 (m, 1H), 1.62 (dt, J=12.5, 6.3 Hz, 1H), 1.42 (dd, J=17.1, 6.8 Hz, 3H), 1.25-1.16 (m, 3H), 0.71-0.64 (m, 3H), −0.01 (t, J=20.6 Hz, 3H); $^{13}$C NMR (101 MHz, CHLOROFORM-D) δ 179.40, 158.76, 147.79, 144.62, 139.26, 137.46, 135.90, 135.15, 134.80, 134.57, 132.66, 131.76, 131.27, 130.44, 130.02, 129.94, 129.64, 129.54, 129.35, 129.26, 129.13, 129.08, 129.00, 128.58, 128.29, 127.84, 126.85, 126.31, 126.18, 125.96, 125.68, 125.47, 124.42, 124.21, 118.51, 118.26, 108.35, 107.71, 39.01, 29.15, 26.96, 22.87, 21.19, 19.68. HRMS (ESI-TOF) m/z [C$_{48}$H$_{38}$N$_4$O$_2$+K]$^+$ calcd for 743.2783, found 743.2204.

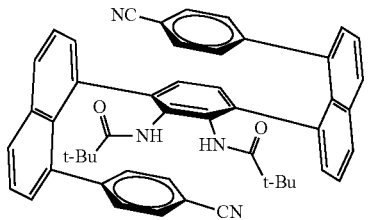

N,N-(3,6-bis(8-(4-cyanophenyl)naphthalen-1-yl)-1,2-phenylene)bis(2,2-dimethylpropanamide) (21b): [α]$_D$25=133.8 (c=1.2, CH$_2$C2); pale yellow solid, 61% yield. $^1$H NMR (400 MHz, CHLOROFORM-D) 67.97 (dd, J=8.1, 3.0 Hz, 4H), 7.73 (t, J=7.6 Hz, 2H), 7.49 (t, J=7.6 Hz, 2H), 7.42 (dd, J=7.7, 1.3 Hz, 2H), 7.32 (dd, J=7.0, 0.9 Hz, 2H), 7.23 (tdd, J=4.9, 3.2, 1.6 Hz, 6H), 6.97 (s, 2H), 6.88 (dd, J=7.9, 1.1 Hz, 2H), 6.45 (s, 2H), 0.59 (s, 18H); $^{13}$C NMR (101 MHz, CHLOROFORM-D) δ 176.11, 146.95, 138.65, 138.09, 135.40, 134.79, 132.61, 131.33, 131.05, 130.67, 130.30, 130.04, 129.75, 129.56, 129.11, 129.10, 128.30, 126.22, 124.93, 119.27, 109.39, 38.71, 29.68, 26.99. HRMS (ESI-TOF) m/z [C$_{50}$H$_{42}$N$_4$O$_2$+H]$^+$ calcd for 732.3459, found 732.3459.

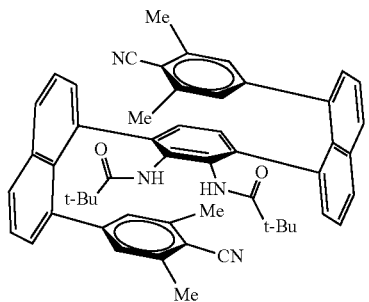

N,N-(3,6-bis(8-(4-cyano-3,5-dimethylphenyl)naphthalen-1-yl)-1,2-phenylene)bis(2,2-dimethylpropanamide) (21c): [α]$_D$25=+68.7 (c=0.7, CH$_2$C2); yellow solid, 78% yield. $^1$H NMR (400 MHz, CHLOROFORM-D) δ7.95 (ddd, J=19.7, 11.0, 6.5 Hz, 3H), 7.87-7.73 (m, 2H), 7.62-7.43 (m, 3H), 7.39-7.28 (m, 3H), 7.19-6.97 (m, 4H), 6.92-6.77 (m, 3H), 6.50 (ddd, J=24.3, 16.6, 9.9 Hz, 2H), 2.50-2.09 (m, 12H), 0.84 (ddd, J=12.1, 5.7, 3.3 Hz, 6H), 0.52-0.42 (m, 18H); $^{13}$C NMR (126 MHz, cdcl3) δ 175.75, 174.84, 139.25, 139.19, 134.92, 132.27, 131.75, 131.57, 131.36, 131.27, 130.83, 130.73, 130.61, 130.30, 129.83, 129.78, 129.72, 129.67, 129.60, 129.51, 129.18, 128.88, 128.50, 128.07, 127.90, 127.72, 127.67, 127.48, 126.77, 126.41, 126.09, 125.79, 125.36, 125.18, 124.89, 124.78, 124.74, 31.93, 31.67, 30.44, 30.19, 22.70, 22.42, 20.63, 20.54, 14.14, 13.96. HRMS (ESI-TOF) m/z [C$_{54}$H$_{50}$N$_4$O$_2$+Na]$^+$ calcd for 811.3982, found 811.3972.

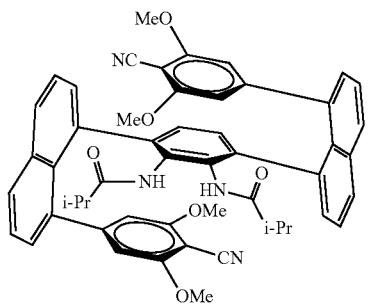

N,N-(3,6-bis(8-(4-cyano-3,5-dimethoxyphenyl)naphthalen-1-yl)-1,2-phenylene)bis(2,2-dimethylpropanamide) (21d): [α]$_D$25=+36.4 (c=0.3, CH$_2$C2); pale yellow solid, 80% yield. $^1$H NMR (400 MHz, CHLOROFORM-D) δ 8.49 (dd, J=36.4, 8.6 Hz, 1H), 8.12-7.91 (m, 3H), 7.82-7.47 (m, 5H), 7.35-7.25 (m, 4H), 7.23-7.06 (m, 4H), 6.99-6.83 (m, 3H), 4.22-4.18 (m, 3H), 4.13-4.06 (m, 2H), 3.93-3.90 (m, 1H), 3.75 (ddd, J=8.2, 7.6, 0.7 Hz, 4H), 3.69 (dd, J=6.4, 0.7 Hz, 1H), 3.62 (s, 1H), 0.94-0.86 (m, 18H); $^{13}$C NMR (101 MHz, DMSO-D6) δ 176.15, 157.93, 157.74, 140.15, 136.54, 135.02, 133.22, 131.41, 131.01, 130.53, 130.07, 129.94, 127.45, 126.19, 125.72, 125.24, 120.49, 111.04, 110.80, 107.98, 56.99, 56.71, 38.82, 27.61. HRMS (ESI-TOF) m/z [C$_{54}$H$_{50}$N$_4$O$_6$+H]$^+$ calcd for 875.3779, found 875.3708.

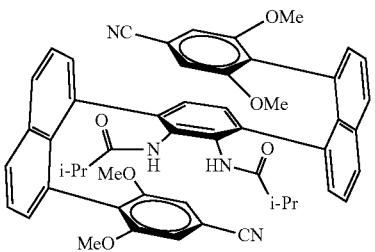

N,N-(3,6-bis(8-(4-cyano-2,6-dimethoxyphenyl)naphthalen-1-yl)-1,2-phenylene)bis(2-methylpropanamide) (21e): [α]$_D$25=+51.4 (c=0.9, CH$_2$Cl$_2$); grey yellow solid, 43% yield. $^1$H NMR (400 MHz, CHLOROFORM-D) δ 7.96-7.83 (m, 4H), 7.72-7.59 (m, 2H), 7.52-7.40 (m, 3H), 7.28 (dt, J=8.2, 4.1 Hz, 1H), 7.18-7.12 (m, 1H), 7.05-6.95 (m, 1H), 6.67 (d, J=1.2 Hz, 1H), 6.60-6.53 (m, 1H), 6.47-6.36 (m, 2H), 5.97-5.78 (m, 2H), 3.84-3.52 (m, 6H), 3.31-3.22 (m, 1H), 3.11 (t, J=32.7 Hz, 6H), 1.90 (dq, J=13.3, 6.6 Hz, 1H), 1.54 (t, J=26.3 Hz, 2H), 1.39 (d, J=6.8 Hz, 3H), 1.00 (d, J=6.8 Hz, 3H), 0.65 (d, J=7.2 Hz, 3H), 0.24 (d, J=6.5 Hz, 3H); $^{13}$C NMR (101 MHz, CHLOROFORM-D) δ=179.06, 158.95, 157.19, 156.80, 156.66, 156.62, 139.23, 136.94, 135.21, 135.11, 134.87, 131.71, 131.49, 131.29, 131.27, 130.74, 130.47, 130.26, 129.82, 129.80, 129.51, 129.48, 129.21, 128.50, 127.02, 125.68, 125.44, 125.28, 125.12, 124.67, 124.63, 124.54, 124.36, 119.14, 119.04, 110.59, 110.42, 107.14, 106.52, 105.81, 105.64, 56.01, 55.95, 55.61, 54.81, 38.56, 29.66, 27.08, 22.36, 21.79, 19.90, 17.01. HRMS (ESI-TOF) m/z [C$_{52}$H$_{46}$N$_4$O$_6$+Na]$^+$ calcd for 847.3466, found 847.3983.

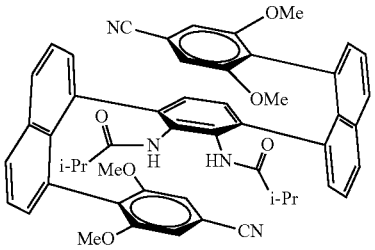

N,N-(3,6-bis(8-(4-cyano-2,6-dimethoxyphenyl)naphthalen-1-yl)-1,2-phenylene)bis(2,2-dimethylpropanamide) (21f): [α]$_D$$^{25}$=+210.0 (c=1.1, CH$_2$C2); grey white solid, 81% yield. $^1$H NMR (400 MHz, CHLOROFORM-D) δ 7.91 (dd, J=7.7, 3.1 Hz, 4H), 7.67-7.56 (m, 2H), 7.55-7.40 (m, 2H), 7.10 (dd, J=8.9, 3.2 Hz, 4H), 6.93 (s, 4H), 6.51 (d, J=50.1 Hz, 4H), 3.63 (d, J=79.1 Hz, 12H), 0.62 (s, 18H); $^{13}$C NMR (101 MHz, CHLORORM-D) δ=175.86, 157.43, 157.07, 139.68, 135.41, 134.34, 132.73, 130.68, 130.34, 130.16, 129.87, 129.28, 129.03, 126.44, 125.61, 125.07, 124.82, 119.42, 110.76, 110.15, 106.43, 56.24, 55.50, 38.22, 26.99. HRMS (ESI-TOF) m/z [C$_{54}$H$_{50}$N$_4$O$_6$+Na]$^+$ calcd for 875.3379, found 875.3707.

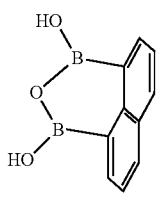 [SMILES: OB1OB(O)c2cccc3cccc1c23]

1H,3H-naphtho[1,8-cd][1,2,6]oxadiborinine-1,3-diol: pale grey solid, 150 mg, 76% yield. $^{1}$H NMR (400 MHz, D$_2$O) δ 7.71 (dd, J=16.8, 7.1 Hz, 4H), 7.36 (t, J=7.4 Hz, 2H); $^{13}$C NMR (101 MHz, DMSO-D6) δ=135.21, 133.49, 131.94, 130.97, 129.28, 128.87, 126.67, 126.48, 123.70. HRMS (ESI-TOF) m/z [C10H8B$_2$O$_3$+H]$^+$ calcd for 199.0738, found 199.0759.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

REFERENCES

1. Eliel E L and Wilen S H. Stereochemistry of Organic Compounds. New York: John Wiley & Sons, 1994; 1172-5.
2. Wagner I and Musso, H. New naturally occurring amino acids. Angew Chem Int Ed 1983; 22: 816-28.

3. William R M. Synthesis of Optically Active α-Amino Acids. Oxford: Pergamon Press 1990.
4. Pace C N and Scholtz J M. A helix propensity scale based on experimental studies of peptides and proteins. Biophys J 1998; 75: 422-7.
5. Dunitz, J D. Pauling's left-handed α-helix. Angew Chem Int Ed 2001; 40: 4167-73.
6. Wang A-J, Fujii S and Van Boom J et al. Right-handed and left-handed double-helical DNA: structural studies. Cold Spring Harb Symp Quant Biol 1983; 47: 33-44.
7. Corey E J, Czakó B and Kurti L. Molecules and medicine. New Jersey: John Wiley & Sons, 2007.
8. Ojima I. Catalytic Asymmetric Synthesis. New Jersey: John Wiley & Sons, 2010.
9. Hikaru K, Takashi N and Kayo S et al. Isolation of Notaamid S and Enantiomeric 6-epi-Stephacidin A from the Fungus Aspergillus: Biogenetic Implication. Org Lett 2015; 17: 700-3.
10. Nicolaou K C and Snyder S A. Classics in Total Synthesis II: More Target, Strategies, Methods. Weinheim: Wiley-VCH, 2003.
11. Jacobsen E N, Pfaltz A and Yamamoto, H. Comprehensive asymmetric catalysis. New York: Springer, 2003.
12. Carreira E M and Kvaerno, L. Classics in stereoselective synthesis. Weinheim: Wiley-VCH, 2009.
13. Shi S-L, Wong Z L and Buchwald S L. Copper-catalysed enantioselective stereodivergent synthesis of amino alcohols. Nature 2016; 532: 353.
14. MacMillan D W. The advent and development of organocatalysis. Nature 2008; 455: 304-8.
15. Xie J-H and Zhou Q-L. Chiral diphosphine and monodentate phosphorus ligands on a spiro scaffold for transition-metal-catalyzed asymmetric reactions. Ace Chem Res 2008; 41: 581-93.
16. Ding K, Han Z and Wang Z. Spiro skeletons: A class of privileged structure for chiral ligand design. Chem Asian J 2009; 4: 32-41.
17. Liu X, Zheng H and Xia Y et al. Asymmetric Cycloaddition and Cyclization Reactions Catalyzed by Chiral N, N'-Dioxide-Metal Complexes. Ace Chem Res 2017; 50: 2621-31.
18. Ye L-W, Zhou J and Tang, Y. Phosphine-triggered synthesis of functionalized cyclic compounds. Chem Soc Rev 2008; 37: 1140-52.
19. Cai Z-J, Liu C-X and Wang, Q et al. Thioketone-directed rhodium (I) catalyzed enantioselective CH bond arylation of ferrocenes. Nat Commun 2019; 10(1): 1-8.
20. List, B. Asymmetric aminocatalysis. Synlett 2001; 11: 1675-86.
21. Kolb H C, VanNieuwenhze MS and Sharpless, KB. Catalytic asymmetric dihydroxylation. Chem Rev 1994; 94: 2483-547.
22. Wei Y and Shi M. Recent advances in organocatalytic asymmetric morita-baylis-hillman/aza-morita-baylis-hillman reactions. Chem Rev 2013; 113: 6659-90.
23. Zbieg J R, Yamaguchi E and Mclnturff, E L et al. Enantioselective CH crotylation of primary alcohols via hydrohydroxyalkylation of butadiene. Science 2012; 336: 324-7.
24. Cao Z-Y, Wang X and Tan, C et al. Highly stereoselective olefin cyclopropanation of diazooxindoles catalyzed by a C 2-symmetric spiroketal bisphosphine/Au (I) complex. J Am Chem Soc 2013; 135: 8197-200.
25. Phipps R J, Hamilton G L and Toste, F D. The progression of chiral anions from concepts to applications in asymmetric catalysis. Nat Chem 2012; 4: 603.
26. Gustafson J L, Lim D and Miller S J. Dynamic kinetic resolution of biaryl atropisomers via peptide-catalyzed asymmetric bromination. Science 2010; 328: 1251-5.
27. Cui X, Xu X and Lu, H et al. Enantioselective cyclopropenation of alkynes with acceptor/acceptor-substituted diazo reagents via Co (II)-based metalloradical catalysis. J Am Chem Soc 2011; 133: 3304-7.
28. Chen J and Huang Y. Asymmetric catalysis with N-heterocyclic carbenes as non-covalent chiral templates. Nat Chem 2014; 5: 3437.
29. Liu H, Dagousset G and Masson G et al. Chiral Bronsted acid-catalyzed enantioselective three-component Povarov reaction. J Am Chem Soc 2009; 131: 4598-9.
30. Huang X L, He L and Shao P L et al. [4+2] Cycloaddition of Ketenes with N-Benzoyldiazenes Catalyzed by N-Heterocyclic Carbenes. Angew Chem Int Ed 2009; 48: 192-5.
31. Guo J, Wang H and Xing, S et al. Cobalt-Catalyzed Asymmetric Synthesis of gem-Bis (silyl) alkanes by Double Hydrosilylation of Aliphatic Terminal Alkynes. Chem 2019; 5: 881-95.
32. Guo W, Wu B and Zhou X et al. Formal Asymmetric Catalytic Thiolation with a Bifunctional Catalyst at a Water-Oil Interface: Synthesis of Benzyl Thiols. Angew Chem Int Ed 2015; 54: 4522-6.
33. Luo J, Zhang T and Wang L et al. Enantioselective Synthesis of Biaryl Atropisomers by Pd-Catalyzed C—H Olefination using Chiral Spiro Phosphoric Acid Ligands. Angew Chem Int Ed 2019; 131: 6780-4.
34. Fu Z, Xu J and Zhu T et al. β-Carbon activation of saturated carboxylic esters through N-heterocyclic carbene organocatalysis. Nat Chem 2013; 5: 835.
35. Li G and Sharpless K B. Short Taxol Side-chain Synthesis. Acta Chem Scand 1996; 50: 649-51.
36. Shen Y and Chen C—F. Helicenes: synthesis and applications. Chem Rev 2011; 112: 1463-535.
37. Huang G, Wen R and Wang Z et al. Novel chiral aggregation induced emission molecules: self-assembly, circularly polarized luminescence and copper (ii) ion detection. Mater Chem Front 2018; 2: 1884-92.
38. Tang H, Gu Z and Ding H et al. Nanoscale Crystalline Sheets and Vesicles Assembled from Nonplanar Cyclic 7r-Conjugated Molecules. Research 2019; 2019: 1953926.
39. Wang X, Lou X-Y and Jin X-Y et al. A Binary Supramolecular Assembly with Intense Fluorescence Emission, High pH Stability, and Cation Selectivity: Supramolecular Assembly-Induced Emission Materials. Research 2019; 2019: 1454562.
40. Dai L-X, Tu T and You S-L et al. Asymmetric catalysis with chiral ferrocene ligands. Ace Chem Res 2003; 36: 659-67.
41. Alberico D, Scott M E and Lautens M. Aryl—aryl bond formation by transition-metal-catalyzed direct arylation. Chem Rev 2007; 107: 174-238.
42. Fu G C. Enantioselective nucleophilic catalysis with "planar-chiral" heterocycles. Ace Chem Res 2000; 33: 412-20.
43. Schwamb C B, Fitzpatrick K P and Brueckner A C et al. Enantioselective Synthesis of α-Amidoboronates Catalyzed by Planar-Chiral NHC—Cu (I) Complexes. J Am Chem Soc 2018; 140(34) 10644-8.
44. Schwartz L A, Holmes M and Brito G A et al. Cyclometalated Iridium-PhanePhos Complexes Are Active Catalysts in Enantioselective Allene-Fluoral Reductive Coupling and Related Alcohol-Mediated Carbonyl Additions That Form Acyclic Quaternary Carbon Stereocenters. J Am Chem Soc 2019; 141: 2087-96.

45. Mishra S, Liu J and Aponick A. Enantioselective Alkyne Conjugate Addition Enabled by Readily Tuned Atropisomeric P, N-Ligands. J Am Chem Soc 2017; 139: 3352-5.
46. Zhang P—C, Wang Y and Zhang Z-M et al. Gold (I)/Xiang-Phos-Catalyzed Asymmetric Intramolecular Cyclopropanation of Indenes and Trisubstituted Alkenes. Org Lett 2018; 20: 7049-52.
47. Han J, Zhou W and Zhang P—C et al. Design and Synthesis of WJ-Phos, and Application in Cu-Catalyzed Enantioselective Boroacylation of 1,1-Disubstituted Allenes. ACS Catal 2019; 9: 6890-5.
48. 48 Sandoval C A, Ohkuma T and Muniz K et al. Mechanism of asymmetric hydrogenation of ketones catalyzed by BINAP/1,2-diamine-ruthenium (II) complexes. J Am Chem Soc 2003; 125: 13490-503.
49. Trost B M. Designing a receptor for molecular recognition in a catalytic synthetic reaction: allylic alkylation. Ace Chem Res 1996; 29: 355-64.
50. Evans D A, Woerpel K A and Hinman M M et al. Bis (oxazolines) as chiral ligands in metal-catalyzed asymmetric reactions. Catalytic, asymmetric cyclopropanation of olefins. J. Am. Chem Soc 1991; 113: 726-8.
51. Denmark S E, Stavenger R A and Wong K-T et al. Chiral phosphoramide-catalyzed aldol additions of ketone enolates. Preparative aspects. J Am Chem Soc 1999; 121: 4982-91.
52. Akiyama T. Stronger bronsted acids. Chem Rev 2007; 107: 5744-58.
53. Tang W and Zhang X. New chiral phosphorus ligands for enantioselective hydrogenation. Chem Rev 2003; 103: 3029-70.
54. Xu G, Senanayake C H and Tang W. P-Chiral Phosphorus Ligands Based on a 2,3-Dihydrobenzo [d][1,3]oxaphosphole Motif for Asymmetric Catalysis. Ace Chem Res 2019; 52: 1101-12.
55. Handa S, Andersson M P and Gallou F et al. HandaPhos: a general ligand enabling sustainable ppm levels of palladium-catalyzed cross-couplings in water at room temperature. Angew Chem Int Ed 2016; 55: 4914-8.
56. Zhang Z, Butt N A and Zhang W. Asymmetric hydrogenation of nonaromatic cyclic substrates. Chem Rev 2016; 116: 14769-827.
57. Pu L. 1,1'-Binaphthyl dimers, oligomers, and polymers: molecular recognition, asymmetric catalysis, and new materials. Chem Rev 1998; 98: 2405-94.
58. Chen D-F, Han Z-Y and Zhou X-L et al. Asymmetric organocatalysis combined with metal catalysis: concept, proof of concept, and beyond. Ace Chem Res 2014; 47: 2365-77.
59. Cai Y, Liu X and Zhou P et al. Asymmetric Catalytic Halofunctionalization of α, β-Unsaturated Carbonyl Compounds. J Org Chem 2018; 84: 1-13.
60. Yu J, Shi F and Gong L-Z. Bronsted-acid-catalyzed asymmetric multicomponent reactions for the facile synthesis of highly enantioenriched structurally diverse nitrogenous heterocycles. Ace Chem Res 2011; 44: 1156-71.
61. Lorion M M, Maindan K and Kapdi A R et al. Hetero-multimetallic catalysis for sustainable organic syntheses. Chem Soc Rev 2017; 46: 7399-420.
62. Chen Y, Yekta S and Yudin A K. Modified BINOL ligands in asymmetric catalysis. Chem Rev 2003; 103: 3155-212.
63. Zhang J, Yu P and Li S Y et al. Asymmetric phosphoric acid-catalyzed four-component Ugi reaction. Science 2018; 361: 1087-96.
64. Lin J S, Li T T and Jiao G Y et al. Chiral Bronsted Acid Catalyzed Dynamic Kinetic Asymmetric Hydroamination of Racemic Allenes and Asymmetric Hydroamination of Dienes. Angew. Chem Int Ed 2019; 58: 7092-6.
65. Yoon H, Marchese A D and Lautens M. Carboiodination Catalyzed by Nickel. J Am Chem Soc 2018; 140: 10950-4.
66. Liu Y and Zhang W. Iridium-Catalyzed Asymmetric Hydrogenation of α-Alkylidene Succinimides. Angew Chem Int Ed 2013; 52: 2203-6.
67. Ye C-X, Melcamu Y Y and Li H—H et al. Dual catalysis for enantioselective convergent synthesis of enantiopure vicinal amino alcohols. Nat Commun 2018; 9: 410.
68. Yang G, Guo D and Meng D et al. NHC-catalyzed atropoenantioselective synthesis of axially chiral biaryl amino alcohols via a cooperative strategy. Nat Commun 2019; 10: 3062.
69. Zhao C, Guo D, Munkerup K, et al, nantioselective [3+3] atroposelective annulation catalyzed by N-heterocyclic carbenes, Nature Comm, 2018; 9, 611. DOI: 10.1038/s41467-018-02952-3.
70. Zhu Y, Zhang L and Luo S. Asymmetric α-photoalkylation of 0-ketocarbonyls by primary amine catalysis: facile access to acyclic all-carbon quaternary stereocenters. J Am Chem Soc 2014; 136: 14642-5.
71. Zhang H H, Wang C S and Li C et al. Design and Enantioselective Construction of Axially Chiral Naphthyl-Indole Skeletons. Angew Chem Int Ed 2017; 56: 116-21.
72. Shen D, Chen Q and Yan P et al. Enantioselective dearomatization of naphthol derivatives with allylic alcohols by cooperative iridium and Bronsted acid catalysis. Angew Chem Int Ed 2017; 56: 3242-6.
73. Li G, Liang T and Wojtas L et al. An asymmetric Diels-Alder reaction catalyzed by chiral phosphate magnesium complex: highly enantioselective synthesis of chiral spirooxindoles. Angew Chem Int Ed 2013; 125: 4726-30.
74. Wu G, Liu Y and Yang Z et al. Multilayer 3D Chirality and Its Synthetic Assembly. Research 2019; 2019: 6717104.
75. An G, Seifert C and Li, G. N-Phosphonyl/phosphinyl imines and group-assisted purification (GAP) chemistry/technology. Org Biomol Chem 2015; 13: 1600-17.
76. Xie J-b, Luo J and Winn T R et al. Group-assisted purification (GAP) chemistry for the synthesis of Velcade via asymmetric borylation of N-phosphinylimines. Beilstein J Org Chem 2014; 10: 746-51.
77. Kaur P, Wever W and Pindi S et al. The GAP chemistry for chiral N-phosphonyl imine-based Strecker reaction. Green Chem 2011; 13: 1288-92.
78. Seifert C W, Paniagua A and White G A et al. GAP Peptide Synthesis through the Design of a GAP Protecting Group: An Fmoc/tBu Synthesis of Thymopentin Free from Polymers, Chromatography and Recrystallization. Eur J Org Chem 2016; 2016: 1714-9.
79. Kaur P, Pindi S and Wever W et al. Asymmetric catalytic N-phosphonyl imine chemistry: The use of primary free amino acids and Et2AlCN for asymmetric catalytic Strecker reaction. J Org Chem 2010; 75: 5144-50.
80. Seifert C. New Synthetic Methodology for Chiral Amines and Peptides via GAP Technology. Ph. D. Thesis. Texas Tech University Department of Chemistry and Biochemistry 2017.
81. Corey E and Cheng X-M. The Logic of Chemical Synthesis. Chichester: John Wiley & Sons, 1989.

82. Noland W E, Narina V S and Britton D. Synthesis and crystallography of 8-halonaphthalene-1-carbonitriles and naphthalene-1,8-dicarbonitrile. J Chem Res 2011; 35: 694-7.
83. Guram A S and Buchwald S L. Palladium-catalyzed aromatic aminations with in situ generated aminostannanes. J Am Chem Soc 1994; 116: 7901-2.
84. Anil S and Stephen L B. Palladium-Catalyzed Aromatic Aminations with in situ Generated Aminostannanes. J Am Chem Soc 1994; 116: 7902-41.
85. Bhunia S, Pawar G G and Kumar, S V et al. Selected Copper-Based Reactions for C—N, C—O, C—S, and C—C Bond Formation. Angew Chem Int Ed 2017; 56: 16136-79.
86. Miyaura N and Suzuki A. Palladium-catalyzed cross-coupling reactions of organoboron compounds. Chem Rev 1995; 95: 2457-83.
87. Ding X, Chen L and Honsho Y et al. An n-channel two-dimensional covalent organic framework. J Am Chem Soc 2011; 133: 14510-3.
88. Kotha S, Lahiri K and DHURKE K. Recent applications of the Suzuki-Miyaura cross-coupling reaction in organic synthesis. Tetrahedron 2002; 58: 9633-95
89. Mothana S, Grassot J M and Hall, D G. Multistep Phase-Switch Synthesis by Using Liquid-Liquid Partitioning of Boronic Acids: Productive Tags with an Expanded Repertoire of Compatible Reactions. Angew Chem Int Ed 2010; 49: 2883-7.
90. Zhu K, Baggi G and Loeb S J. Ring-through-ring molecular shuttling in a saturated [3] rotaxane. Nat Chem 2018; 10: 625.
91. Alder R W, Hyland N P and Jeffery J C et al. Poly (1,1-bis(dialkylamino) propan-1,3-diyl) s; conformationally-controlled oligomers bearing electroactive groups. Org Biomol Chem 2009; 7: 2704-15.
92. Gampe D M, Schramm S and Ziemann S et al. From Highly Fluorescent Donors to Strongly Absorbing Acceptors: The Tunable Properties of Fluorubines. J Org Chem 2017; 82: 6153-62.
93. Zhou Y, Kijima T and Izumi T. The synthesis and application of 2-acetyl-6-(1-naphthyl)-pyridine oxime as a new ligand for palladium precatalyst in Suzuki coupling reaction. J Heterocycl Chem 2009; 46: 116-8.
94. Geng H and Huang P-Q. Versatile and chemoselective transformation of aliphatic and aromatic secondary amides to nitriles. Tetrahedron 2015; 71: 3795-801.
95. Metallinos C, Nerdinger, S and Snieckus V. N-cumyl benzamide, sulfonamide, and aryl 0-carbamate directed metalation groups. Mild hydrolytic lability for facile manipulation of directed ortho metalation derived aromatics. Org Lett 1999; 1: 1183-6.
96. Hu X, Zhao X and He B et al. A Simple Approach to Bioconjugation at Diverse Level: Metal Free Clcik Reaction of Activated Alkynes with Native Groups of Biotargets without Prefunctionalization. Research 2018; 2018: 3152870, 1-12.
97. Mei J, Leung N L and Kwok, R T et al. Aggregation-induced emission: together we shine, united we soar!Chem Rev 2015; 115: 11718-940.
98. Li Y, Li C and Jiang T et al. Aptamer-Anchored Rubrene-Loaded Organic Nanoprobes for Cancer Cell Targeting and Imaging. CCS Chemistry 2019; 1: 251-60.
99. Liu Q, Bi C and Li J et al. Generating Giant Membrane Vesicles from Live Cells with Preserved Cellular Properties. Research 2019; 2019: 6523970.

What is claimed is:

1. A pseudo $C_2$-chiral molecule comprising a first, a second, and a third layer,
wherein each of the layers are arranged in a nearly parallel fashion with chirality along a center plane,
wherein each of the first, second, and third layers are at least one of: anti, syn, or both anti and syn isomers;
wherein the pseudo C2-chiral molecule comprises any one of the following formulae (I), (ii), (III), or (IV):

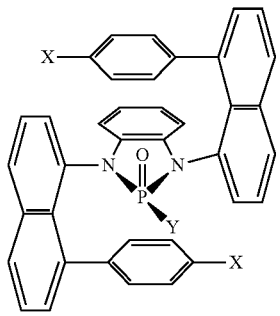

(I)

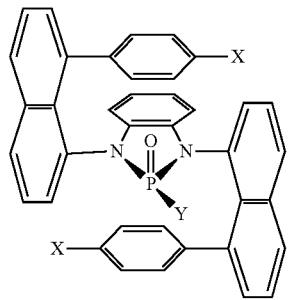

(II)

wherein, X is H, -Me, —OMe; and
Y=—Cl, —$N_3$, —$NH_2$, —NHPh, -NHBn, -Me, -Et, -Bu, -iPr,

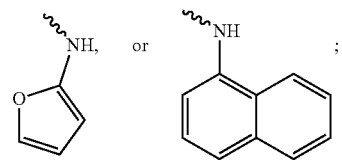

or

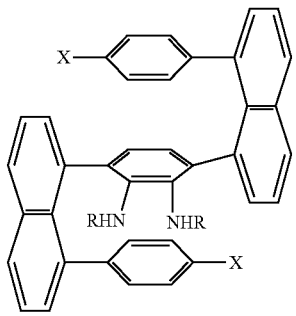

(III)

(IV)

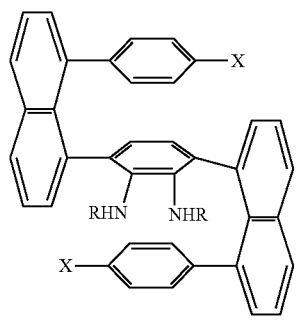

wherein, X is H, -Me, —OMe, or

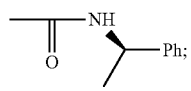

and
R=—Cl, —N₃, —NH₂, —NHPh, -NHBn, -Me, -Et, -Bu, -iPr, —NH-Naph, —COCH₃

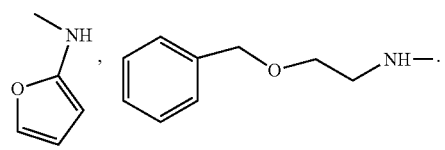

2. The molecule of claim 1, wherein each of the first, second, and third layers are parallel.

3. The molecule of claim 1, wherein the molecule has a right-hand chirality, a left-hand chirality, or both a left- and a right-handed chirality.

4. The molecule of claim 1, wherein the molecule is selected from at least one of:

20

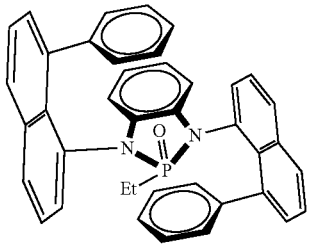

21

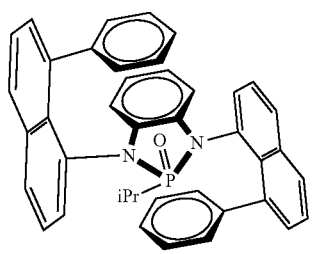

22

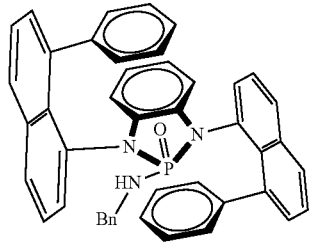

23

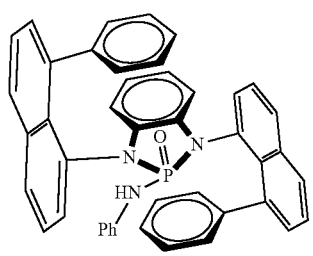

24

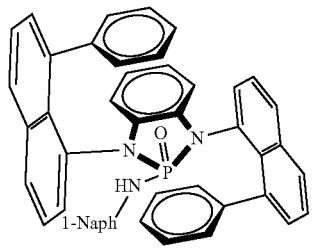

25

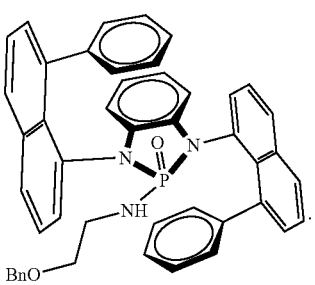

5. The molecule of claim 1, wherein the molecule is selected from at least one of:
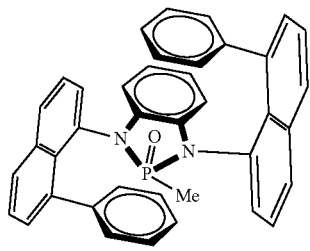
17
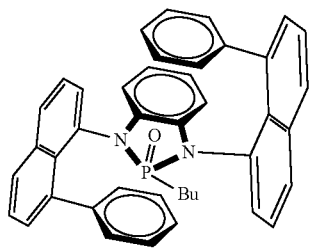
18
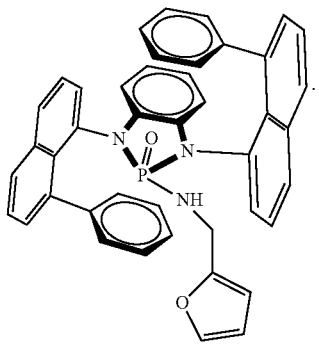
19
6. The molecule of claim 1, wherein the molecule is:
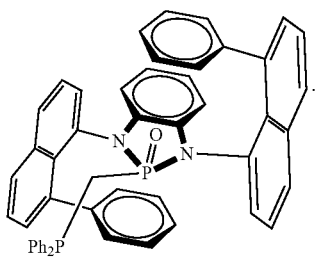
26
* * * * *